United States Patent
Yokota et al.

(10) Patent No.: US 7,689,096 B2
(45) Date of Patent: Mar. 30, 2010

(54) INFORMATION PROCESSING DEVICE, INFORMATION PROCESSING METHOD, AND INFORMATION PROCESSING PROGRAM

(75) Inventors: Junichi Yokota, Kanagawa (JP); Atsuo Okamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1556 days.

(21) Appl. No.: 10/487,648

(22) PCT Filed: Jun. 24, 2003

(86) PCT No.: PCT/JP03/08010

§ 371 (c)(1),
(2), (4) Date: Oct. 25, 2004

(87) PCT Pub. No.: WO2004/003723

PCT Pub. Date: Jan. 8, 2004

(65) Prior Publication Data

US 2005/0069292 A1  Mar. 31, 2005

(30) Foreign Application Priority Data

Jun. 27, 2002 (JP) ............................. 2002-187429
Sep. 30, 2002 (JP) ............................. 2002-285133

(51) Int. Cl.
*H04N 5/91* (2006.01)
(52) U.S. Cl. .................................... 386/46; 386/124
(58) Field of Classification Search ................ 386/46, 386/124–126; 365/230.01; 711/221
See application file for complete search history.

(56) References Cited

U.S. PATENT DOCUMENTS

| 5,276,841 | A  | * | 1/1994  | Moronaga et al. ........... 711/221 |
| 5,841,936 | A  | * | 11/1998 | Kobayashi ................... 386/33  |
| 5,926,821 | A  |   | 7/1999  | Hirose et al. |
| 6,459,644 | B2 | * | 10/2002 | Mizushima et al. ..... 365/230.01 |
| 6,891,694 | B2 | * | 5/2005  | Hetzler et al. ............ 360/78.04 |
| 2001/0016841 | A1 |   | 8/2001  | Karasudani |
| 2001/0055467 | A1 | * | 12/2001 | Nakatani et al. .............. 386/46 |

FOREIGN PATENT DOCUMENTS

| JP | 2-193232    |   | 7/1990  |
| JP | 5-289916    |   | 11/1993 |
| JP | 8-221303    |   | 8/1996  |
| JP | 2000-172542 |   | 6/2000  |
| JP | 2000-267904 |   | 9/2000  |
| JP | 2002-163136 | * | 6/2002  |

* cited by examiner

*Primary Examiner*—Thai Tran
*Assistant Examiner*—Mishawn Dunn
(74) *Attorney, Agent, or Firm*—Frommer Lawrence & Haug LLP; William S. Frommer; Thomas F. Presson

(57) ABSTRACT

An information processing apparatus for mitigating the processing load of its CPU to increase the transfer rate at recording and enhance the usage efficiency of recording media. A host CPU determines whether an information signal supplied from the apparatus is a moving picture signal according to an instruction entered by user through a key operation block or according to the information included in the supplied information signal. If the supplied information signal is found to be moving picture information, the CPU detects free blocks each made up of a plurality of clusters by referencing the FAT information of a hard disk and records the moving picture information in unit of detected free blocks. If the supplied information signal is found not to be moving picture information, the CPU records the detected signal to free clusters on a cluster basis.

36 Claims, 32 Drawing Sheets

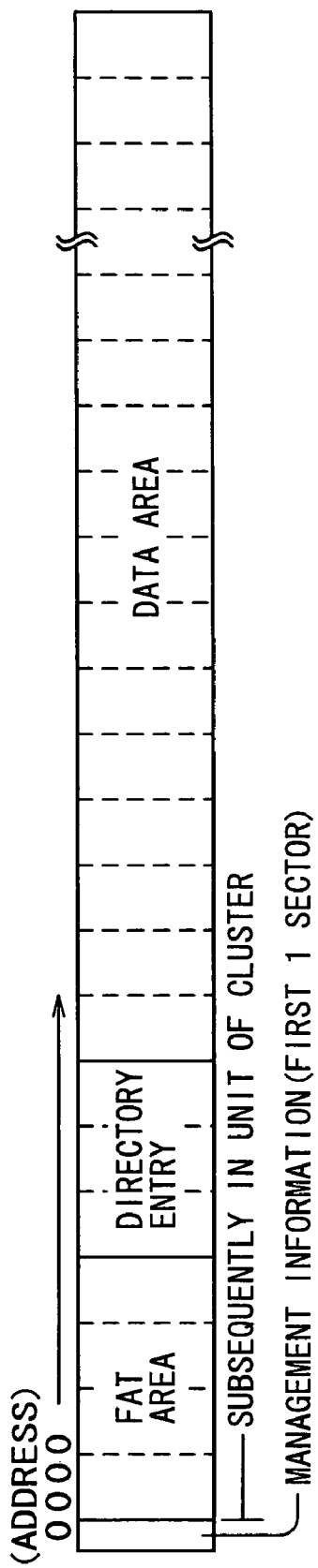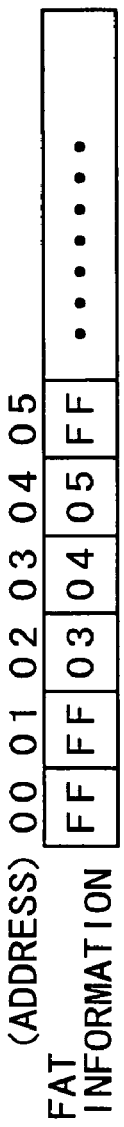

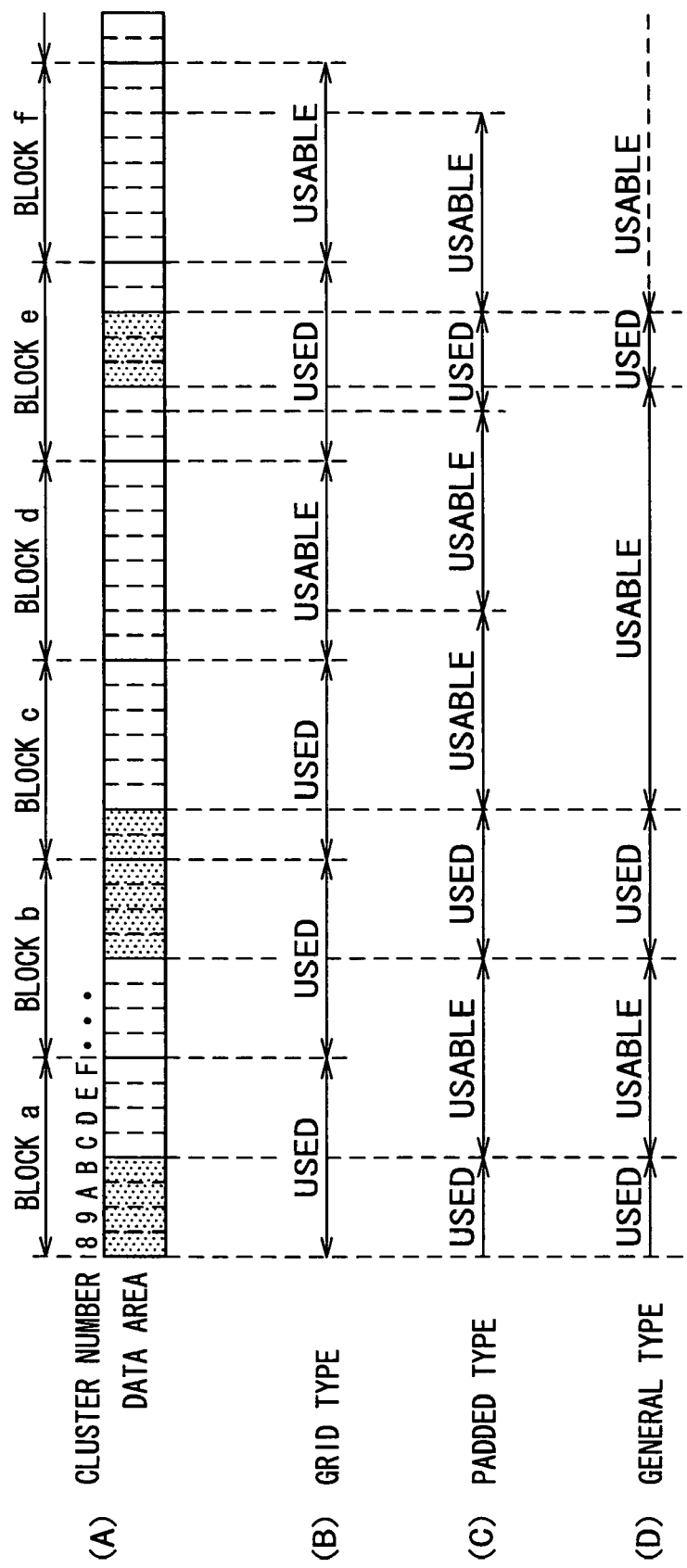

F I G. 4

| | GRID TYPE | PADDED TYPE | GENERAL TYPE |
|---|---|---|---|
| | USABLE IF ALL OF 8 CONTINUOUS CLUSTERS (BLOCK), WHICH ARE REGULARLY PARTITIONED, ARE UNUSED. | USABLE IF 8 CONTINUOUS CLUSTERS (BLOCK) ARE UNUSED. | USABLE IF ANY ONE CLUSTER IS UNUSED. |
| RECORDING OF REALTIME DATA | ○ YES | ○ YES | × NO |
| PROCESSING TIME | ○ COMPARATIVELY SHORT | × COMPARATIVELY LONG | × COMPARATIVELY LONG |
| USAGE EFFICIENCY OF RECORDING MEDIA | × LOW | △ MEDIUM | ○ HIGH |
| CAM REPRODUCTION OF PC RECORDING FILE | INSTALLATION OF GRID TYPE ALONE IS IMPOSSIBLE. | INSTALLATION OF PADDED TYPE ALONE IS IMPOSSIBLE. | INSTALLATION OF GENERAL TYPE REPRODUCTION IS ESSENTIAL. |

F I G. 8 A (ADDRESS) 00 01 02 03 ... 24 25
FAT INFORMATION: FF FF 03 24 ... 25 FF ...

F I G. 8 B (CLUSTER) 00 01 02 03 ... 24 25
DATA AREA: ①  ②  ...  ③  ④  ...

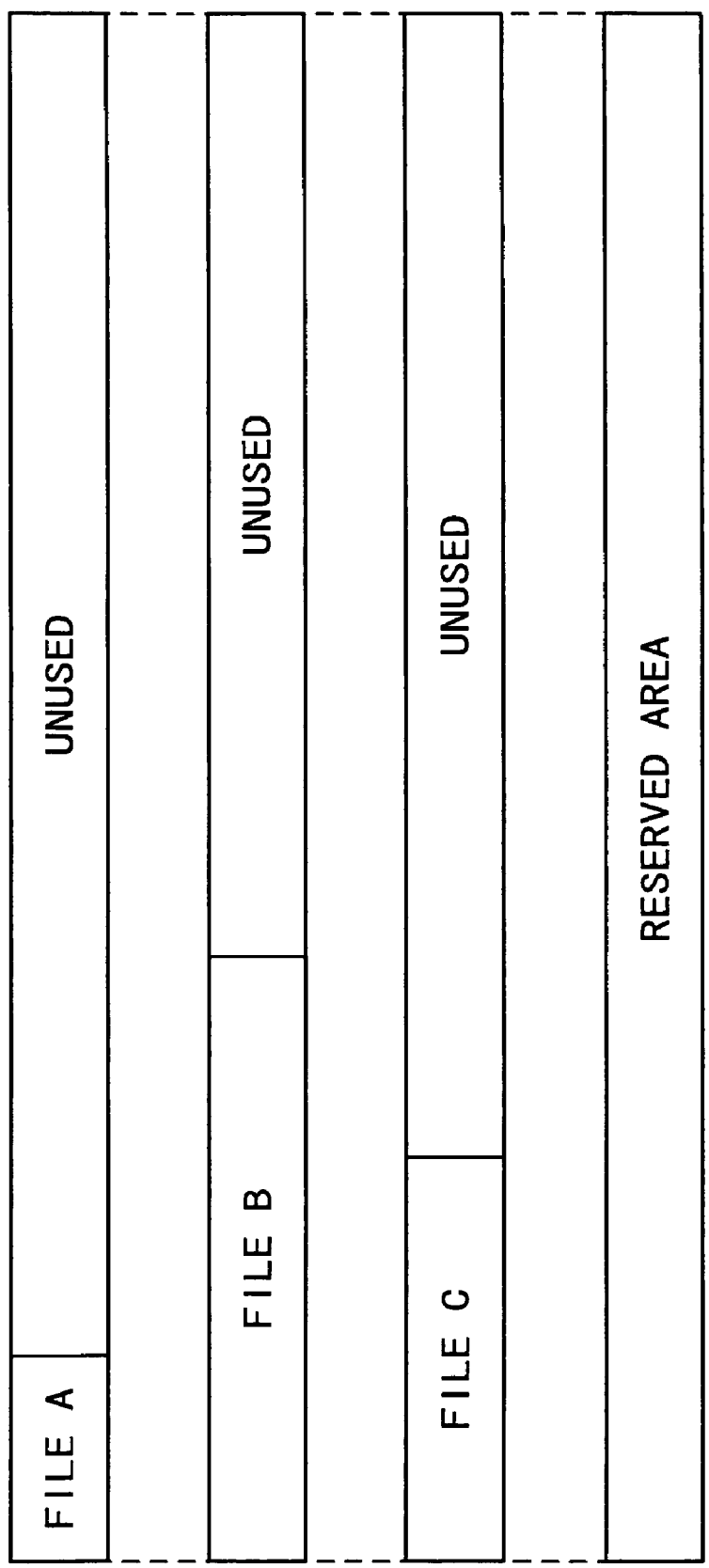

FIG. 10A

| (ADDRESS) | 00 | 01 | 02 | 03 | ... | 24 | 25 |
|---|---|---|---|---|---|---|---|
| FAT INFORMATION | FF | FF | 03 | 24 | ... | 25 | FF |

FIG. 10B

| (ADDRESS) | 00 | 01 | 02 | 03 |
|---|---|---|---|---|
| CLUSTER LINK TABLE | 02 | 03 | 24 | 25 |

FIG. 10C

| FILE A | FILE B | FILE C | RESERVED AREA |
|---|---|---|---|

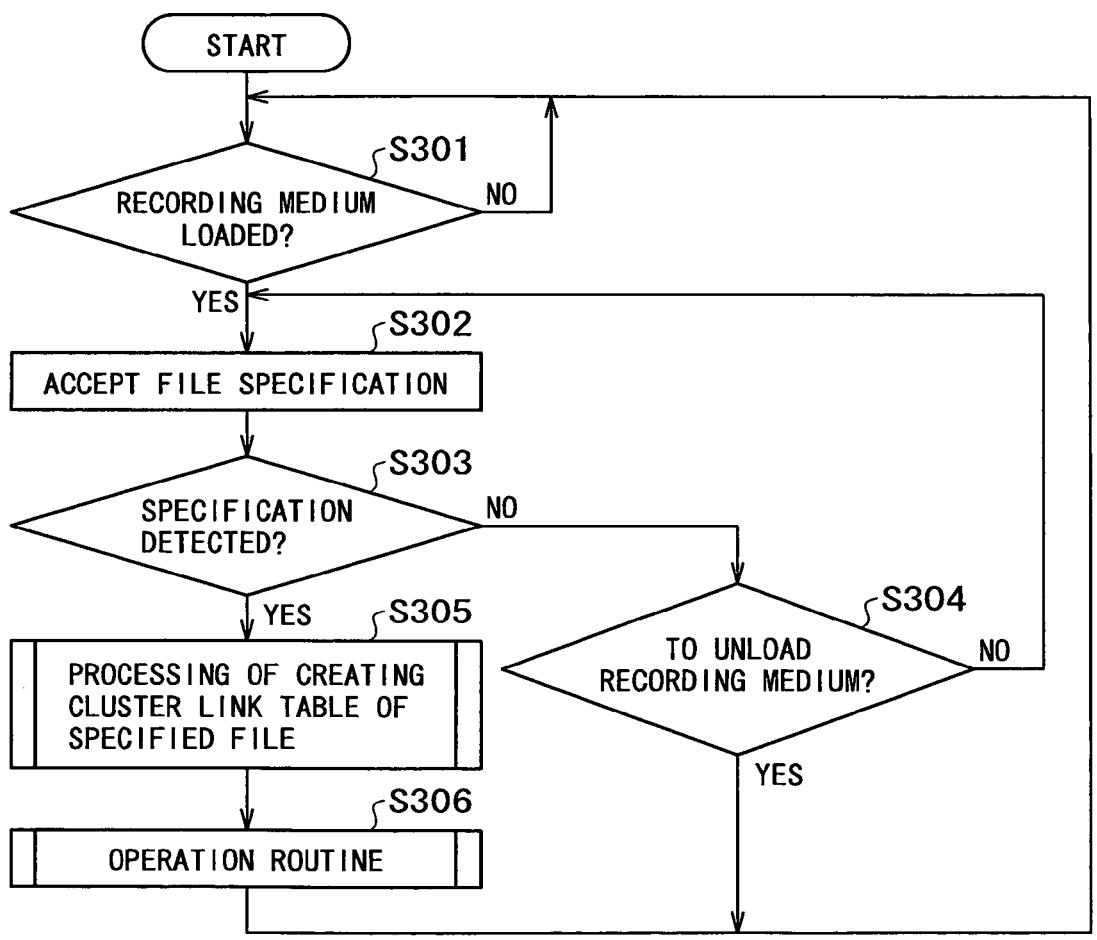
F I G. 1 1

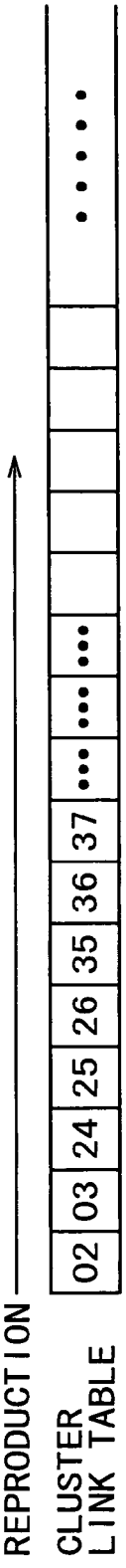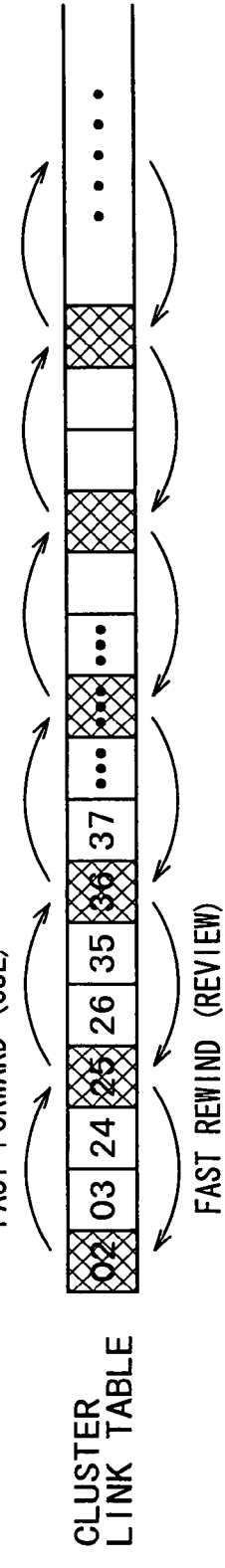

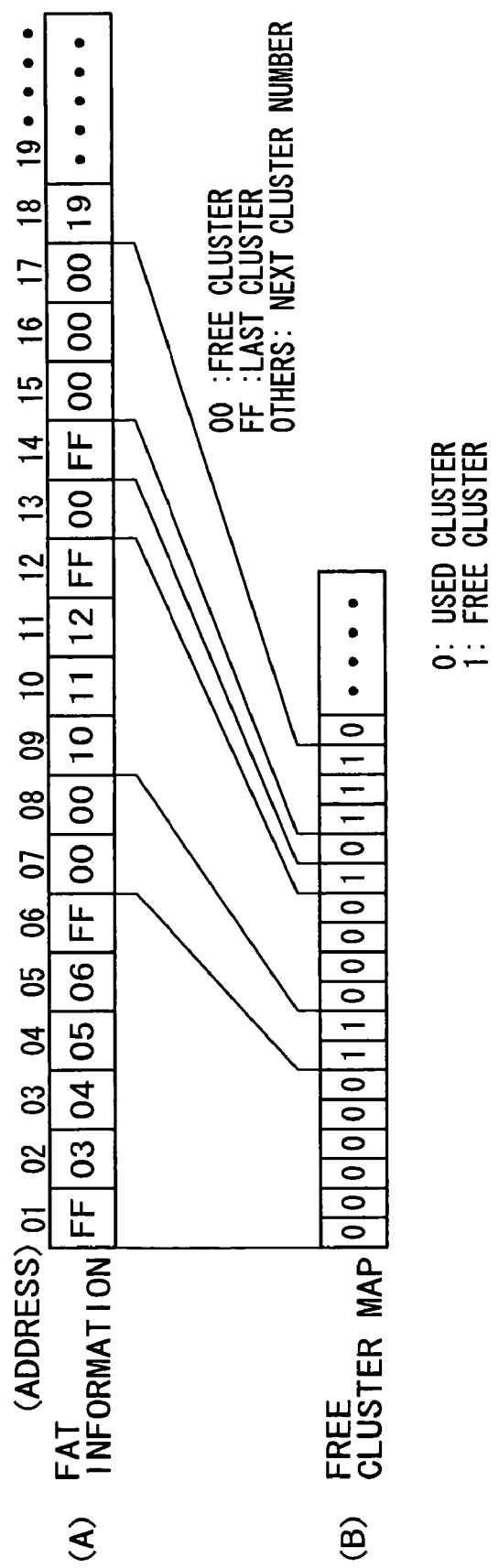

| (ADDRESS) | 00 | 01 | 02 | 03 | | 24 | 25 | |
|---|---|---|---|---|---|---|---|---|
| FAT INFORMATION | FF | FF | 03 | 24 | ...... | 25 | FF | · · · |

| (CLUSTER) | 00 | 01 | 02 | 03 | | 24 | 25 | |
|---|---|---|---|---|---|---|---|---|
| DATA AREA | | | ① | ② | ...... | ③ | ④ | · · · |

DIRECTORY

DIRECTORY ENTRY
 * FILE NAME
 * EXTENSION
 * FILE ATTRIBUTE
 * UPDATE TIME
 * UPDATE DATE
 * START CLUSTER NUMBER
 * FILE SIZE

ABCD.mpg
EFGH.mpg

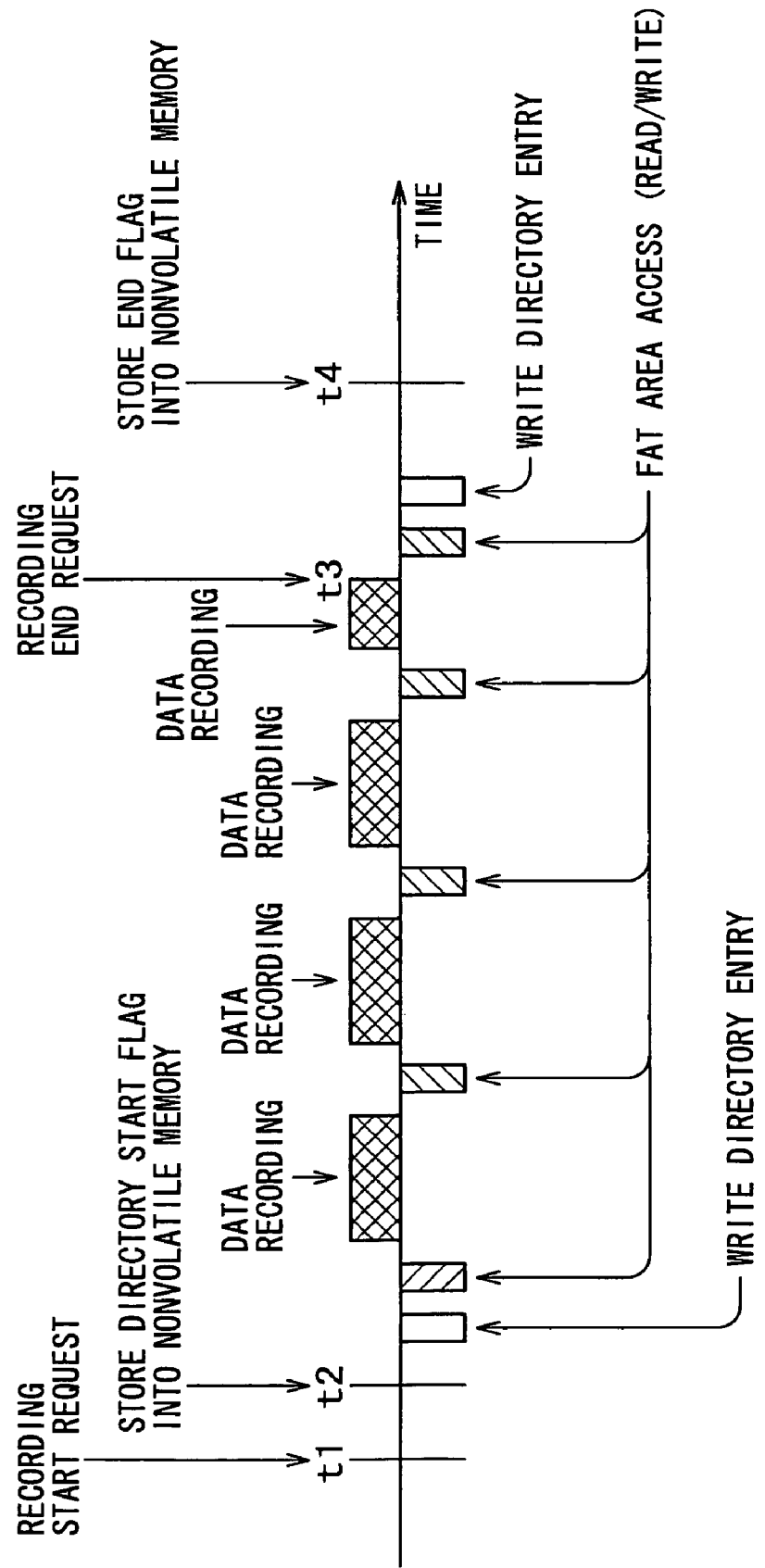

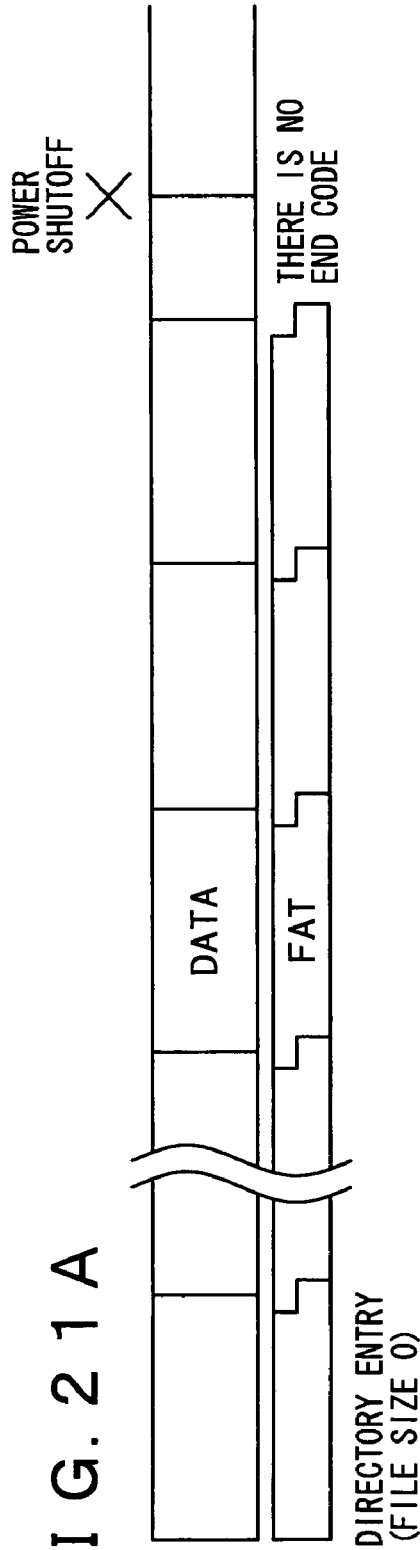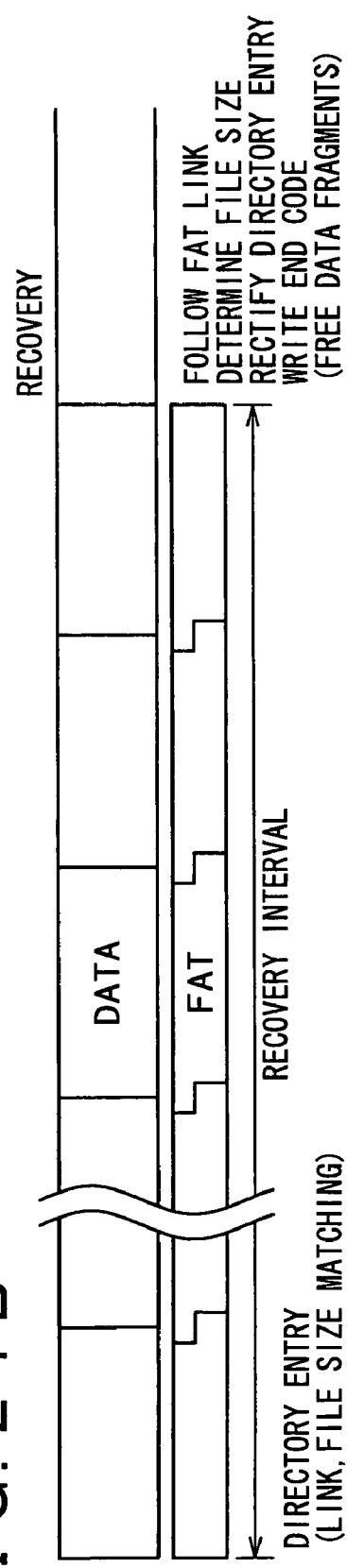

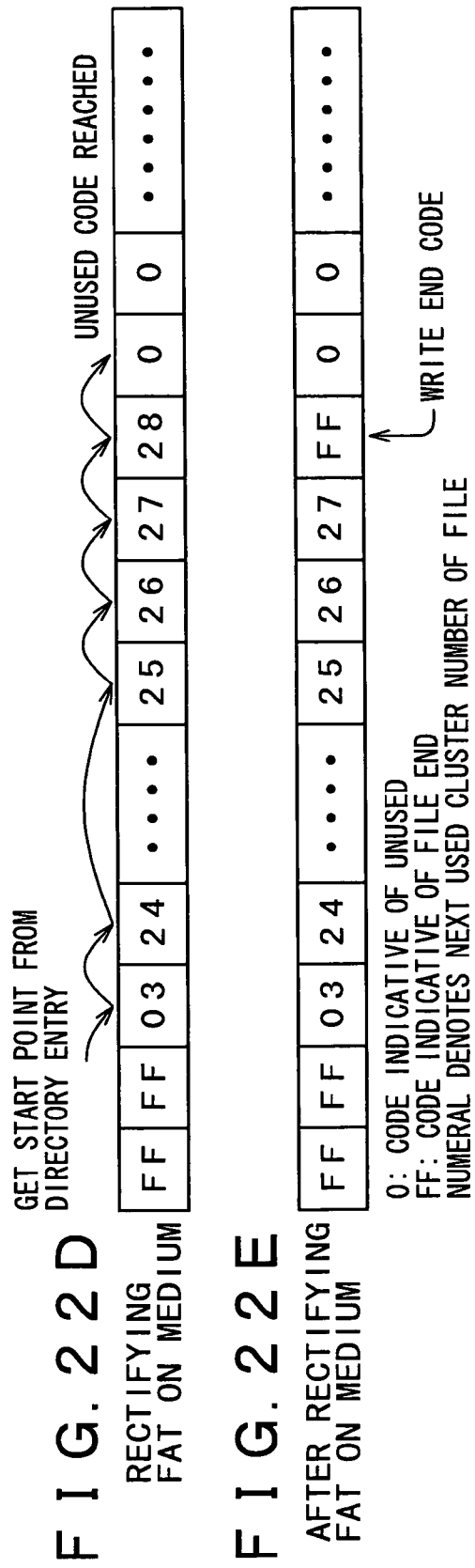

FIG. 25A (CLUSTER) DATA AREA

| 00 | 01 | 02 | 03 | ... | 24 | 25 | 26 | 27 | 28 | 29 | 30 |
|---|---|---|---|---|---|---|---|---|---|---|---|
|  |  | ① | ② | ... | ③ | ④ | ⑤ | ... | ... | ... | ... |

FIG. 25B (ADDRESS) FAT IN MEMORY

| 00 | 01 | 02 | 03 | ... | 24 | 25 | 26 | 27 | 28 | 29 | 30 |
|---|---|---|---|---|---|---|---|---|---|---|---|
| FF | FF | 03 | 24 | ... | 25 | 26 | 0 | 0 | 0 | 0 | 0 |

FIG. 25C FAT ON MEDIUM

| FF | FF | 03 | 24 | ... | 25 | FF | 0 | 0 | 0 | 0 | 0 |

FIG. 25D (CLUSTER) DATA AREA

| 00 | 01 | 02 | 03 | ... | 24 | 25 | 26 | 27 | 28 | 29 | 30 |
|---|---|---|---|---|---|---|---|---|---|---|---|
|  |  | ① | ② | ... | ③ | ④ | ⑤ | ⑥ | ⑦ | ⑧ | ⑨ |

FIG. 25E (ADDRESS) FAT IN MEMORY

| 00 | 01 | 02 | 03 | ... | 24 | 25 | 26 | 27 | 28 | 29 | 30 |
|---|---|---|---|---|---|---|---|---|---|---|---|
| FF | FF | 03 | 24 | ... | 25 | 26 | 27 | 28 | 29 | 30 | 0 |

FIG. 25F FAT ON MEDIUM

| FF | FF | 03 | 24 | ... | 25 | 26 | 27 | 28 | 29 | FF | ... |

0: CODE INDICATIVE OF UNUSED
FF: CODE INDICATIVE OF FILE END
NUMERAL DENOTES NEXT USED CLUSTER NUMBER OF FILE

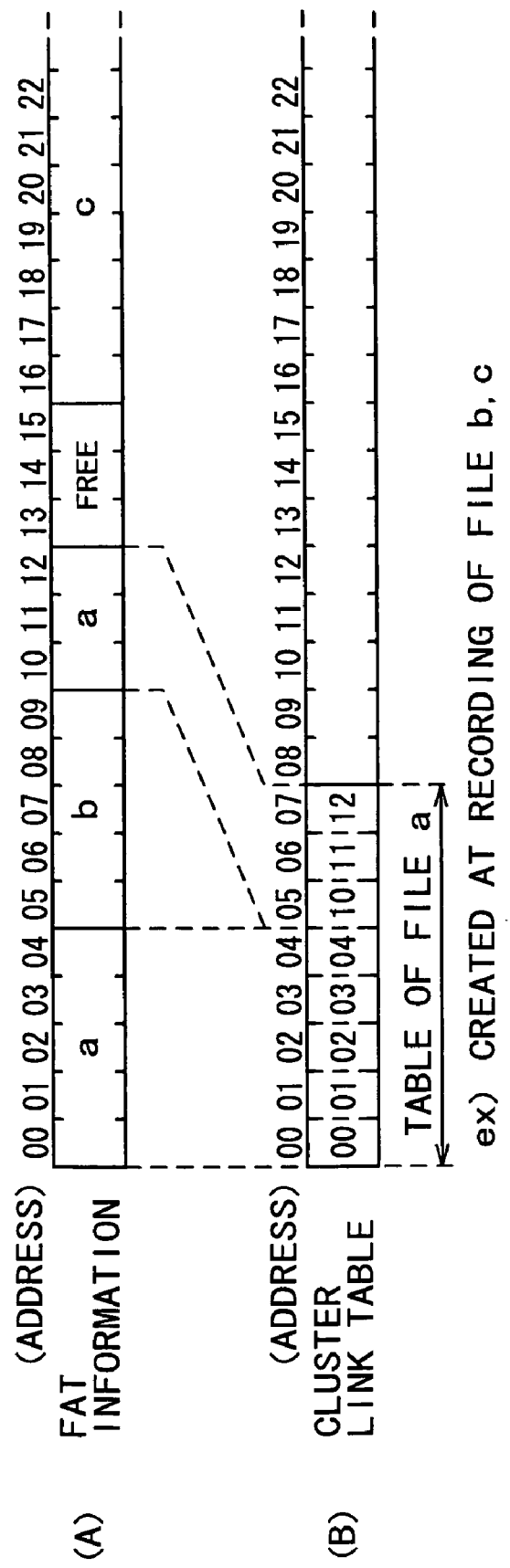

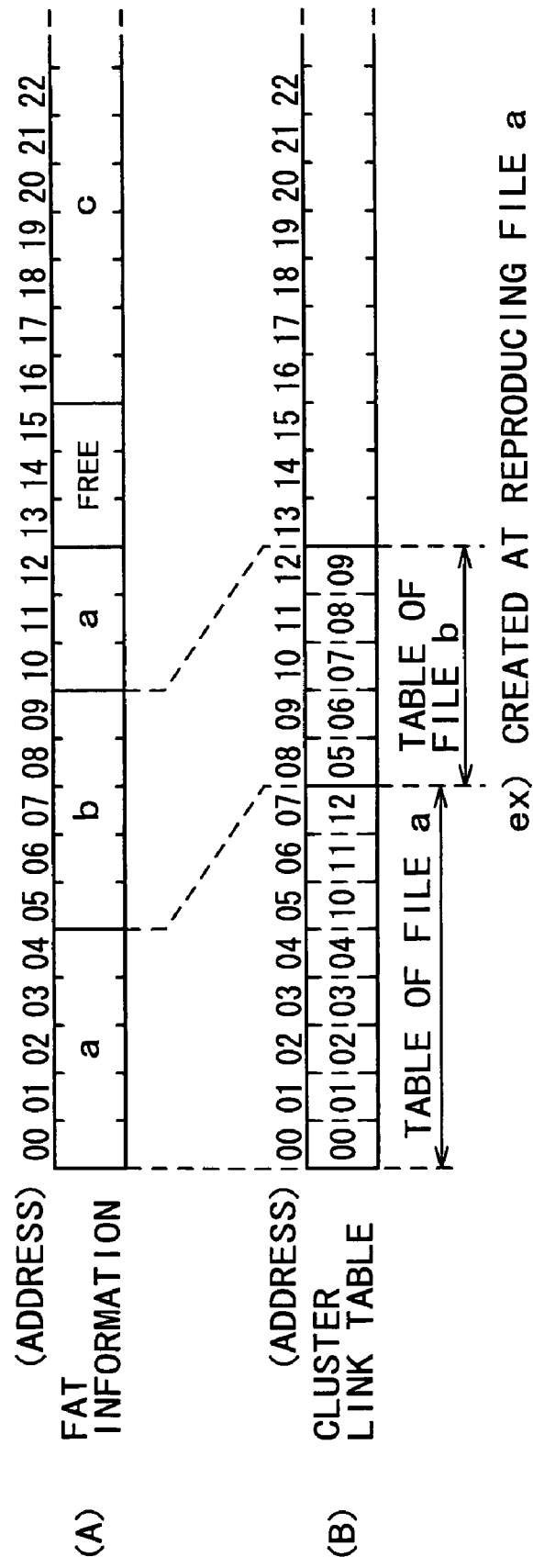

FIG. 28A (AT RECORDING PROCESSING)
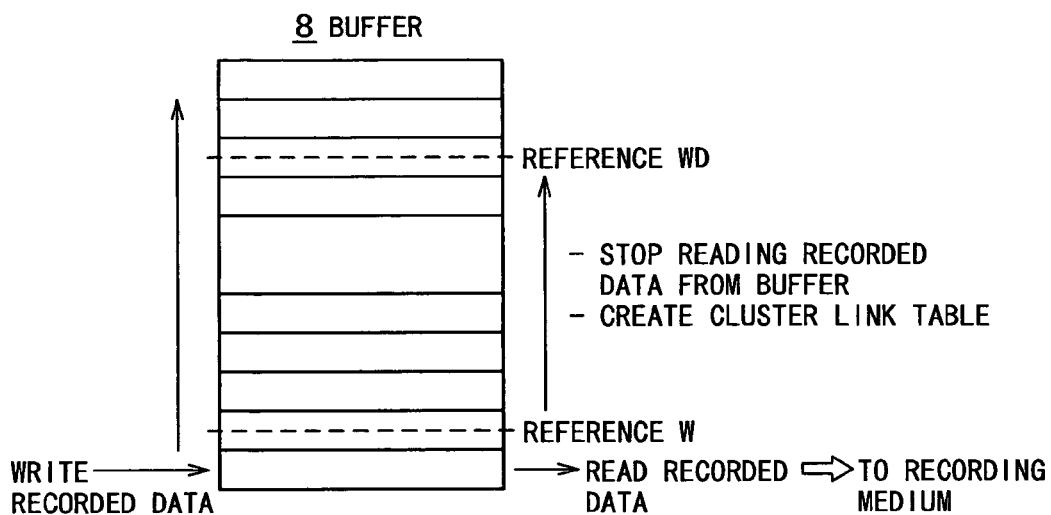
FIG. 28B (AT REPRODUCTION PROCESSING)
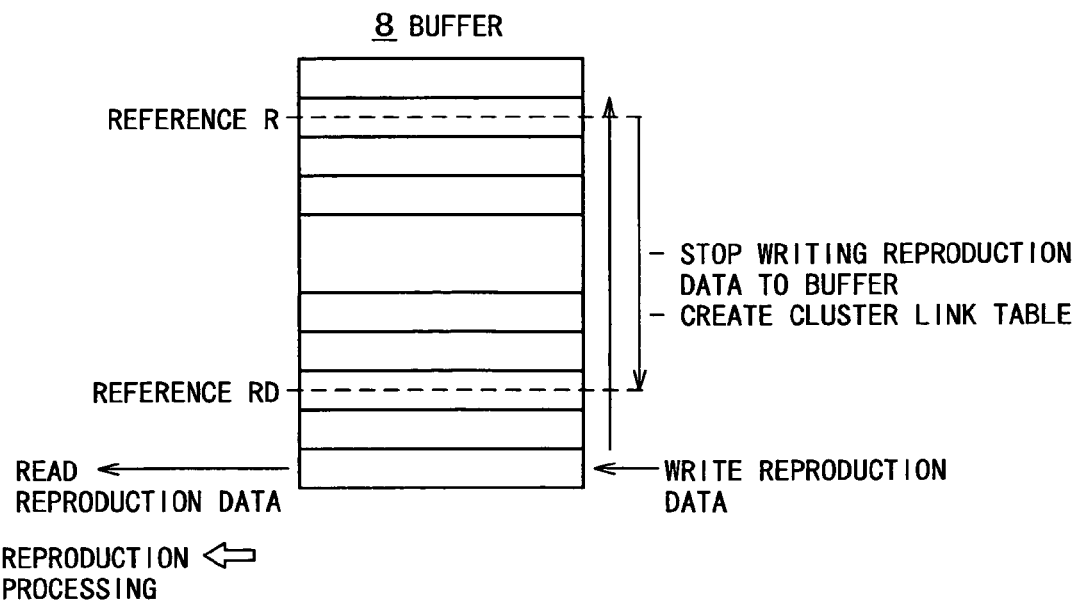

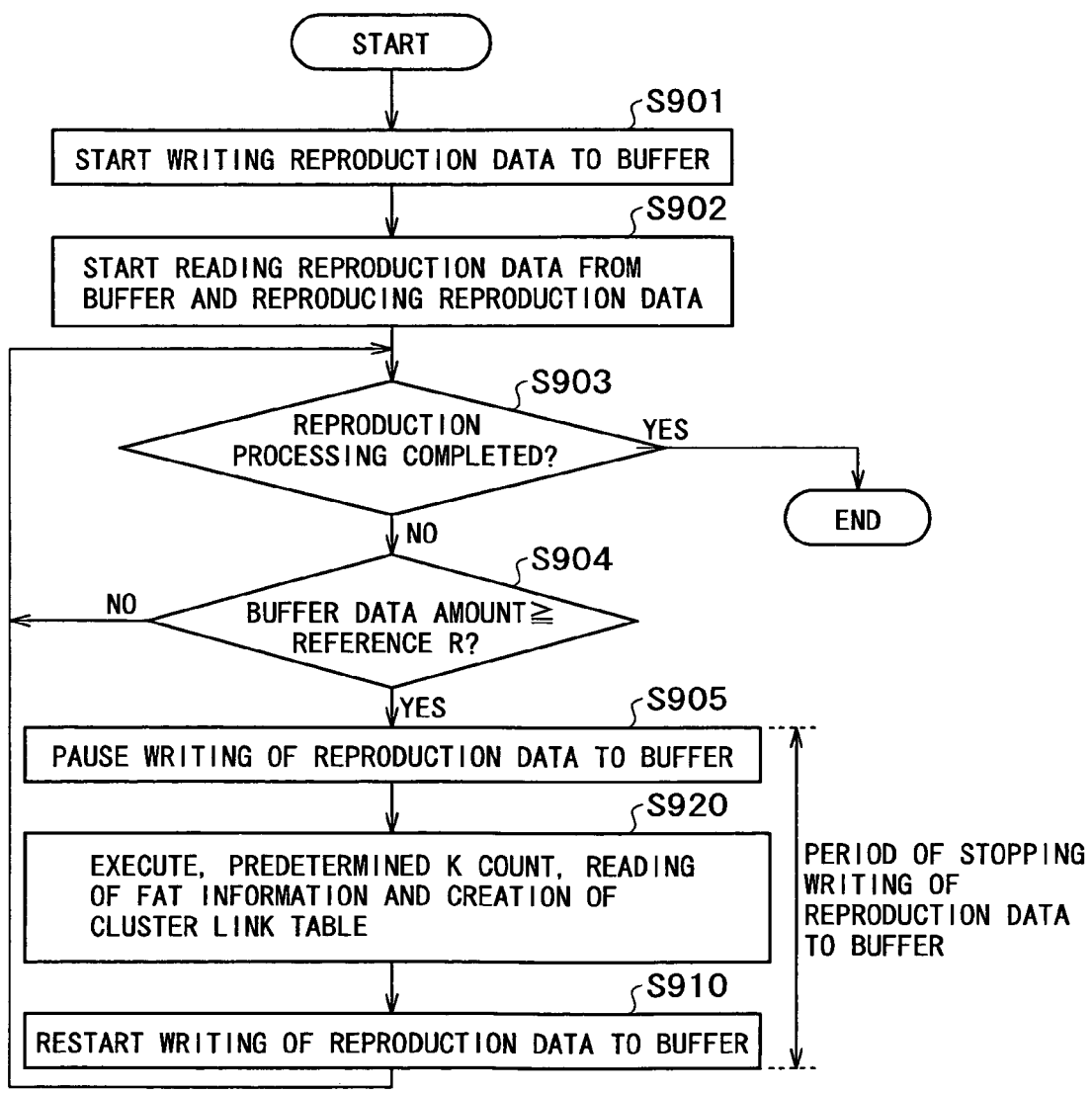

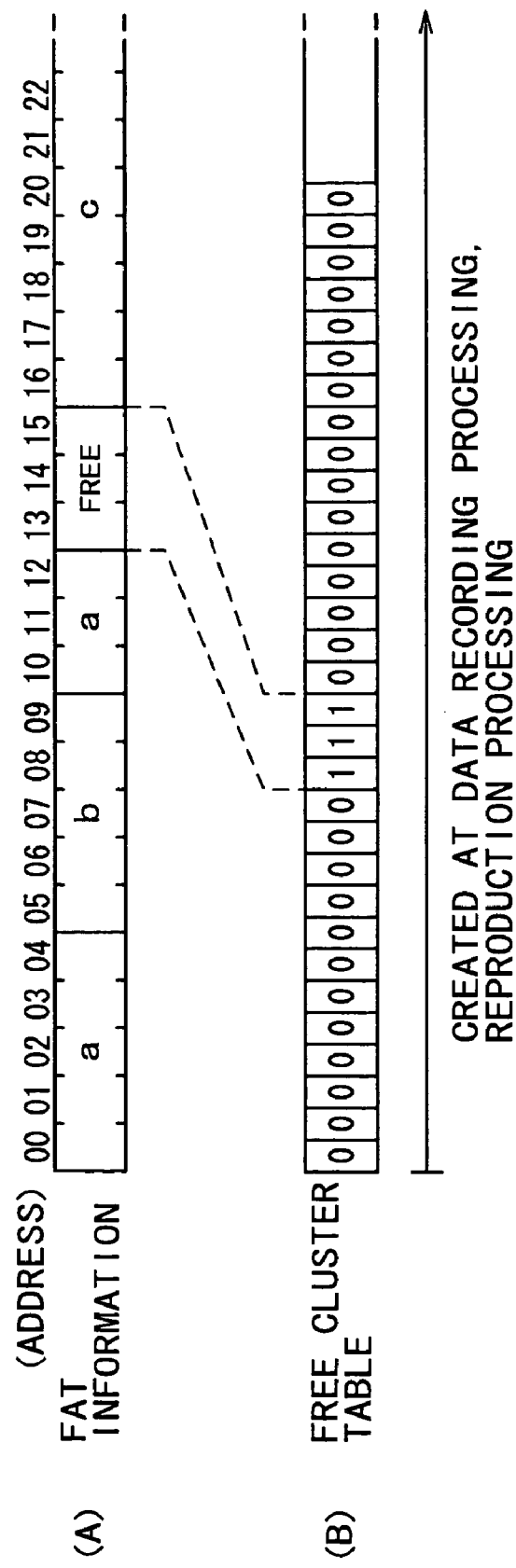

INFORMATION PROCESSING DEVICE, INFORMATION PROCESSING METHOD, AND INFORMATION PROCESSING PROGRAM

TECHNICAL FIELD

The present invention relates generally to an information processing apparatus, an information processing method, and an information processing program that execute the processing such as recording the information signals indicative of IT (Information Technology) data including moving picture information, still picture information, and text data to recording media and reproducing moving picture information, still picture information, and text data from recording media.

BACKGROUND ART

Many information processing apparatuses (or recording/reproducing apparatuses) have been proposed and in wide use. The apparatuses are capable of recording moving pictures and still pictures to magnetic tapes as recording media and reproducing recorded moving pictures and still pictures. These information processing apparatuses include VTR (Video Tape Recorder), digital VTR, video camera, digital video camera, and so on.

As the results of recent technological advances of random-accessible recording media such as hard disks and semiconductor memories in the reduction in size, the growth in recording density, and the enhancement in access speed, information processing apparatuses such as hard disk units and semiconductor memory recorders are proposed. The apparatuses use random-accessible recording media such as hard disks and semiconductor memories as removable mass storage media.

Unlike tape recording media such as magnetic tapes, hard disks and semiconductor memories are random-accessible, so that, when moving pictures and still pictures are recorded on these random-accessible memories, the recorded pictures may be manipulated with ease, this advantage widening the ranges of their uses.

A method is disclosed (for example, refer to Japanese Patent Laid-open No. Hei 08-221303) in which, when moving pictures and still pictures are recorded on disk medium as recording media, the recording areas and recording directions of moving pictures and still pictures are controlled in order to reproduce the recording moving pictures at high speeds.

However, the information processing apparatuses using random-accessible recording media such as hard disks and semiconductor memories involve the following problems:

(1) Transfer Rate

When hard disks and semiconductor memories are used as recording media, it is necessary to correctly specify the addresses on a recording medium at the time of writing and reading information signals (or data) on the recording medium, which in turn requires some time for recording data to a desired area and reading data from a desired area, sometimes making the margin of the transfer rate not enough for the processing of moving picture information.

For this reason, if, at the recording of moving picture information, the speed of recording the moving picture information to a recording medium is slower than that of supplying the moving picture information, a so-called overflow occurs, thereby sometimes having to forcibly end the recording processing because of the failure of the normal recording of the moving picture information.

If, at the production of moving picture information, the reading of the moving picture information from a recording medium is not in for its reproduction, a so-called underflow occurs, thereby sometimes having to forcibly end the reproduction processing because of the failure of the normal reproduction of the moving picture information.

(2) Usage Efficiency of Recording Media

Although hard disks and semiconductor memories are huge in their storage capacities, they are not limitless, so that the storage capacity of each recording medium must be used without waste, thereby enhancing the usage efficiency as high as possible.

(3) Load of Host CPU

Even if moving picture information must be processed at high speeds for example, the processing by the host CPU (Central Processing Unit) of each information processing apparatus for controlling each component thereof must be executed relatively easily to mitigate its load to always ensure its stable operation in any processing, maintaining its reliability at high levels.

(4) Compatibility with other Devices

Exchanging information with an information processing apparatus, which uses a hard disk or a semiconductor memory as recording media, a personal computer for example, requires the use of a same file system for example, making it difficult to execute information exchange.

(5) Installation of File Systems

To solve the problem mentioned in (4) above, a simple method may be that a file system used on the information processing apparatus, which uses a hard disk and a semiconductor memory as recording media, is installed on an apparatus such as a personal computer for example with which data are to be exchanged. However, the installation of file systems requires time and labor, so that this approach must be avoided as long as possible.

(6) Use of File Systems

File systems are always required for recording data to hard disks and semiconductor memories. However, depending on the configurations of file systems, it may take some time to find out the address of a desired data recording area from the information of a file system, thereby resulting in a delay in a read/write operation.

(7) Action against Power Failure

If the power is shut off at the time of recording moving picture information due to power outage or other causes, the moving picture information already recorded may become unusable, for which some good measures must be taken.

Thus, the use of random-accessible recording media such as hard disks and semiconductor memories involves the above-mentioned problems, which must be solved. Recently, the provision of various information processing apparatuses such as recording/reproducing apparatuses using hard disks and semiconductor memories as recording media is proposed, for which it is necessary to provide products cleared of all the above-mentioned problems, always operating with stability, high in reliability, and easy to use.

It is therefore an object of the present invention to provide an information processing apparatus, which is cleared of the above-mentioned problems, high in reliability, and easy to use and an information processing method and an information processing program, which are for use on this information processing apparatus.

DISCLOSURE OF INVENTION

In carrying out the invention and according to one aspect thereof, there is provided an information processing apparatus recited in claim 1 for recording an inputted information signal to a recording medium as one file. The apparatus includes detection means for detecting a free area based on a block composed of a plurality of continuous clusters, which is a minimum recording unit on the recording medium, and recording control means for controlling, on the basis of a detection result obtained by the detection means, recording means to record the information signal to the block-basis free area on the recording medium.

According to the information processing apparatus recited in claim 1, information signals (data) may be recorded to a recording medium on a file basis. Before recording, the detection means detects a free area a free area based on a block composed of a plurality of continuous clusters and the recording control means controls the recording means to record the information signal to the block-basis free area on the recording medium.

Consequently, information signals such as moving picture information for example may be recorded in a processing unit larger than cluster, thereby enhancing the transfer rate high enough for recording information signals. In addition, the recording unit of moving picture information is block, so that the processing load of the host CPU may be mitigated.

Thus, the problems of transfer rate and host CPU load may be resolved, thereby providing a high reliable and user-friendly information processing apparatus.

The information processing apparatus recited in claim 2 is the information processing apparatus recited in claim 1, wherein the detection means detects the block-basis free area from the recording medium on which a recording area is regularly divided in unit of the block beforehand.

According to the information processing apparatus recited in claim 2, a recording medium on which information signals are recorded is divided in its recording area, into blocks like a checkerboard beforehand. The detection means detects block-based free areas from this recording medium divided into blocks beforehand.

Consequently, blocks may be regularly recorded on a recording medium to always allow the correct understanding of the correct positions of blocks on the recording medium, thereby allowing the correct and quick understanding of block-based free areas for the smooth recording processing of information signals.

Namely, the above-mentioned configuration enhances the transfer rate of information signals at the time of recording and mitigates the processing load of the host CPU, so that a highly reliable and user-friendly information processing may be provided.

The information processing apparatus recited in claim 3 is the information processing apparatus recited in claim 1 or 2. The apparatus further includes decision means for deciding whether the information signal is moving picture information. If the information signal is found by the decision means to be moving picture information, the recording control means controls the recording means to record the information signal to the block-basis free area on the recording medium.

According to the information processing apparatus recited in claim 3, the decision means decides whether the information signal to be recorded is moving picture information and, if it is found to be moving picture information, this moving picture information is recorded by the recording control means to a block-based free area. Namely, at least moving picture information is recorded to a recording medium on a block basis.

Consequently, moving picture information is recorded on a block basis and still picture information and IT data are recorded to a free area in unit of cluster for example, which is smaller recording unit than block, thereby enhancing the efficient use of recording media.

The information processing apparatus recited in claim 4 is the information processing apparatus recited in claim 1, 2, or 3. The apparatus further includes file management means for forming, on the recording medium, a file management table containing information indicative of a link relationship of clusters in which information signals constituting a file are recorded and managing the file management table. The detection means detects a free area by referencing the file management table.

According to the information processing apparatus recited in claim 4, for the recording area of a file recorded with information signals, the file management table is formed by the file management means on a recording medium, which is maintained from time to time to provide an up-to-date status of each file recording area. The detection means references the file management table formed on a recording medium to quickly and correctly detect block-based free areas.

Thus, in the case of a recording medium, which may be randomly accessible for example, use of the file management table for a file system, which is always required, allows the quick detection of not only free areas of minimum recording unit but also free areas in unit of block having predetermined size.

It should be noted that, for the file management table (the file system), various types of file systems are available, which manage the link relationship on a cluster basis. These file systems include FAT (File Allocation Table) or others used by Windows (trademark), which is an OS (Operating System) provided by US Microsoft Corporation and OS/2, which is an OS provided by IBM Corporation, in addition to newly developed ones.

Use of a so-called general-purpose file system such as FAT allows the simple and secure exchange of moving picture information for example with FAT-based personal computers without involving complicated operations and time- and labor-taking preparation jobs, thereby realizing a highly reliable and user-friendly information processing apparatus.

The information processing apparatus recited in claim 5 is the information processing apparatus recited in claim 1, 2, or 3. The apparatus further includes file management means for forming, on the recording medium, a file management table containing information indicative of a link relationship of clusters in which information signals constituting a file are recorded and managing the file management table and vacancy information table formation means for forming a vacancy information table composed of free cluster information onto a memory other than the recording medium by referencing the file management table. The detection means detects a free area by referencing the vacancy information table.

According to the information apparatus recited in claim 5, for the file recording area in which information signals are recorded, the file management table is formed by the file management means, which is maintained from time to time to provide an up-to-date status of each file recording area.

The file management table is referenced by the vacancy information table formation means to form the vacancy information table composed of cluster vacancy information indicative of unused clusters. This vacancy information table is referenced by the detection means to detect block-based free areas.

Consequently, block-based free areas and cluster-based free areas may be quickly and correctly detected to quickly execute the recording processing by referencing the vacancy information table constituting only vacancy information and without referencing the file management table containing not only the information about unused clusters (free clusters) but also the information about used clusters. Namely, the above-mentioned configuration realizes a highly reliable and user-friendly information processing apparatus capable of executing quick and correct recording processing.

The information processing apparatus recited in claim 6 is the information processing apparatus recited in claim 5. The vacancy information table formation means forms the vacancy information table in a free time, which is arranged when the information signal is processed realtime.

In the information processing apparatus recited in claim 6, when, at recording or reproducing information signals (data), information signals are processed realtime via a buffer memory, the reading of information signals from the buffer memory or the writing of information signals to the buffer memory may be paused without making the buffer memory overflow or underflow. And according to the information processing apparatus recited in claim 6, the time in which the reading and writing of data with the buffer memory may be paused is arranged as a free time, in which the vacancy information table is formed.

Consequently, the above-mentioned arrangement allows the formation of the vacancy information table and its use without making the user be aware thereof, thereby realizing a highly reliable and user-friendly information processing apparatus capable of executing quick and correct recording processing.

The information processing apparatus recited in claim 7 is the information processing apparatus recited in claim 6. The vacancy information table formation means forms the vacancy information table within a range of a processible data amount about the file management table set beforehand or to be set in accordance with the free time or within a processing time for forming the vacancy information table.

According to the information processing apparatus recited in claim 7, the vacancy information table is formed by the vacancy information table formation means by use of a free time in which information signals are processed realtime. In this case, rather than monitoring the free capacity of the buffer memory, the formation is executed within another limited values, which may be managed separately from the buffer memory free capacity.

To be more specific, a vacancy information table is formed within (1) the range of preset processible data amount (accessible data amount) for a file management table; (2) the range of a preset time in which a free vacancy table is formed; (3) the range of processible data amount, for a file management table, to be set in accordance with an actual free time (the data amount accessible within a free time); or (4) the range of a time, in which a vacancy information table is formed, to be set in accordance with an actual free time.

Consequently, the processing of forming a vacancy information table may be made closed processing independent of the free capacity of buffer memory and without retarding the realtime processing of information signals. Namely, no interrupt from the outside need be caused for the processing of forming a vacancy information table.

The information processing apparatus recited in claim 8 is the information processing apparatus recited in claim 5, 6, or 7. The apparatus further includes saving means for saving the vacancy information table formed in the memory to a nonvolatile recording medium.

According to the information processing apparatus recited in claim 8, vacancy information is saved to a nonvolatile recording medium. Consequently, the vacancy information table need not be formed again every time the information processing apparatus is powered on, although the recording medium to be used is not unloaded from the apparatus.

The information processing apparatus recited in claim 9 is the information processing apparatus recited in claim 4 or 5. The apparatus further includes a nonvolatile memory; start recording means for recording, to the nonvolatile memory, start information indicative to which file an information signal is to be recorded; invalidating means for invalidating, at the end of recording of an information signal, the start information recorded in the nonvolatile memory; halfway detection means for detecting on the basis of the start information recorded in the nonvolatile memory whether there is any file halfway being recorded when a power-on sequence has started, and recovery means for recovering, if a file halfway being recorded is found, the file halfway being recorded by obtaining necessary information by referencing the file management table of the file.

According to the information processing apparatus recited in claim 9, a nonvolatile memory is arranged and, before starting the recording of information signals, the start information is recorded to the nonvolatile memory by the start recording means and the start information recorded in the nonvolatile memory is invalidated by the invalidating means upon the normal end of the recording of the information signals.

Immediately after the power-on sequence, the nonvolatile memory is detected for the start information, which is not invalidated, thereby detecting whether there is any file halfway in recording by the halfway detection means. If a file halfway in recording is found by the halfway detection means, then the file management table is referenced by the recovery means, thereby executing a sequence of recovery processing such as additionally recording the file size of the recorded portion to the file management table and adding an end code (terminal code) to the file halfway in recording.

Consequently, if the recording of information signals is forcibly discontinued halfway due to a power failure caused by battery consumption or power outage for example, the information signals, which have been recorded before the power failure are available. Therefore, even if the power is shut off inadvertently to discontinue the recording, the information signals being recorded may be prevented from being totally lost, thereby realizing a highly reliable and user-friendly information processing apparatus.

The information processing apparatus recited in claim 10 is the information processing apparatus recited in claim 4 or 5. The apparatus further includes link information table formation means for forming a link information table containing information indicative of the cluster link relationship to continuous memory areas external to the recording medium by referencing the file management table and read control means for controlling reading means for reading the information signals on the basis of information contained in the link information table.

According to the information processing apparatus recited in claim 10, this information processing apparatus has the capabilities as a recording/reproducing apparatus and, for the file recording area in which information signals are recorded, a file management table is formed on the recording medium by the file management means, which is maintained from time to time, thereby managing the up-to-date status of the recording area of each file.

Then, the file management table is referenced by the link information table formation means to form a link information table made up of link information. This link information table is referenced by the read control means to read the desired information signals in the desired manner.

Consequently, not only normal reproduction but also fast-forward and fast-rewind processing may be quickly and correctly executed on the basis of the information contained in the link information table, thereby realizing a highly reliable and user-friendly information processing apparatus.

In carrying out the invention and according to anther aspect thereof, there is provided an information processing apparatus recited in claim 11 for reading a file recorded to a recording medium, the recording medium is formed with a file management table containing information indicative of a link relationship of clusters in which information signals constituting the file are recorded. The information processing apparatus includes link information table formation means for forming link information table containing information indicative of the cluster link relationship to continuous memory areas external to the recording medium by referencing the file management table and read control means for controlling reading means for reading the information signals on the basis of information contained the link information table.

The information processing apparatus recited in claim 11 has the capabilities of a recording/reproducing apparatus in which, when information signals are recorded by a recording apparatus or a recording/reproducing apparatus having a file system, the information may be read for use from the recording medium on which the file management table is formed.

At the use of information signals, rather than referencing the file management table formed on the recording medium, the link information table composed of only the link information generated beforehand by the link information table formation means is referenced to execute information signal reading processing for the reproduction, fast-forward, or fast-rewind of the desired information signals.

Consequently, not only normal reproduction but also fast-forward and fast-rewind processing may be quickly and correctly executed on the basis of the information contained in the link information table, thereby realizing a highly reliable and user-friendly information processing apparatus.

The information processing apparatus recited in claim 12 is the information processing apparatus recited in claim 10 or 11. The link information table formation means forms the link information table into a free time, which is arranged when the information signals are being processed realtime.

In the information processing apparatus recited in claim 12, when, at recording or reproducing information signals (data), information signals are processed realtime via a buffer memory, the reading of information signals from the buffer memory or the writing of information signals to the buffer memory may be paused without making the buffer memory overflow or underflow. And according to the information processing apparatus recited in claim 12, the time in which the reading and writing of data with the buffer memory may be paused is arranged as a free time, in which the vacancy information table is formed.

Consequently, The above-mentioned arrangement allows the formation of the link information table and its use without making the user be aware thereof, thereby realizing a highly reliable and user-friendly information processing apparatus capable of executing quick and correct recording processing such as reproduction, fast-forward, and fast-rewind and without involving the increased CPU load.

The information processing apparatus recited in claim 13 is the information processing apparatus recited in claim 12. The link information table formation means forms the link information table within a range of a processible data amount about the file management table set beforehand or to be set in accordance with the free time or within a range of processing time for forming the link information table.

According to the information processing apparatus recited in claim 13, a link information table is formed by the link information table formation means in the free time in which information signals are processed realtime. In this case, rather than monitoring the free capacity of the buffer memory, the formation is executed within another limited values, which may be managed separately from the buffer memory free capacity.

To be more specific, a link information table is formed within (1) the range of preset processible data amount (accessible data amount) for a file management table; (2) the range of a preset time in which a link information table is formed; (3) the range of processible data amount, for a file management table, to be set in accordance with an actual free time (the data amount accessible within a free time); or (4) the range of a time, in which a link information table is formed, to be set in accordance with an actual free time.

Consequently, the processing of forming a link information table may be made closed processing independent of the free capacity of buffer memory and without retarding the realtime processing of information signals. Namely, no interrupt from the outside need be caused for the processing of forming a link information table.

The information processing apparatus recited in claim 14 is the information processing apparatus recited in claim 10, 11, 12, or 13. The apparatus includes save means for saving the link information table formed on the memory areas into a nonvolatile recording medium. Consequently, the link information table need not be formed again every time the information processing apparatus is powered on, although the recording medium to be used is not unloaded from the apparatus.

According to the information processing apparatus recited in claim 14, the information indicative of the link relationship is saved to the nonvolatile recording medium. Consequently, the link relation table need not to be formed again every time the information processing apparatus is powered on, although the recording medium to be used is not unloaded from the information processing apparatus.

BRIEF DESCRIPTION OF DRAWINGS

FIG. 2A through FIG. 2C outline a FAT file system for use in the recording/reproducing apparatus shown in FIG. 1.

FIG. 3 shows available recording schemes "grid type", "padded type", and "general type".

FIG. 4 shows the characteristics of each of the recording schemes shown in FIG. 3.

FIG. 8A and FIG. 8B show a relationship between the FAT information formed on the recording/reproducing apparatus shown in FIG. 1 and the data area clusters to which information signal is recorded.

FIG. 9 shows an example in which FAT information is developed into the internal memory of a related-art recording/reproducing apparatus such as a personal computer.

FIG. 10A through FIG. 10C show an example in which FAT information is developed into the internal memory of the recording/reproducing apparatus shown in FIG. 1.

FIG. 11 is a flowchart indicative of the processing to be executed in the reproduction mode in the recording/reproducing apparatus shown in FIG. 1.

FIG. 14A and FIG. 14B are a flowchart indicative of the reproduction, fast-forward, and fast-rewind operations to be executed in the reproduction mode in the recording/reproducing apparatus shown in FIG. 1.

FIG. 16 shows the generation of a free cluster map to be executed in the recording/reproducing apparatus shown in FIG. 1.

FIG. 20 shows the update timings of the FAT information and directory entry information to be executed on the recording/reproducing apparatus shown in FIG. 1.

FIG. 21A and FIG. 21B show the recovery (or repair) of files made unusable due to the power failure at the recording on the recording/reproducing apparatus shown in FIG. 1.

FIG. 22A through FIG. 22E show the recovery (or repair) of files made unusable due to the power failure at the recording on the recording/reproducing apparatus shown in FIG. 1.

FIG. 25A through FIG. 25F show still another example of a measure, executable in the recording/reproducing apparatus shown in FIG. 1, for preventing a file from being made unusable due to power failure at the recording in the recording/reproducing apparatus shown in FIG. 1.

FIG. 26 shows the processing of forming a cluster link table to be executed at realtime processing.

FIG. 27 shows the processing of forming a cluster link table to be executed at realtime processing.

FIG. 28A and FIG. 28B show free times to be provided at the times of recording and reproduction, which are realtime processing, of information signals.

FIG. 32 is a flowchart indicative of another example of the processing of forming a cluster link table to be executed at the time of reproduction.

FIG. 33 shows an example of a free cluster map to be formed from FAT information.

BEST MODE FOR CARRYING OUT THE INVENTION

The following describes embodiments of an information processing apparatus, an information processing method, and an information processing program according to the present invention with reference to the drawings. In the embodiments to be described below, an example is used in which the information processing apparatus, information processing method, and information processing program according to the present invention are applied to a recording/reproducing apparatus (a digital video camera) having video camera capabilities and using a hard disk and a semiconductor memory card as recording media.

[First Embodiment] (refer to FIGS. 1 through 7)
[Overview of the Recording/Reproducing Apparatus]

Figure 1:
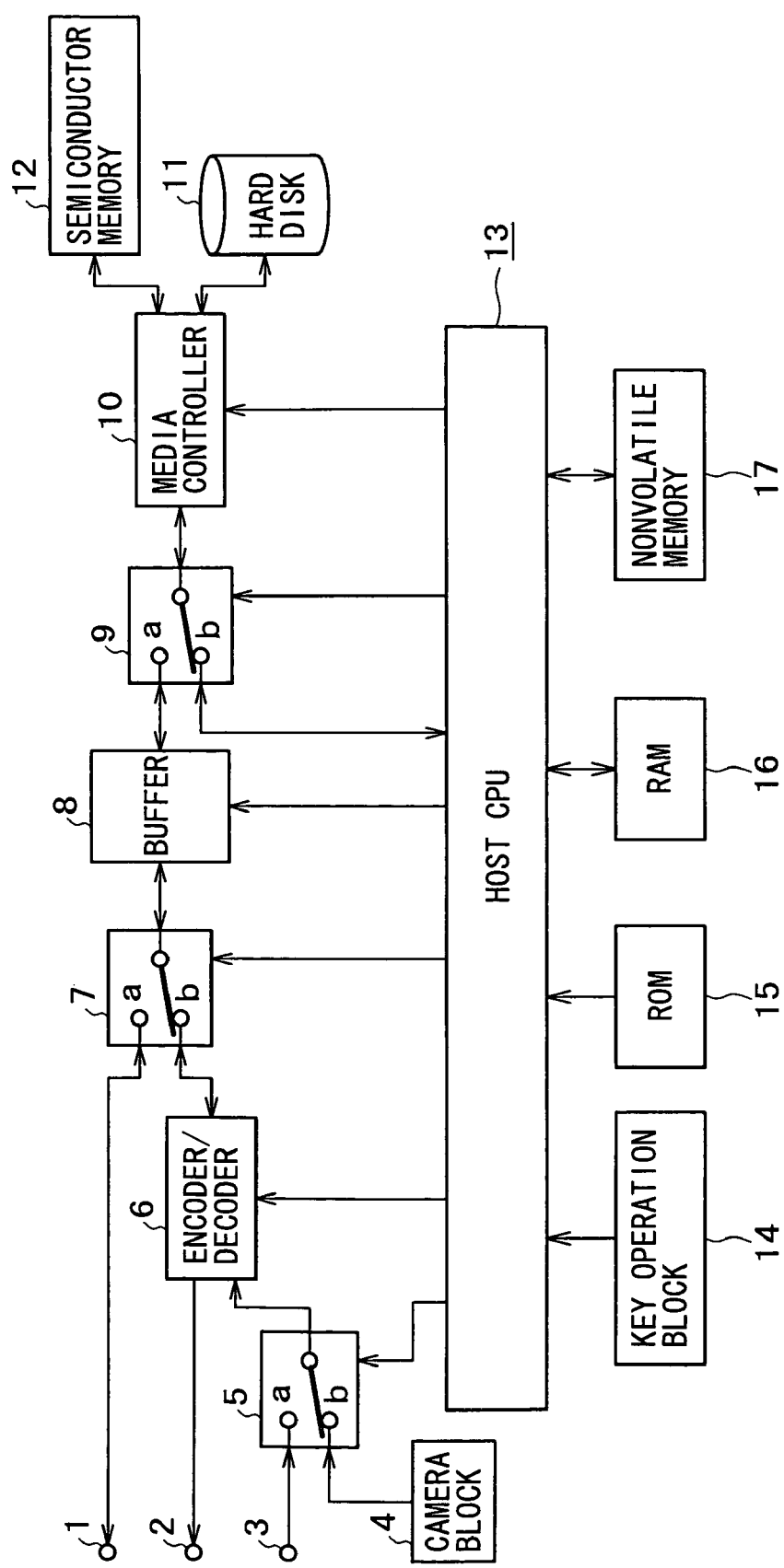
FIG. 1 is a block diagram illustrating a recording/reproducing apparatus (embodied as a digital video camera), which is an information processing apparatus to which one embodiment of the present invention is applied.

Now, referring to FIG. 1, there is shown a block diagram illustrating the recording/reproducing apparatus practiced as one embodiment of the invention. As shown in FIG. 1, the recording/reproducing apparatus of this embodiment has, as its input or output terminal functionality, a digital input/output terminal 1, a digital output terminal 2, a digital input terminal 3, and a camera block 4.

Also, as shown in FIG. 1, the recording/reproducing apparatus of this embodiment has, as its signal processing line, three switch circuits 5, 7, and 9, an encoder/decoder 6, a buffer memory 8, and a media controller 10. Further, on the recording/reproducing apparatus of this embodiment, a hard disk and a semiconductor memory card, both formed as so-called removable recording media, may be loaded in a detachable manner. In the example shown in FIG. 1, a hard disk 11 and a semiconductor memory 12 are loaded.

As described, the recording/reproducing apparatus of this embodiment is adapted to use a hard disk or a semiconductor memory card as recording media. Each recording media carries a file system (or a file management system) generally called FAT (File Allocation Table), which is widely used in personal computer OSs (Operating Systems) such as Windows (trademark) provided by Microsoft Corporation. The FAT file system supports the storage of a collection of information signals (data) into one file for management.

In addition, as shown in FIG. 1, a host CPU (Central Processing Unit) 13 for controlling each component of the recording/reproducing apparatus of this embodiment is arranged. A key operation block 14, a ROM (Read Only Memory) 15, a RAM (Random Access Memory) 16, and a nonvolatile memory 17 are connected to this host CPU 13.

The key operation block 14 accepts the input of instructions made by the user and has functions keys such as a reproduction key, a stop key, a fast-forward key, a fast-rewind key, and a pause key and various adjustment keys. The ROM 15 stores programs and necessary data. The RAM 16 is mainly for use as a work area. The nonvolatile memory 17 stores various setting information and parameters, which must be held after the power is turned off.

The host CPU 13, as described below, executes audio/visual signal (hereafter referred to as AV data) encode/decode control, buffer control, media controller control, and switch control in response to each request inputted by the user through the key operation block 14. In addition, this host CPU 13 also executes file system computation processing.

[About the Basic Signal Flows at Recording and Reproduction on the Recording/Reproducing Apparatus]

The following describes the basic signal flows at the time of recording and reproducing on the recording/reproducing apparatus of this embodiment. First, before specifically describing the basic signal flows, the FAT file system to be used at the time of recording and reproducing on the recording/reproducing apparatus of this embodiment will be outlined.

[Overview of FAT File System]

FIG. 2A through FIG. 2C outline the FAT system, which is installed on the recording/reproducing apparatus of this embodiment. FIG. 2A shows information areas arranged in the storage area of a hard disk or a semiconductor memory card. As shown in FIG. 2A, a management information area, a FAT information area, and a directory entry area are arranged in this order on the recording medium, followed by a data area in which various information signals are recorded on a file basis.

The management information area is a first 1-sector area of the storage area of a hard disk or a semiconductor memory card and is called MBR (Master Boot Record). The management information to be recorded in this management information area contains the descriptions of disk capacity, cluster capacity, FAT12/16/32 settings and, if there are partitions, partition information is attached to the last half of the management information.

The FAT information area following the management information area is formed with a FAT information table. The FAT information table (hereafter referred to as FAT information) is indicative how files are stored in the recording medium by determining which cluster is to be used in which sequence. Each address corresponds to each cluster and indicates which cluster is to be used next sequentially. For example, if the FAT information is formed as shown in FIG. 2B, a file is stored in the order of cluster 02, cluster 03, cluster 04, and cluster 05.

Therefore, referencing the FAT information, following the clusters in the data area in which information signals are recorded as specified by the FAT information, and reading the information signals recorded in these clusters allow to obtain all of desired information signals (1, 2, 3, 4, . . . ) recorded as the information signals of one file and the obtained information signals are made available.

It should be noted that, depending upon how many bits are used to represent FAT information data, there are three types of FATs, FAT12 (12 bits), FAT16 (16 bits), and FAT 32 (32 bits). If FAT is used as a file system, any file, however small, is stored in one cluster; because, as bit length grows, clusters may be divided smaller, files may be stored more efficiently.

The directory entry area shown in FIG. 2A stores a file name, the address of the start cluster in which that file is stored, and other simple information (including recording date for example) in 32-word information for each file. The information stored in the directory entry area is hereafter referred to simply as directory entry information.

At recording of a collection of inputted information signals, the FAT information and the directory entry information are referenced to search for free clusters. In addition, the information signals are recorded to the detected free clusters and, at the same time, the FAT information and the directory entry information are updated from time to time, thereby managing the recording while recording this collection of information signals to a recording medium.

At the reproduction of a collection of information signals from a recording medium recorded on a file basis, the FAT information and the directory entry information are referenced to obtain the information how the desired connection of information signals recorded on a file basis is recorded on the recording medium, thereby properly reading and reproducing the desired collection of data.

[Flow of Information Signals (Data) at Recording]

The following describes the flows of information signals at the recording and reproduction on the recording/reproducing apparatus of this embodiment. First, the flow of information signals at the time of recording will be described.

As shown in FIG. 1, the recording/reproducing apparatus of this embodiment has the digital input/output terminal 1 for the inputting/outputting of IT data such as text data and graphic data for example, the digital input terminal 3 for accepting the inputting of moving picture information, still picture information, and audio information from an other reproducing apparatus such as a personal computer, and the camera block 4 for taking images.

The user specifies through the key operation block 14 to use which of the digital input/output terminal 1, the digital input terminal 3, and the camera block 4. Also, as with the above-mentioned selection of these input terminal blocks, the user specifies through the key operation block 14 which of the hard disk 11 and the semiconductor memory 12 of the information signals are to be recorded.

Receiving the inputting of the selection of the input functionality through the key operation block 14 by the user, the host CPU 13 accordingly supplies a switching control signal to a switch circuit 5 and a switch circuit 7 to select between these input terminal blocks. Further, receiving the inputting of the selection of recording media from the user through the key operation block 14, the host CPU 13 accordingly controls the media controller 10 to record information signals to the selected recording medium.

In what follows, the flow of signals at the recording on the recording/reproducing apparatus 20 of this embodiment will be described on the assumption that the camera block 4 be selected as the input terminal block, namely, the recording/reproducing apparatus of this embodiment be put in the imaging mode and the hard disk 11 be selected as the recording medium.

In this example, the switch circuit 5 and the switch circuit 7 are each selected to the input terminal "b" side. Further, the host CPU 13 selects a switch circuit 9 to the input terminal "b" side and accesses a logical address on the hard disk 11 in this example through the media controller 10, thereby obtaining the management information and the FAT information formed on the hard disk 11 as shown in FIG. 2A. The host CPU 13 gets necessary information from the management information, prepares for the recording processing, and, on the basis of the FAT information, identifies free cluster positions.

Although not shown, the camera block 4 has a lens, a CCD (Charge Coupled Device), and a microphone for example, converts the image of an object supplied through the lens into a video signal through the CCD, converts the video signal into a digital video signal, picks up voice through the microphone, converts it into en electrical signal, and converts this electrical signal into a digital audio signal, thereby outputting AV data composed of these digital signals.

The AV data outputted from the camera block 4 are supplied to the encoder/decoder 6 through the switch circuit 5. The encoder/decoder 6 compresses the supplied AV data by encoding the AV data by a predetermined encoding scheme such as MPEG (Moving Picture Experts Group) for example and supplies the encoded AV data to the buffer memory circuit (hereafter referred to simply as the buffer) 8 through the switch circuit 7.

The host CPU 13 controls the data read/write operation of the buffer 8. Therefore, the AV data supplied from the switch circuit 7 are written to the buffer 8 under the control of the host CPU 13 and, at the same time, the AV data written to the buffer 8 are read. Namely, in the recording/reproducing apparatus of this embodiment, the use of the buffer 8 allows the time-axis correction of the AV data between this recording/reproducing apparatus and the hard disk 11 which is a recording medium, which are asynchronous with each other.

It should be noted that, if the content data (information signals) to be recorded are realtime data composed of moving picture information and audio information such as AV data, a method is employed in which the content data are read while being written to the buffer 8, namely a so-called first-in/first-out method is employed.

In this case, in related-art recording/reproducing apparatuses, if the buffer 8 underflows or overflows, information signal continuity is disrupted to fail normal recording. In the recording/reproducing apparatus of this embodiment, a measure is taken to prevent this problem from occurring, which will be described later in detail.

The camera block 4 is capable of not only taking moving pictures but also taking an object as a still picture as specified by the user. The digital input terminal 3 is capable of accepting not only moving picture information but also still picture information.

At the recording of still pictures, the content data are all stored in the RAM 16 for example connected to the host CPU 13 before being written to a recording medium. Therefore, the recording of still pictures does not require the realtime processing unlike the recording of moving pictures.

The AV data read from the buffer 8 under the control of the host CPU 13 are supplied to the hard disk 11 through a switch circuit 9 and the media controller 10 and, on the basis of the free cluster position detected above, written sequentially to the free area. It should be noted that, at the writing of the AV data to the hard disk 11, the switch circuit 9 is set to the input terminal "a" side by the host CPU 13.

At the recording of information signals, the switch circuit 9 is periodically set to the input terminal "b" side and the host CPU 13 updates FAT information. When the recording of AV data has ended, the switch circuit 9 is also set to the input terminal "b" side for the updating of the FAT information and the directory entry information by the host CPU 13.

The AV data composed of moving picture and voice captured through the camera block 4 as described above are recorded to free clusters in the hard disk 11. The information signals supplied through the digital input terminal 3 are also recorded like the information signals captured through the camera block 4.

Further, IT data, which are supplied through the digital input/output terminal 1, need not be encoded, so that IT data are directly supplied to the buffer 8 through the switch circuit 7, subsequently being processing in generally the same manner as the above-mentioned recording of AV data.

In this example, the hard disk 11 is used to record information signals; it will be apparent that generally the same processing takes place when the semiconductor memory 12 is used to record information signals.

[Flow of Information Signals (Data) at Reproduction]

The following describes the flow of information signals at the reproduction on the recording/reproducing apparatus of this embodiment. It should be noted that, as described above, an example is used in which information signals recorded to the hard disk 11 are reproduced.

Accepting the input of the instruction for reproduction by the user through the key operation block 14, the host CPU 13 sets the switch circuit 9 to the input terminal "b" side and accesses a logical address on the hard disk 11 through the media controller 10 to obtain the management information, FAT information, and directory entry information formed on the hard disk 11 as shown in FIG. 2A.

Then, on the basis of the obtained directory entry information and so on, the host CPU 13 displays a list of files, which are recorded to the hard disk 11 and are reproducible, onto an LCD (Liquid Crystal Display), not shown, thereby allowing the user to selectively input files to be reproduced.

Accepting, through the key operation block 14, the input of the selection of a file to be reproduced, the host CPU 13 identifies the recording position on the hard disk 11 of the file to be reproduced from the obtained directory entry and FAT information, obtains the type of the file, sets the switch circuit 9 to the input/output terminal "a" side, and according to the type of the file, sets the switch circuit 7 to the input/output terminal "a" side or the input/output terminal "b" side.

Next, the host CPU 13 controls the media controller 10 to read information signals from the desired file stored on the hard disk 11 and write these information signals to the buffer 8 through the media controller 10 and the switch circuit 9.

As described above, the buffer 8 is controlled by the host CPU 13 in data read/write operations, the data read from the hard disk 11 being written to the buffer 8 and the data already written to the buffer 8 being read therefrom. The use of the buffer 8 allows the time-axis correction of the information signals to be reproduced at the time of reproduction as with the time-axis correction to be executed at the time of recording.

If the information signals read from the buffer 8 are so-called IT such as text data, the IT data read from the hard disk 11 are outputted through the digital input/output terminal 1 because the switch circuit 7 is set to the input/output terminal "a" side.

If the information signals read from the buffer 8 are other than IT data, namely if they are moving picture information or still picture information, the switch circuit is set to the input/output terminal "b" side. Therefore, these information signals are supplied to the encoder/decoder 6 through the switch circuit 7 to be decoded into the original AV data and still picture information, which are outputted from the digital output terminal 2.

Then, the information signals outputted from the digital input/output terminal 1 or the digital output terminal 2 are supplied to a personal computer for example to be displayed thereon, recorded on a separate recording medium, or otherwise used for various other purposes.

As described, in the recording/reproducing apparatus of this embodiment, information signals recorded to the hard disk 11 are read, these information signals are decoded or otherwise processed, and the processed information signals are outputted for reproduction.

It should be noted that, in the present example, the information signals recorded to the hard disk 11 as files is reproduced. It is apparent that the reproduction of the information signals recorded to the semiconductor memory 12 as files is also executed in generally the same manner.

Although not shown in FIG. 1, the recording/reproducing apparatus of this embodiment has an LCD having a comparatively large display screen and an LCD controller to display necessary information such as selections and various messages, as described above, and is also adapted to display reproduced images in accordance with the information signals read from the hard disk 11 or the semiconductor memory 12 and display images taken through the camera block 4.

Thus, the recording/reproducing apparatus of this embodiment receives the supply of moving picture information, still picture information, and IT data, records these to the hard disk 11 or the semiconductor memory 12, which is detachable, and reproduces the recorded information signals by reading them therefrom. In this case, the use of the FAT file system facilitates the management of collections of information signals, which are recorded as files.

Because the hard disk 11 and the semiconductor memory 12 as recording media are detachable, so that they may be connected to other electronic devices directly or via an adaptor for data exchange. It should be noted that the data exchange herein denotes the reproduction, by other electronic devices such as personal computers for example, of various information signals such as AV data for example recorded by this recording/reproducing apparatus or the reproduction by this recording/reproducing apparatus of various information signals recorded by other electronic devices such as personal computers for example.

[Selection of Recording Methods in Accordance with Data to be Recorded]

As described above, the recording/reproducing apparatus of this embodiment is capable of processing moving picture information, still picture information, and IT data such as text data. However, the realtime processing of moving picture information must increase the data transfer rate at the time of recording and reproduction.

However, it is not desirable to increase the load of the host CPU 13 to meet this requirement. It is also undesirable to limit the efficient use of the storage areas on the hard disk 11 and semiconductor memory 12 to meet this requirement. Therefore, the recording/reproducing apparatus of this embodiment uses different recording methods for the recording of moving picture information and the recording of still picture information and IT data.

In the FAT file system, the minimum recording unit is cluster. When this FAT file system is used, three recording methods, "general type", "grid type", and "padded type" are possible.

"General type" records on a cluster basis as the normal FAT file system. On personal computers, the recording is executed as "general type".

"Grid type" is one of the methods handling a plurality of clusters as one block, in which each recording medium is regularly divided into blocks of a same size like a checkerboard and the recording is executed in units of these blocks. Therefore, the blocks are regularly formed on each recording medium, so that the correct position of each block on each recording medium may be identified always correctly.

"Padded type" is another of the above-mentioned methods handling a plurality of clusters as one block, in which, if there are continuous free areas for the specified number of clusters, these areas are provided as usable blocks for recording information signals. Therefore, unlike "grid type", this "padded type" requires to detect the continuous free clusters for the predetermined number for forming block at the time of recording.

FIG. 3 illustrates each of "general type", "grid type", and "padded type", in which 8 clusters are handled as one block.

In FIG. 3, blocks a, b, c, d, e, f, . . . are equivalent to the blocks regularly arranged when "grid type" is used as the recording method.

As described above, "general type" executes recording on a cluster basis and it is assumed that 4 shaded clusters, the first half of block a, 4 shaded clusters, the last half of block b, first 2 clusters of block c, and 3 shaded clusters starting with the fourth cluster from the beginning of block e as shown in FIG. 3(A) be written with information signals in advance.

In this state shown in FIG. 3(A), recording information signals by "grid type" requires to detect free blocks in units of blocks a, b, c, d, e, f, . . . each regularly configured by 8 clusters. In this case, blocks a, b, c, and e have free clusters but some of them are in use as shown in FIG. 3(B), so that these blocks are used blocks, which cannot be used by "grid type". However, block d and block f have no used clusters, so that "grid type" may be used.

Namely, in the case of "grid type", the block partitioning is regularly uniquely determined as shown in FIG. 3(B), the block boundaries subsequently kept unchanged. In recording on a block basis, a particular block is recordable only when all clusters in that block are free; therefore, if there is any one cluster in use, that block is handled as unrecordable.

In recording information signals by "padded type", only a portion in which 8 continuous clusters are free and which may be used as 1-block free area is used. Therefore, in recording information signals by this "padded type", the block boundary shifts depending on the usage status of the recording medium such as a hard disk as shown in FIG. 3(C).

In recording information signals by "general type", recording is executed in unit of one cluster, so that all of unused clusters except the used clusters shown in FIG. 3(A) may be used for recording information signals.

Thus, in recording on a block basis by use of "grid type" or "padded type", only the blocks each formed by all free clusters are recordable; therefore, if there is any one used cluster, the block having such a cluster is handled as unrecordable with information signals.

The features of "general type", "grid type", and "padded type" recording methods described with reference to FIG. 3 may be summarized as shown in FIG. 4. As shown in "general type" shown in FIG. 4, in "general type" recording method, recording is executed on a cluster basis, so that, in recording realtime data such as moving picture information, the transfer rate may not become fast enough, thereby causing a trouble, making the recording of realtime data impossible to be exact.

In the case of "general type" recording, the processing is executed on a cluster basis, so that the processing time is comparatively long; however, because recording is executed in unit of cluster, which is the minimum recording unit, the usage efficiency of recording media is high. When the reproduction, on recording/reproducing apparatuses, of content such as AV data recorded by personal computers is taken into consideration, it is essential for the recording/reproducing apparatuses to have the capabilities of reproducing content such as AV data recorded by "general type" recording because the recording on personal computers are executed by "general type" recording.

In the case of "grid type" recording, as shown in "grid type" column of FIG. 4, recording is executed in units of blocks (in units of continuous blocks), which is regularly uniquely determined, so that the processing by the host CPU may be executed comparatively with ease and the transfer rate may be increased, thereby making it practical enough for recording realtime data such as moving picture information onto recording media without generating discontinuity in these data. In the case of "grid type" recording, recording is executed on a block basis, so that the processing time is comparatively short (a short processing time).

However, all clusters in each regularly uniquely determined block must be unused and, if any one of the clusters forming a block is used, that block cannot be used anymore, so that the usage efficiency of recording media is low.

When content recorded by personal computers is reproduced on recording/reproducing apparatuses, it is not enough for installing the "grid type" reproduction capabilities on recording/reproducing apparatuses because the recording by personal computers is executed by "general type" recording; therefore it is essential to install the "general type" reproduction capabilities on recording/reproducing apparatuses.

In the case of "padded type" recording, as shown in "padded type" column of FIG. 4, recording is not executed in units of regularly uniquely determined blocks (in units of continuous blocks) like "grid type" recording; however, because recording is executed on a block basis as with "grid type", the processing by the host CPU may be executed comparatively with ease and the transfer rate may be increased, thereby making it practical enough for recording realtime data such as moving picture information onto recording media without generating discontinuity in these data.

However, in the case of "padded type" recording, a free block composed of a plurality of continuous clusters must be detected, so that the processing time is longer than that of "grid type". Namely, a long processing time will result. Also, in the case of "padded type", the boundary of free blocks is not restricted as with "grid type", so that the usage efficiency of recording media is approximately intermediate between "general type" and "grid type".

When content recorded by personal computers is reproduced on recording/reproducing apparatuses, it is not enough for installing the "padded type" reproduction capabilities on recording/reproducing apparatuses because the recording by personal computers is executed by "general type" recording; therefore it is essential to install the "general type" reproduction capabilities on recording/reproducing apparatuses.

When the above-mentioned conditions are totally taken into account, selective use of recording methods such as use of "grid type" recording for recording realtime data like moving picture information and use of "general type" recording for recording still picture information and IT data may increase the transfer rate, mitigate the load of the host CPU, increase the usage efficiency of recording media, and enhance the ease of exchangeability (compatibility) of information signals (data) with personal computers for example.

When the exchanging of data with personal computers for example is assumed, any cumbersome operation such as the installation of a new file system does not take place because the recording/reproducing apparatus of the first embodiment also uses the same file system as that used on personal computers.

Figure 5:
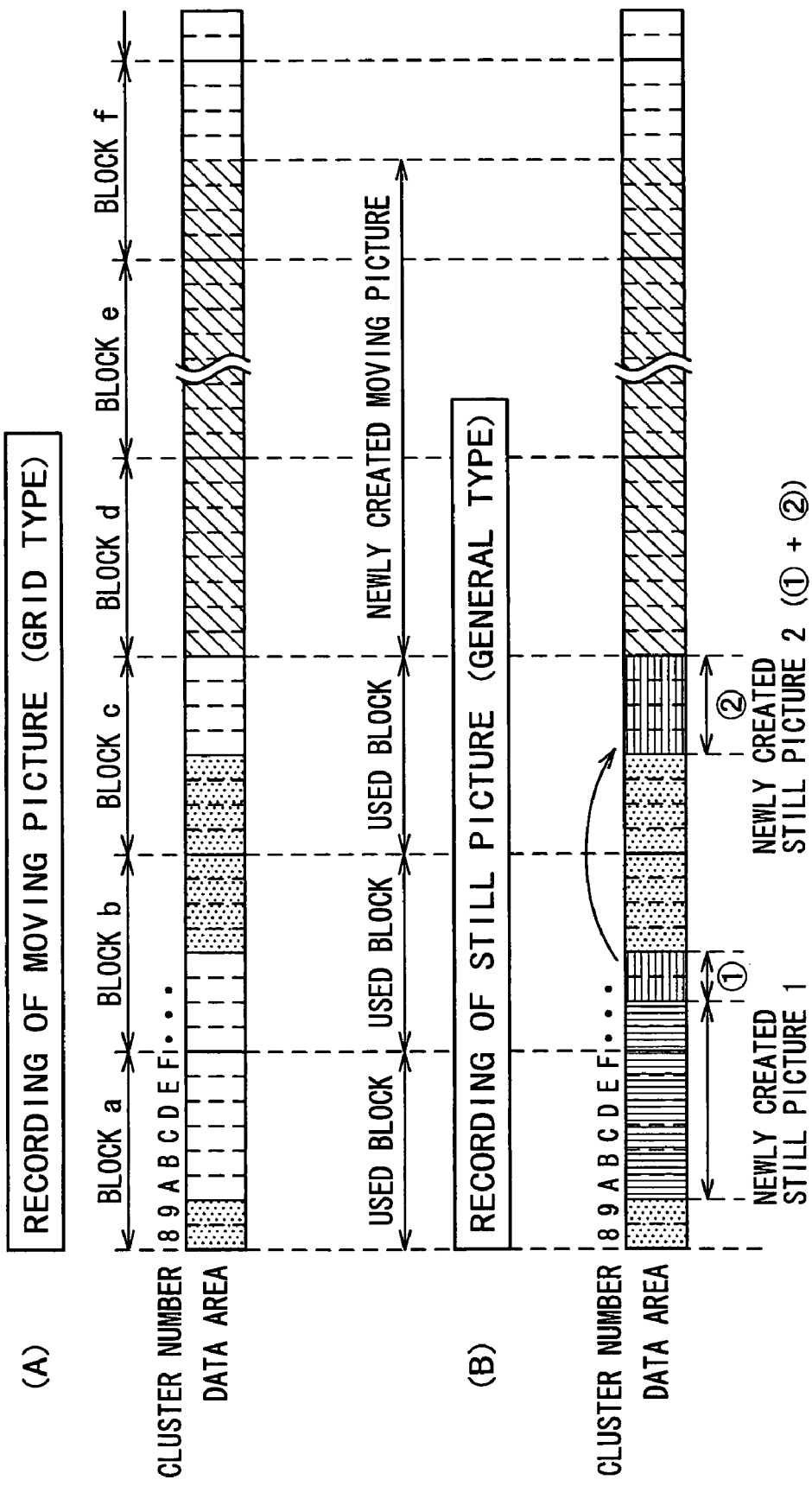
FIG. 5 shows examples in which moving picture recording is executed by "grid type" recording used in the recording/reproducing apparatus shown in FIG. 1 and still picture and IT data recording is executed by "general type" recording.

Hence, in the recording/reproducing apparatus of the first embodiment, "grid type" recording and "general type" recording are selectively used for recording moving picture information and other information signals. FIG. 5 shows an example in which "grid type" recording and "general type" recording are selectively used.

As shown in FIG. 5, in the recording/reproducing apparatus of the first embodiment, many regularly uniquely determined blocks are allocated beforehand to the storage areas of the hard disk or semiconductor memory card loaded on this apparatus like blocks a, b, c, d, e, f, and so on. It should be noted that one block is composed of 8 clusters also in the example shown in FIG. 5.

In the example shown in FIG. 5, the shadowed portions, namely the first 2 clusters in block a, the last 4 clusters in block b, and the first 4 clusters in block c denote the used clustered to which still picture information for example has been recorded by "general type" recording. Therefore, in terms of blocks, blocks a, b, and c are used blocks as shown in FIG. 5(A).

When AV data, which are real time data including moving picture information and audio information of which amount is huge, are recorded, the recording/reproducing apparatus of the first embodiment records data by "grid type" recording, so that these AV data are recorded in block d and subsequent blocks on a block basis as shown in FIG. 5(A).

Thus, use of "grid type" recording allows to assure a high transfer rate, continuously properly record realtime data without discontinuity, and shorten the processing time, thereby mitigating the load of the post CPU as described above.

However, in this situation, the unused clusters of used blocks a, b, and c are not used, possibly lowering the usage efficiency of recording media.

To avoid such a problem, the recording/reproducing apparatus of the first embodiment is adapted to use "general type" recording, which is the basic recording method, for still picture information and IT data, which are comparatively low in data amount, as shown in FIG. 5(B). Consequently, in this example, still picture information and IT data are recorded to the free clusters in blocks a, b, and c. This allows to reduce the chances of generating unused clusters in used blocks, thereby enhancing the usage efficiency of recording media.

[Recording and Reproduction Operations]

Figure 6:
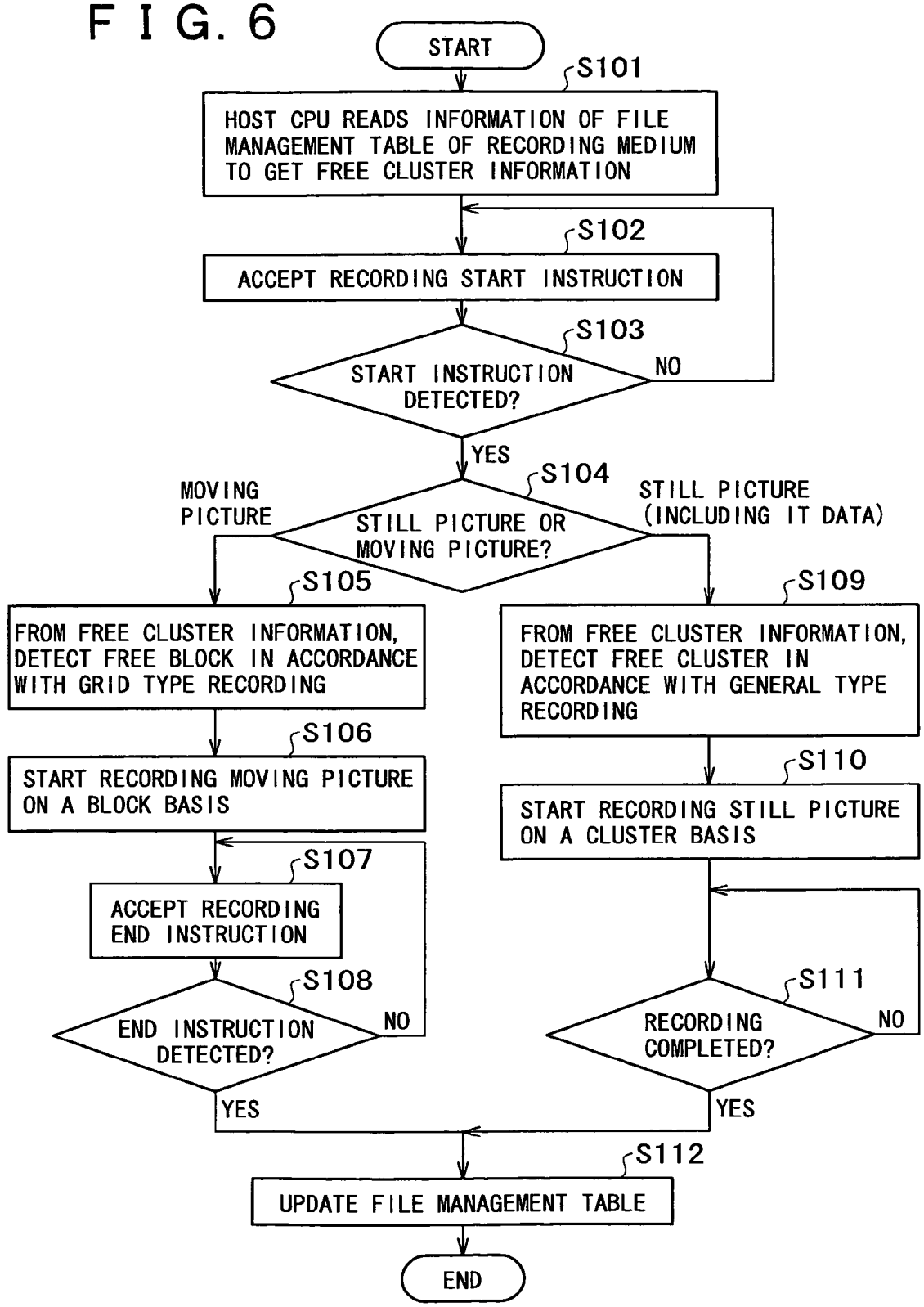
FIG. 6 is a flowchart indicative of the processing to be executed at the recording on the recording/reproducing apparatus shown in FIG. 1.
Figure 7:
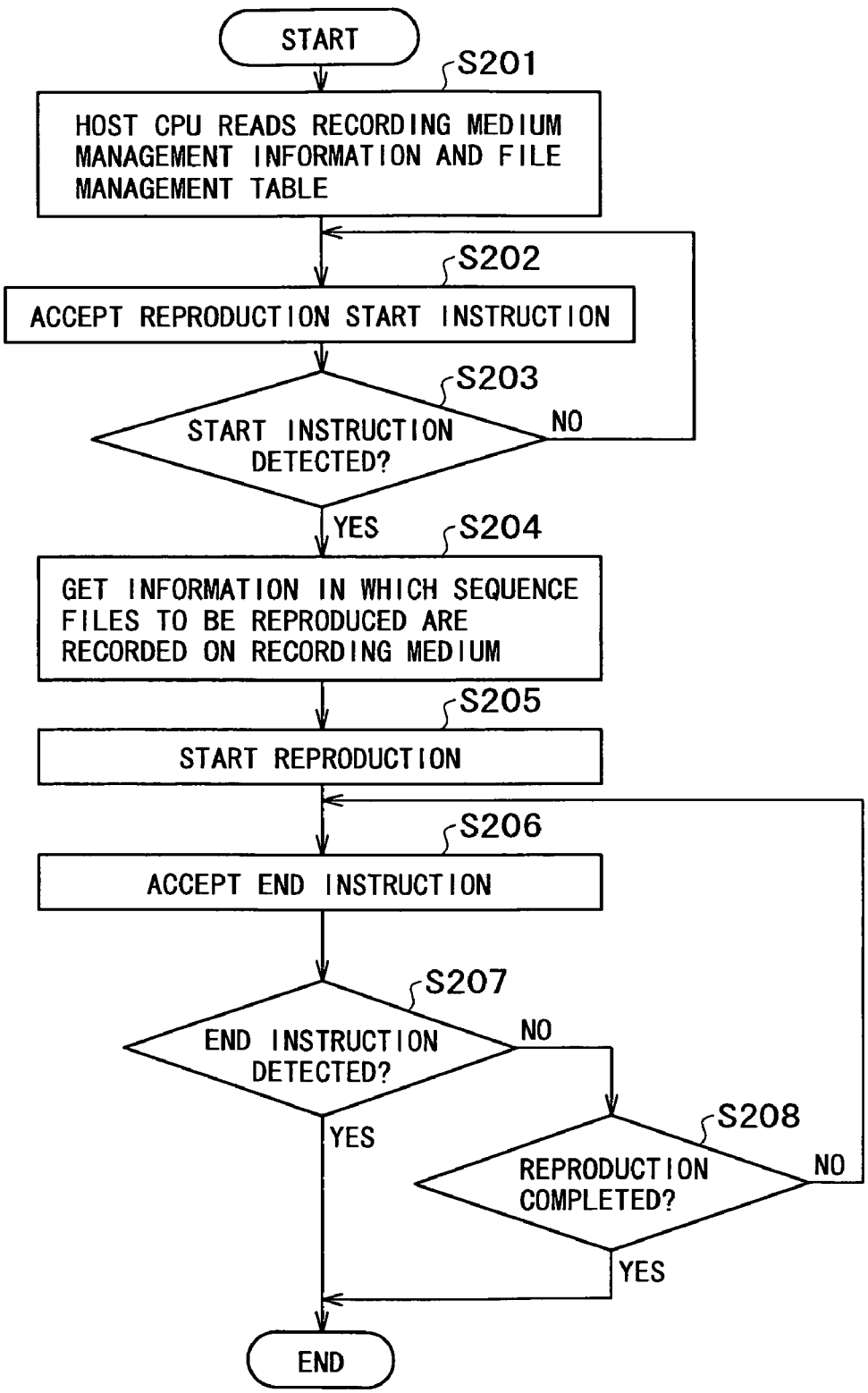
FIG. 7 is a flowchart indicative of the processing to be executed at the reproduction on the recording/reproducing apparatus shown in FIG. 1.

The following describes, with reference to the flowcharts shown in FIGS. 6 and 7, the operation to be executed at the time of recording by the present embodiment that selectively uses "grid type" recording and "general type" recording and the operation to be executed at the time of reproduction of information signals that are recorded to recording media by selective use of "grid type" recording and "general type" recording.

[Operation at Recording]

FIG. 6 is the flowchart for describing the operation of the recording/reproducing apparatus of the first embodiment at the time of recording. As described above, when the input terminal and the recording medium to be used are selected, the host CPU 13 executes the processing shown in FIG. 6. First, the host CPU 13 references the file management table of the specified recording medium, namely the FAT information, through the switch circuit 9 and the media controller 10 to get free cluster information (step S101).

Next, the host CPU 13 starts accepting the input of a recording start instruction through the key operation block 14 (step S102) and determines whether the input of a recording start instruction has been accepted (step S103). If the input of a recording start instruction is found not accepted in the decision processing of step S103, then the host CPU 13 repeats the above-mentioned processing from step S102.

If the input of a recording start instruction is found accepted in the decision processing of step S103, the host CPU 13, on the basis of a selective instruction at the input terminal from the user and the information such as the header of a supplied information signal, determines whether the information signal to be recorded includes moving picture information or is still picture information or IT data rather than moving picture information (step S104).

If the information signal to be recorded is found to be moving picture information or realtime data such as AV data in the decision processing of step S104, then the host CPU 13 detects each free block of which clusters are all free, the block being regularly arranged beforehand in accordance with "grid type" recording from the free cluster information obtained in step S101 (step S105).

Next, the host CPU 13 controls the encoder/decoder 6, the buffer 8, the media controller 10, and associated switch circuits to start recording realtime data such as moving picture information in units of free blocks (step S106). Then, the host CPU 13 accepts the input of a recording end instruction from the user through the key operation block 14 (step S107) and determines whether the input of a recording end instruction has been accepted (step S108).

If the input of a recording end instruction is found not accepted in the decision processing of step S108, then the host CPU 13 repeats the above-mentioned processing from step S107. If the input of a recording end instruction is found accepted in the decision processing of step S108, the host CPU 13 updates the FAT information, which is the file management table, and the directory entry information (step S112), thereby ending the processing shown in FIG. 6.

If the information signal to be recorded is found to be still picture information or IT data in the decision processing of step S104, then the host CPU 13 detects free clusters in accordance with "general type" recording from the free cluster information obtained in step S101 (step S109).

Next, the host CPU 13 controls the encoder/decoder 6, the buffer 8, the media controller 10, and associated switch circuits to start the recording of the still picture information or IT data in units of free clusters (step S110). Then, the host CPU 13 determines whether the recording of still picture information or IT data has come to an end (step S111).

If the recording of the still picture information or IT data is found not ended in step S111, then the host CPU 13 repeats the above-mentioned processing of step S111 and gets in a wait state until this recording has come to an end. If the recording of still picture information or the like is found ended in the decision processing of step S111, the host CPU 13 updates the FAT information, which is the file management table, and the directory entry information (step S112), thereby ending the processing shown in FIG. 6.

As described above, in order to record moving picture information and AV data, which are heavy in information amount and must be processed realtime, onto recording media, "grid type" recording is used, while "general type" recording is used for recording information other than realtime data such as moving picture information.

Consequently, as described above, when realtime data such as moving picture information are recorded, the transfer rate may be increased high enough, thereby preventing the discontinuity of realtime data from being generated and mitigating the load of the host CPU by the recording in units of regularly arranged blocks. Moreover, the selective use of "grid type" recording and "general type" recording allows the efficient use of recording media.

[Operation at Reproduction]

The following describes the operation to be executed at the time of reproduction. FIG. 7 shows the flowchart for describing the operation to be executed at the time of reproduction by the recording/reproducing apparatus of the first embodiment. Accepting the operation for putting the recording/reproducing apparatus into the reproduction mode through the key operation block 14, the host CPU 13 starts the processing shown in FIG. 7 to read the management information, the FAT information, which is the file management table, and the directory entry information and display a list of files, which may be reproduced onto an LCD for example arranged on this recording/reproducing apparatus (step S201), thereby accepting the input of a reproduction start instruction for a desired file (step S202).

Next, the host CPU 13 determines whether the input of a reproduction instruction has been accepted (step S203). If the input of a reproduction instruction is found not accepted, then the host CPU 13 repeats the above-mentioned processing from step S202.

If the input of a reproduction instruction is found accepted in the decision processing of step S203, then the host CPU 13 gets the information in which sequence the files to be reproduced are recorded on the recording medium, on the basis of the FAT information and so on read in step S201 (step S204).

Next, the host CPU 13 traces the clusters on the recording medium in the sequence based on the information obtained in step S204 to execute a reproduction operation (step S205). Then, the host CPU 13 starts accepting the input of a reproduction end instruction through the key operation block 14 (step S206) and determines whether the input of a reproduction end instruction has been accepted (step S207).

If the input of a reproduction end instruction is found accepted in the decision processing of step S207, the host CPU 13 ends the reproduction operation, thereby ending the processing shown in FIG. 7. If the input of a reproduction end instruction is found not accepted in the decision processing of step S207, then the host CPU 13 determines whether all data in the specified file have been reproduced (step S208).

If not all the data are found reproduced in the decision processing of step S208, then the host CPU 13 repeats the above-mentioned processing from step S206. If all the data are found reproduced in the decision processing of step S208, then the host CPU 13 ends the reproduction operation and ends the processing shown in FIG. 7.

Thus, at the time of reproduction, files may be reproduced without differentiating whether they are recorded by "grid type" recording or "general type" recording, namely without determining whether the file to be reproduced is realtime data such as moving picture information or non-realtime data such as still picture information or IT data.

Moreover, files may be reproduced without determining whether they were recorded on the recording/reproducing apparatus of the first embodiment or on an other device than the recording/reproducing apparatus of the first embodiment.

Files may be reproduced without determining the recording method used or the device on which they were recorded because, even if a file was recorded by "grid type" recording, the recording is executed in unit of a block composed of a plurality of clusters, which are the minimum recording unit, but the FAT information is managed in its link relationship on a cluster basis as is conventionally practiced, thereby making reproduction practicable without distinction between the recording types and between the devices on which the files were actually recorded.

As described above, the recording/reproducing apparatus of the first embodiment uses the FAT file system as its file management system, so that this recording/reproducing apparatus is highly compatible with personal computers for example and therefore the hard disk 11 and semiconductor memory 12 on which information signals are recorded by use of this recording/reproducing apparatus may be connected to any devices such as personal computers that execute the file management by the FAT file system, thereby facilitating the use of information signals.

Conversely, if a hard disk or a semiconductor memory card on which information signals are recorded by external devices such as personal computers is loaded on the recording/reproducing apparatus of the first embodiment, these information signals may be used with ease. Namely, the recording/reproducing apparatus of the first embodiment and external devices such as personal computers share the same file system, so that the file management may be executed with a same algorithm, thereby saving the time and labor otherwise required for the installation of new file systems.

[Second Embodiment] (refer to FIGS. 1, 2, FIG. 8A through FIG. 15B)

In the recording/reproducing apparatus of the first embodiment described above, "grid type" recording is used as its recording method to enhance the transfer rate of realtime data such as moving picture data at the time of recording. However, the recording/reproducing apparatuses using FAT file systems are characterized by a comparatively low data access speed at the time of reproduction as well as a low random access performance.

The recording/reproducing apparatus of this second embodiment is adapted to improve the above-mentioned low data access speed at the time of reproduction as well as the above-mentioned low random access performance, thereby smoothly reproducing recorded information and enhancing the random access performance.

The recording/reproducing apparatus of the second embodiment, configured in generally the same manner as the recording/reproducing apparatus of the first embodiment shown in FIG. 1, executes its file management by use of the FAT file system described with reference to FIGS. 2A through 2C as with the recording/reproducing apparatus of the first embodiment shown in FIG. 1. Hence, the description will be made on the assumption that the recording/reproducing apparatus of the second embodiment also has the configuration shown in FIG. 1 and the FAT file system shown in FIGS. 2A through 2C.

FIG. 8A and FIG. 8B illustrate FAT information and data area. As described above, FAT information formed in the recording areas of hard disks and semiconductor memory cards is a table indicative of which cluster is used in which sequence to store files.

As shown in FIG. 8A, each address corresponds to each cluster and indicates which cluster is to be used next sequentially. Therefore, if the FAT information is formed as shown in FIG. 8A, a file is stored in the order of cluster 03, cluster 24, and cluster 25.

In the process in which a desired file is accessed in the forward search direction of a cluster chain by use of the FAT information, the FAT information recorded on the recording medium must be accessed repeatedly, resulting in a comparatively low data access speed at the time of reproduction. In a so-called reverse jump such as fast-rewind, the file pointer is set to the beginning of each cluster chain (the start cluster of that file) and forward direction search is executed starting from that file pointer, resulting in a low random access performance.

To solve these problems, a method is proposed in which necessary information such as FAT information is stored in a built-in memory for example of the recording/reproducing apparatus on a file basis, thereby making it unnecessary to reference every time the FAT information and so on stored on a hard disk for example. In this case, the files must be managed individually, so that a memory area must be arranged, which has a memory capacity enough for the maximum size of each file to be handled for the memory area for holding the FAT information of each file.

In this approach, a storage area having the same storage capacity is used for each file for the management of FAT information and so on, thereby providing an advantage of simple memory management and an efficient operation unless there is a large difference (a width) between the sizes or numbers of files to be handled.

However, because the recording media recorded with moving pictures are characterized by a large file size and a large number of files, this above-mentioned approach requires a very large memory capacity. In addition, is an enough memory capacity cannot be allocated, the number of files, which can be handled, is limited.

To avoid the above-mentioned problems, when a recording medium such as a hard disk or a semiconductor memory card is loaded, the recording/reproducing apparatus of the second embodiment references the FAT information of the loaded recording medium by the time of the first file reproduction access to form a cluster link table (a link information table), which has only the link information of clusters.

FIGS. 10A through 10C illustrate a cluster link table and so on. FIG. 10A shows FAT information formed on a recording medium such as a hard disk, which is referenced to form a cluster link table as shown in FIG. 10B, which indicates a link relationship for each file.

As with the examples shown in FIGS. 8A and 8B, FIG. 10A shows that a file is recorded starting with cluster 02 and in cluster 03, cluster 24, and cluster 25 in this order. From the FAT information shown in FIG. 10A, a cluster link table composed of a file name as index information and the link information of the clusters constituting this file is formed in the RAM 16 or the nonvolatile memory 17 in advance as shown in FIG. 10B.

In this case, as shown in FIG. 10C, the memory area for storing the cluster link table for each file is automatically allocated in accordance with the size of the file concerned. By thus allocating cluster link tables in memory with no space in between, waste area is not formed in memory, thereby providing the effective use of the memory having limited capacity.

In addition, by allocating a memory area of more than certain amount of storage capacity, the number of files, which can be handled at the same time, may be made limitless. The dynamic allocation of the storage area for the cluster link table to be formed in accordance with the link information of the FAT information of each file to the memory in accordance with the data amount of each file requires sophisticated memory management processing.

However, the number of files and the file size to be recorded on a hard disk for handling are determined as a matter of course in accordance with the storage capacity of the recording medium; therefore the file size and the number of files will not take large values at the same time. Regardless of the size and number of files stored on a recording medium, a total of all storage capacities for all files falls within the total storage capacity of the recording medium.

Namely, the capacity of the cluster link tables of all files will not exceed the capacity of the FAT information. Because the upper limit of the size of the memory used is apparent as the capacity of the FAT information, allocation of a memory of this size may accommodate the cluster link tables of all files in the memory by executing memory allocation by dividing the allocated memory. In this case, the problem of memory capacity shortage will not take place.

Sometimes, if the storage capacity of a memory to be allocated is small, the limitation due to the capacity shortage may appear in the form of "limitation of the total value at the time of reproduction of moving picture files, which can be handled by the recording/reproducing apparatus concerned at the same time", which characterizes that recording/reproducing apparatus and, if necessary, allows to take a measure such as adding a memory for example.

[Generation and use of Cluster Link Table (Link Information Table)]

Figure 12:
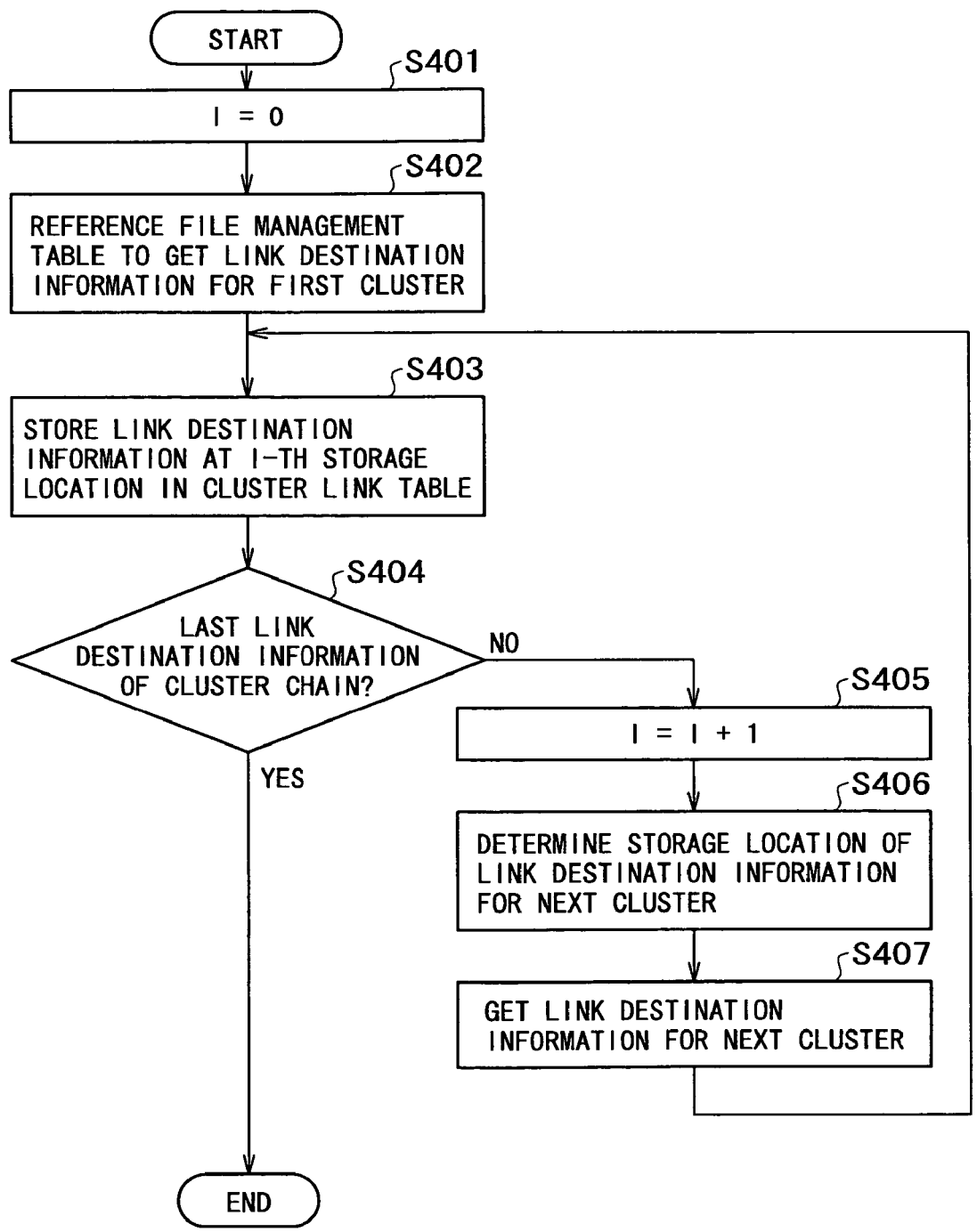
FIG. 12 is a flowchart indicative of the processing for generating a cluster link table formed from FAT information in the recording/reproducing apparatus shown in FIG. 1.
Figure 13:
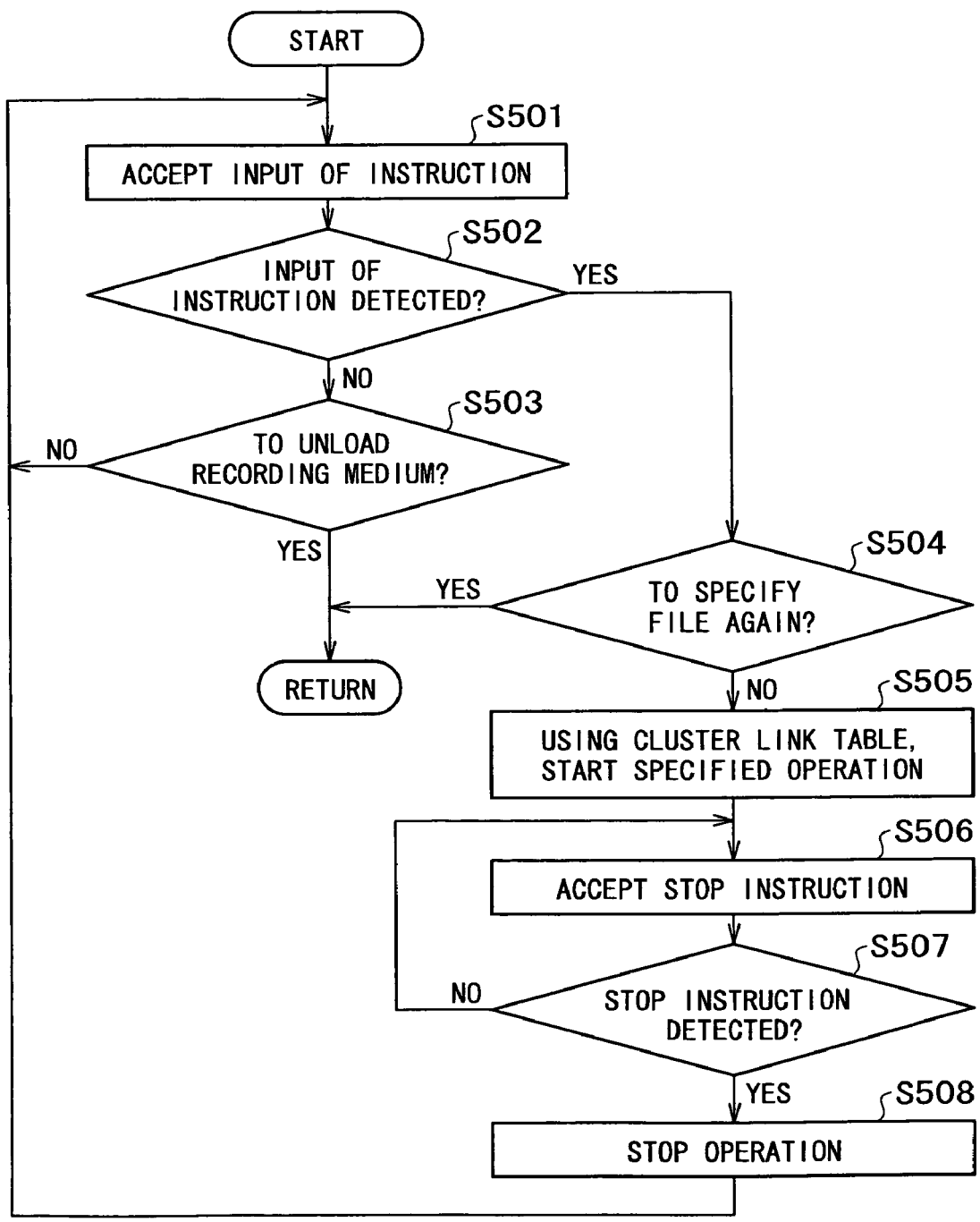
FIG. 13 is a flowchart indicative of the reproduction, fast-forward, and fast-rewind operations to be executed in the reproduction mode in the recording/reproducing apparatus shown in FIG. 1.

The following describes the generation and use of a cluster link table to be executed on the recording/reproducing apparatus of the second embodiment with reference to the flowcharts shown in FIGS. 11 through 13. The generation of a cluster link table is executed before the use of information signals recorded on a recording medium and the generated cluster link table is used at the use of the information signals recorded on the recording medium for reproduction, fast-forward, and fast-rewind for example.

FIG. 11 shows a flowchart for describing the processing to be executed at the use (reproduction, fast-forward, and fast-rewind) of the information signals recorded on a recording medium in the recording/reproducing apparatus of the second embodiment. Like the recording/reproducing apparatus of the first embodiment, the recording/reproducing apparatus of the second embodiment may also record and reproduce the information signals to and from the recording medium.

When the recording/reproducing apparatus of the second embodiment is put in the reproduction mode by the user through the key operation block 14 for example, the host CPU 13 executes the processing shown in FIG. 11. First, the host CPU 13 determines whether a recording medium is loaded on its own apparatus (step S301).

If a recording medium is found not yet loaded in the decision process of step S301, then the host CPU 13 repeats the above-mentioned processing from step S301. If a recording medium is found loaded in the decision process of step S301, then the host CPU 13 references the directory entry information and the FAT information of the loaded recording medium and displays a list of available files onto the LCD of its own apparatus, thereby making it ready for accepting the specification (the input of specification) for a desired file (step S302).

Next, the host CPU 13 determines whether the specification for a desired file has been accepted (step S303). If the file specification is found not accepted in the decision process of step S303, then the host CPU 13 determines whether the recording medium has been unloaded (step S304).

If the recording medium is found not unloaded in the decision process of step S304, then the host CPU 13 repeats the above-mentioned processing from S302; if the recording medium is found unloaded, the host CPU 13 repeats the above-mentioned processing from step S301.

If the file specification is found accepted in the decision process of step S303, then the host CPU 13 executes the processing of generating a cluster link table of the specified file (step S305) and then executes a specified operation routine such as reproduction, fast-forward, or fast-rewind by the use of the generated cluster link table (step S306). When the specified operation routine has been completed, the host CPU 13 repeats the above-mentioned processing from step S301, thereby making it ready for changing files to be used.

[Generation of Cluster Link Tables]

FIG. 12 shows a flowchart indicative of the processing of generating a cluster link table to be executed in the process of step S305 shown in FIG. 11. First, the host CPU 13 sets variable I to be used for the generation of a cluster link table to 0 to initialize variable I (step S401).

Next, the host CPU 13 references the FAT information of a file specified for use, which is the file management table formed on the recording medium, as shown in FIG. 10A for example, thereby obtaining the link destination information for the first cluster of that file (step S402)

Then, the host CPU 13 stores the link destination information obtained in step S402 into I-th storage location in the cluster link table formed in the RAM 16 for example (step S403) in a manner as shown in FIG. 10B. Next, the host CPU 13 determines whether the last link destination information of the specified file has been stored (step S404).

If the last link destination information is found not stored in the decision process of step S404, then the host CPU 13 adds 1 to variable I (step S405) and, on the basis of the current link destination information, determines the storage location for the next link destination information (step S406). Then, the host CPU 13 gets the link destination information for the next cluster from the storage location determined in step S406 (step S407) and repeats the above-mentioned processing from step S403.

Thus, the cluster link table composed of the link destination information for specifying clusters on the recording medium on which the data about the specified file are recorded is formed. Then, if the last link destination information of the specified file is determined to be stored in the cluster link table in the decision process of step S404, the host CPU 13 ends the processing shown in FIG. 12, thereby returning to the process shown in FIG. 11.

[Use of Cluster Link Tables]

FIG. 13 shows an operation of the recording/reproducing apparatus of the second embodiment by actually using a generated cluster link table. The operation is executed in step S306 shown in FIG. 11. As described above, when the cluster link table of the specified file has been generated, the host CPU 13 starts the processing shown in FIG. 13 in step S306 shown in FIG. 11.

First, the host CPU 13 accepts the input of instruction for instructing the execution of the operation for using the cluster table such as of a reproduction key, a fast-forward key, and a fast-rewind key (step S501). Next, the host CPU 13 determines whether the input of instruction has been accepted (step S502).

If the input of instruction is found not accepted in the decision process of step S502, the host CPU 13 determines whether the recording medium has been unloaded (step S503). If the recording medium is found not unloaded in the decision process of step S503, then the host CPU 13 repeats the above-mentioned processing from step S501; if the recording medium is found unloaded, the host CPU 13 ends the processing shown in FIG. 13, thereby returning to the processing shown in FIG. 11 to repeat the above-mentioned processing from step S301.

If the input of instruction is found accepted in the decision process of step S502, the host CPU 13 determines whether a file re-specification (the input of changing files to be processed) has been accepted (step S504). If the file re-specification is found issued in the decision process of step S504, then the host CPU 13 ends the processing shown in FIG. 13, thereby returning to the processing shown in FIG. 11 to repeat the above-mentioned processing from step S301.

If the accepted instruction input is found not to be the file re-specification in the decision process of step S504, then the host CPU 13 starts the operation specified by use of the cluster link table of that file formed in the RAM 16 (step S505).

FIG. 14A through FIG. 14B show operations to be executed by use of the cluster link table in step S505. If the instruction input accepted in step S501 is the input of a reproduction instruction (the pressing of the reproduction key), the host CPU 13 sequentially references the cluster link tables stored in the RAM 16 as shown in FIG. 14A to sequentially get the clusters of the link destination for reproduction.

If the instruction input accepted in step S501 is the input of fast-forward instruction (the pressing of the fast-forward key), then the host CPU 13 executes a fast-forward operation by skipping the predetermined number of clusters (by skipping every 2 clusters in the case of FIG. 14B as shown with arrows over the cluster link tables in FIG. 14B.

If the instruction input accepted in step S501 is the input of fast-rewind (the pressing of the fast-rewind key), then the host CPU 13 executes a fast-rewind operation by skipping the predetermined number of clusters (by skipping every 2 clusters in the case of FIG. 14B) as shown with arrows below the cluster link tables in FIG. 14B.

After making ready the execution of the specified operation, the host CPU 13 makes it ready for accepting the input of an instruction for stopping this operation (step S506) and then determines whether the stop instruction input has been accepted (step S507). If the stop instruction input is found not accepted in the decision process of step S506, then the host CPU 13 repeats the above-mentioned processing from step S506, thereby continuing the operation started in step S505.

If the stop instruction input is found accepted in step S507, then the host CPU 13 stops the operation started in step S505 (step S508) and repeats the above-mentioned processing from step S501.

As shown in FIG. 14A and FIG. 14B, the recording/reproducing apparatus of the second embodiment is adapted to reference the cluster link tables formed in the RAM 16, which is an internal memory, so that there is no need for referencing the FAT information formed on each recording medium, thereby providing quick reproduction, fast-forward, and fast-rewind operations.

In not only normal reproduction and fast-forward operations but also a fast-rewind operation in which is it required to read data in the reverse direction, simply reading the cluster link tables in the reverse manner may surely and correctly read the clusters in which the information to be reproduced next, so that each reverse data read operation does not take long.

It should be noted that, as described above, cluster link tables are dynamically formed in an internal memory of the recording/reproducing apparatus in accordance with files to be used, so that the management of the memory capacity to be used for cluster link tables requires the device operation information, which is not normally handled by the program portion providing the basic capabilities of the file system.

Figure 15A:
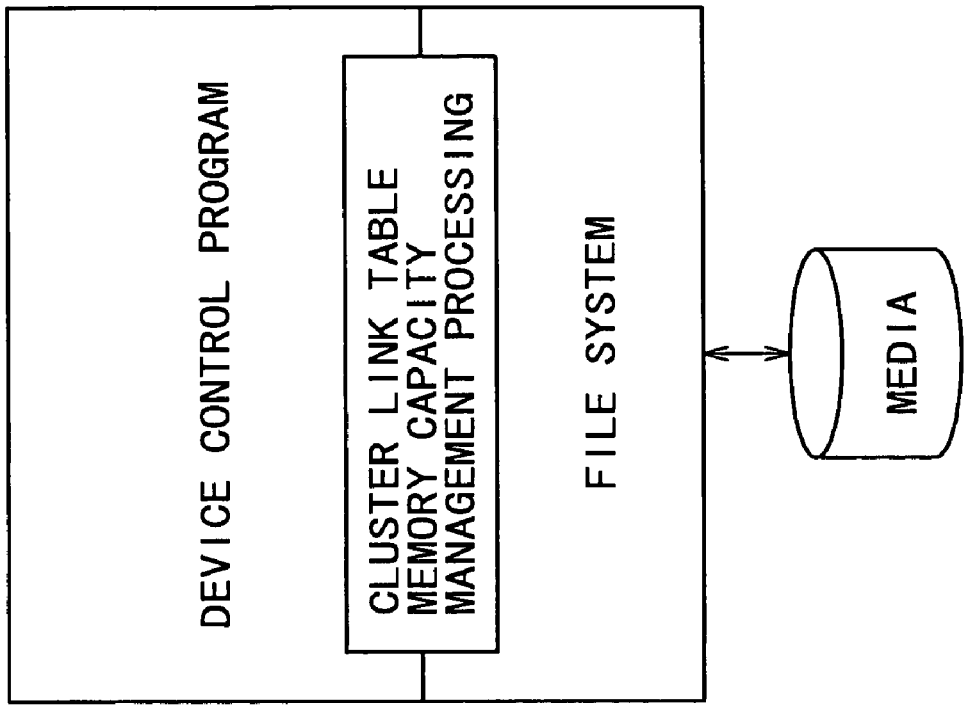
FIG. 15A and FIG. 15B show the management of a cluster link table.

Conventionally, reading FAT information and so on from recording media and storing them into an internal memory may only require the allocation of a memory capacity large enough for the maximum size of the files to be handled as the memory area for holding the FAT information of each file as described with reference to FIG. 9, so that the storage management of the internal memory may only be executed under the conditions closed to the file system as shown in FIG. 15A.

Figure 15B:
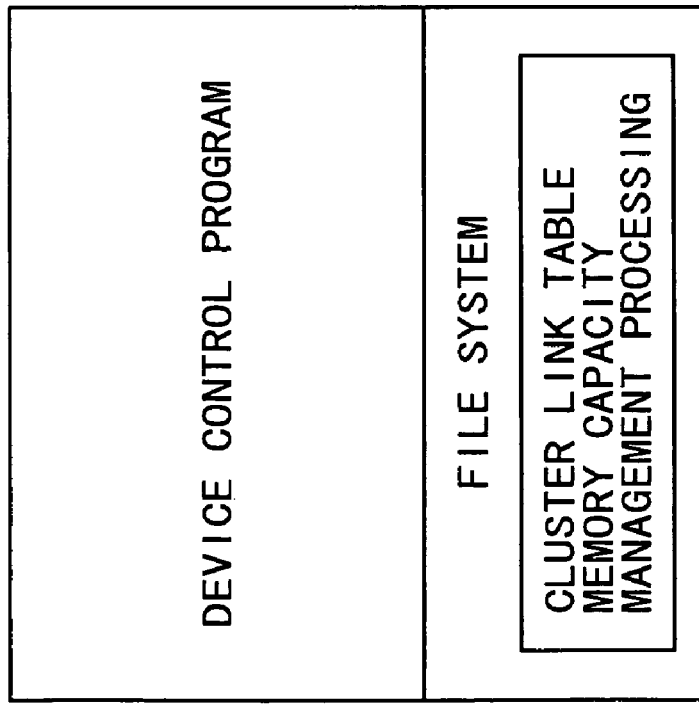

However, the dynamic allocation of a cluster link table storage area to effectively use the storage capacity of the internal memory requires to free the processing of managing the memory capacity of internal memory for the program portion other than the file management of this recording/reproducing apparatus as shown in FIG. 15B. Even if files are deleted or the memory area is used as a work area, the recording/reproducing apparatus allows, by reflecting these events, the correct management of the available memory capacity of internal memory, the dynamic allocation of the storage area for storing cluster link tables, and the use of the allocated storage area.

Thus, in the case of the recording/reproducing apparatus of the second embodiment, the necessity for accessing the file management table formed on recording media during operations such as reproduction and fast-forward is eliminated and the cluster link tables formed in the internal memory are accessed, thereby enhancing the data access speed to reproduce realtime data such as moving picture information with an enough margin.

In addition, the use of cluster link tables enhances the random access capability, thereby allowing the execution of operations such as jump, fast-forward, and fast-rewind quickly and correctly.

Further, dynamically forming cluster link tables in the internal memory in accordance with the real data of FAT information allows the efficient use of the storage area of the internal memory. This allows the management of the cluster link tables of many files with a limited storage capacity.

Moreover, when the storage capacity enough for FAT information is allocated in the internal memory, the number of manageable files may be limitless by forming cluster link tables.

In addition, if the capacity of the storage area of the memory in which cluster link tables are formed is small, there occurs a problem that the files storing moving picture information, which are managed at the same time, cannot be managed at the same time in excess of the total value of the reproduction times of these files; however, this problem does not lead to a major problem of the failure of the reproduction of these files.

Figure 17:
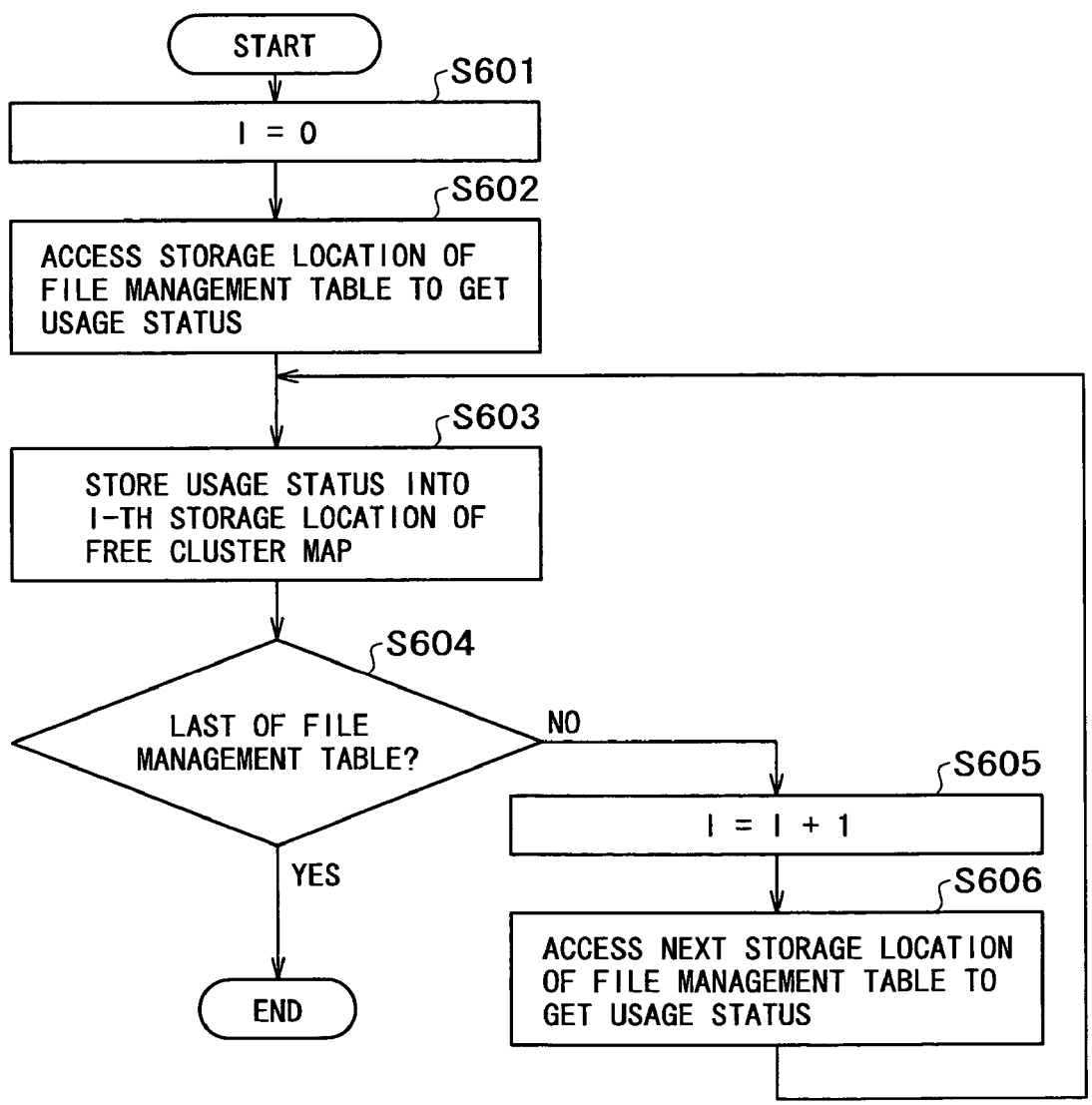
FIG. 17 is a flowchart indicative of the generation of a free cluster map to be executed in the recording/reproducing apparatus shown in FIG. 1.

[Third Embodiment] (refer to FIGS. 16 and 17)

In the above-mentioned recording/reproducing apparatus of the first embodiment, "grid type" is used as the recording method, thereby increasing the transfer rate at the time of recording realtime data such as moving picture information. However, the detection of free areas requires the reference of the FAT information formed on the recording medium and it is desired for this detection to be executed as quickly as possible. Therefore, the recording/reproducing apparatus of the third embodiment is adapted to execute the detection of free areas on recording media as quickly as possible.

It should be noted that the recording/reproducing apparatus of the third embodiment is also configured in generally the same manner as the recording/reproducing apparatus of the first embodiment shown in FIG. 1 and executes the file management by use of the FAT file system described with reference to FIGS. 2A through 2C like the recording/reproducing apparatus of the first embodiment shown in FIG. 1. Consequently, the recording/reproducing apparatus of the third embodiment also has the configuration shown in FIG. 1 and the FAT file system shown in FIGS. 1A through 2C.

In order to realize the quick detection of free areas on each recording medium, the recording/reproducing apparatus of the third embodiment forms, from the FAT information recorded on the recording medium, a cluster map (a free information table) in the RAM 16 for example, which is an internal memory, before starting the recording of information signals such as moving picture information, still picture information, or IT data on the recording medium, thereby making it practicable to detect free areas without accessing the FAT information formed on the recording medium.

FIG. 16 illustrates a free cluster map to be formed in the recording/reproducing apparatus of the third embodiment. FIG. 16(A) shows the FAT information to be formed on a recording medium to which information signals are recorded. Each address corresponds to each cluster.

In the example of the FAT information shown in FIG. 16(A), the first file is formed by use of cluster 02, cluster 03, cluster 04, cluster 05, and cluster 06, cluster 06 being the last cluster. The next file is formed by use of cluster 09, cluster 10, cluster 11, and cluster 12, cluster 12 being the last cluster. Starting from cluster 18, the next cluster is recorded. In the case of FIG. 16(A), cluster 07, cluster 08, cluster 13, and clusters 15, 16, and 17 are free clusters.

The recording/reproducing apparatus of the third embodiment forms a free cluster map as shown in FIG. 16(B) from the FAT information shown in FIG. 16(A) before recording information signals. The free cluster map may only indicate whether each of the clusters arranged on the recording medium is used or unused.

Therefore, as shown in FIG. 16(B), each used cluster is represented by "0" and each unused cluster by "1", this being indicated with one bit. Thus, each cluster may be indicated whether it is used or unused with only one bit, so that the free cluster map does not occupy much of the storage capacity of the RAM 16, which is an internal memory.

Forming the free cluster map as shown in FIG. 16(B) in advance allows the detection of free clusters quickly and correctly only by referencing the free cluster map formed in the RAM 16 at the time of recording information signals. Also, as with the first embodiment, the third embodiment can also quickly and correctly detect blocks each composed of the predetermined number of free clusters. Namely, the third embodiment can easily detect the free area of a desired size from the cluster map.

[Generation of Free Cluster Map (Free Information Table)]

FIG. 17 is a flowchart for describing the operation to be executed at the formation of a free cluster map. The formation of the free cluster map is executed in the recording/reproducing apparatus of this third embodiment. The processing shown in FIG. 17 is executed in the host CPU 13 when this recording/reproducing apparatus is put in the recording mode through the key operation block 14.

First, the host CPU 13 sets variable I for use in generating a free cluster map to 0, thereby initializing variable I (step S601). Next, the host CPU 13 references the FAT information, which is the file management table formed on the recording medium, to get the information indicative of the usage status of the first cluster from the link destination information thereof as shown in FIG. 16(A) (step S602).

Namely, in this third embodiment, the information indicative of the usage status is "0" in step S602 because, if the link destination information for the first cluster is the information indicative of the next link destination or the information indicative of the last cluster, this cluster is used. If the next link destination information is not indicated, that cluster is not in use, so that the information indicative of the usage status becomes "1".

Next, the host CPU 13 stores the information indicative of the usage status obtained in step S602 into the I-th storage location in the free cluster map formed in the RAM 16 for example in the manner shown in FIG. 16(B) (step S603). Then, the host CPU 13 determines whether the information indicative of the usage status obtained this time corresponds to the information about the last cluster in the FAT information, which is the file management table (step S604).

If the information indicative of the usage status is found not corresponding to the information about the last cluster in the decision process of step S604, the host CPU 13 adds 1 to variable I (step S605) and references the information about the next cluster in the FAT information (step S606), repeating the above-mentioned processing from step S603.

Thus, the host CPU 13 references the information about all clusters in the FAT information, which is the file management table, to from a free cluster map and, if the information corresponding to the information about the last cluster is found recorded to the free cluster map in the decision process of step S604, the processing shown in FIG. 17 comes to an end.

Referencing, as described above, the free cluster map formed in the RAM 16, which is an internal memory, before starting the recording processing allows the quick and correct detection of a free area without referencing the FAT information recorded on the recording medium, thereby realizing the quick and proper recording of information signals.

It should be noted that referencing a free cluster map to execute recording processing causes new used clusters; if this occurs, the free cluster map may be updated to the most recent state from time to time or at the end of recording processing for example or a new free cluster map may be formed from the FAT information at the end of recording processing.

A free map cluster is necessary at the time of recording processing and a cluster link table formed in the above-mentioned second embodiment is necessary at the time of reproduction processing such as fast-forward and fast-rewind. Hence, in the same storage area in the RAM 16, which is an internal memory, a free cluster map may be formed in the recording mode and a cluster link table may be formed in the reproduction mode, thereby enhancing the efficiency of use of the storage areas in the internal memory.

Thus, in the recording/reproducing apparatus of the third embodiment, the access to the file management table formed on a recording medium at the time of recording information signals to the recording medium may be eliminated, thereby enhancing the transfer rate.

[Fourth Embodiment] (refer to FIGS. 18A through 25F)

The above-mentioned recording/reproducing apparatuses of the first, second, and third embodiments each have the camera block 4 and are used as so-called digital video cameras. Therefore, these recording/reproducing apparatuses are often for portable use and batteries are used for their power source. In this case, the power may often be interrupted during recording of information signals, during taking pictures for example, due to battery consumption.

However, in the case of FAT file systems for use in personal computers, no special measures have been taken against troubles due to power interruption.

Therefore, the recording/reproducing apparatus of this fourth embodiment is adapted to provide new measures for the recovery (or repair) of files after power interruption due to various causes during recording processing.

It should be noted that the recording/reproducing apparatus of this fourth embodiment is also configured in generally the same manner as the recording/reproducing apparatus of the first embodiment shown in FIG. 1 and executes file management by use of the FAT file system described with reference to FIGS. 2A through 2C as with the recording/reproducing apparatus of the first embodiment. Hence, the fourth embodiment also has the configuration shown in FIG. 1 and the FAT file system shown in FIGS. 2A through 2C.

Figures 18A, 18B, 19:
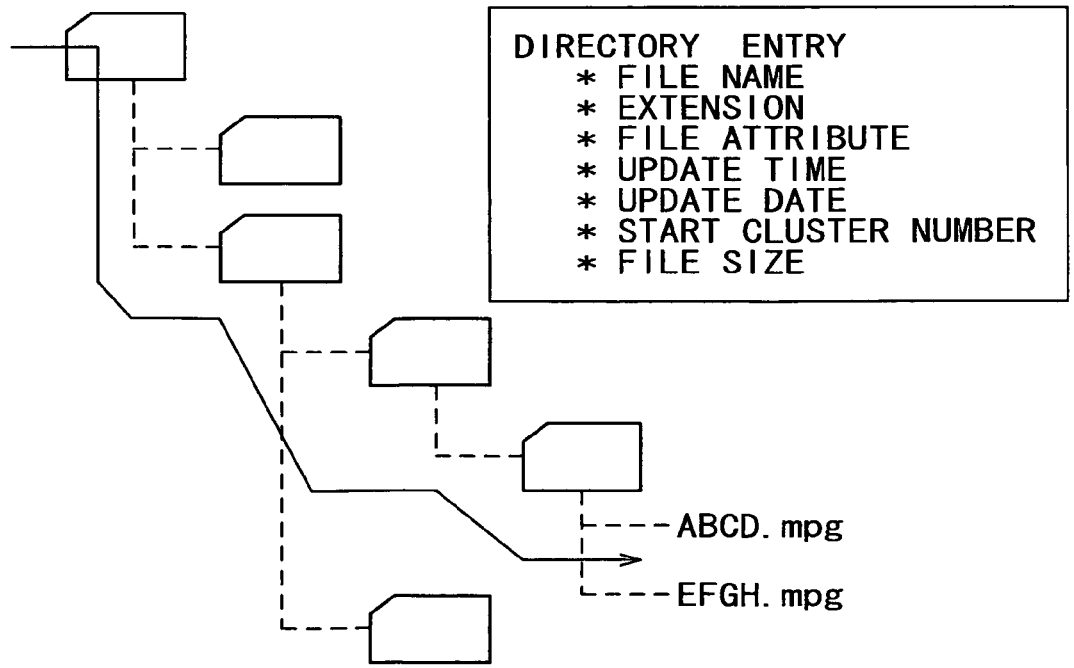
FIG. 18A and FIG. 18B show the FAT information for use in the recording/reproducing apparatus shown in FIG. 1.
FIG. 19 shows the directory entry information for use in the recording/reproducing apparatus shown in FIG. 1.

The recording/reproducing apparatus of the fourth embodiment also adapted, as shown in FIGS. 18A and 18B, to quickly reproduce moving picture information, still picture information, and IT data recorded to data areas of recording media as files on a cluster basis by managing the link relationship of the actual clusters used for recording as shown in FIG. 18B on the basis of the FAT information shown in FIG. 18A.

Each file composed of a collection of information signals recorded on a recording medium is managed by the hierarchically structured information called a directory and the direction entry information described above with reference to FIGS. 2A through 2C. Each file may be specified by the directory in which it is contained and its file name.

The directory entry described above with reference to FIGS. 2A through 2C manages file name, extension, file attribute, update time, update data, start cluster number, and file size as the information about each file. Each piece of data in the directory entry information is significant on its own used as required.

If the power of the recording/reproducing apparatus is interrupted due to some cause such as power outage during recording processing for example, the recording processing is forcibly discontinued; if data are recorded to clusters, the FAT information on the recording medium cannot be updated to reflect the cluster recording status, thereby causing a problem that the file concerned cannot be accessed.

Also, file end-point processing cannot be executed, so that an abnormal condition in which a cluster chain is disrupted by an unused cluster occurs. If, of the directory entry information, the file data size takes a wrong value, the integrity between the file system and the actual file is lost, causing an access trouble. Namely, the file in which information should be recorded halfway cannot be accessed.

To overcome these problems, the recording/reproducing apparatus of the fourth embodiment is adapted to write the information indicative to which file information signals are to be recorded to its nonvolatile memory, which retains information after the power is turned off. When the recording processing has normally been ended, the information indicative to which file information signals are to be recorded is deleted from the nonvolatile memory or made invalid by setting an end flag.

By doing so, if there is any information indicative to which file information signals are to be recorded that has not been invalidated in a power-on sequence for example, it is known that the recording has been discontinued by some reason on that file and therefore that file may be subjected to recovery.

FIG. 20 illustrates the operation to be executed at the time of recording information signals such as moving picture information, still picture information, and IT data in the recording/reproducing apparatus of the fourth embodiment. As shown in FIG. 20, accepting a recording start request through the key operation block 14 at time point t1, the recording/reproducing apparatus of the fourth embodiment records the information indicative to which file information signals are to be recorded into the nonvolatile memory 17 at time point t2.

Next, as with the normal recording processing, directory entry information is written and the FAT information is referenced to get necessary information, the new information is written, and the desired information signals (data) are recorded. Then, the necessary information is obtained by referencing the FAT information at a predetermined time, the new information is written, and a predetermined amount of information signals (data) are written, which are repeated.

Subsequently, as shown by time point t3 in FIG. 20, accepting a recording end request from the user through the key operation block 14, the host CPU 13 references the FAT information to get necessary information, writes an end code (end point code), and writes a file size to the directory entry information.

When this sequence of recording processing operations has been normally completed, the host CPU 13 invalidates the information indicative to which file the information signals (data) are to be recorded, which were recorded to the nonvolatile memory 17 at the time of starting the recording at time point t4 of FIG. 20, thereby normally ending the recording processing.

However, as shown with a cross marker in FIG. 21A, if the recording processing is interrupted due to power failure for some reason during recording of information signals, the FAT information is not attached with a end code and the directory entry information has no correct file size update, the file size being left to be zero.

In this case, when the power supply is recovered and the power is turned on again, the information indicative to which file the information signals are to be recorded, which is stored in the nonvolatile memory 17, has not been invalidated, so that it is known that the file indicated by that information needs to be recovered. In this case, the FAT information of the file to be recovered is traced to obtain the size of that file.

The point at which clusters cannot be traced any further without detecting the end code indicates the last of the FAT information of that file, so that the file size up to this point is regarded as the formal file size and the end code is attached to the last of the FAT information of that file.

The obtained file size is written to the directory entry information for an update and the data portion, which is written to the data area but could not be recovered due to the correspondence with the FAT information, is freed as an unused data area. Consequently, if the power is interrupted during recording processing and the processing is discontinued, the file on which the recording processing has been discontinued may be recovered without wasting the recorded information signals (data) as far as possible.

FIGS. 22A through 22E illustrates details of the state shown in FIGS. 21A and 21B. As shown in FIG. 22A, it is assumed that file data is recorded starting with cluster 02 and then cluster 03 to cluster 24 to cluster 25 to cluster 26 to cluster 27 to cluster 28 to cluster 29 in this order in the data area of a hard disk or a semiconductor memory card.

In this case, in order to update the FAT information formed on the recording medium, the FAT information held in the RAM 16 for example, which is an internal memory, contains a code indicative of an unused state in the storage area of address 29 because the recording of information signals to cluster 29 is halfway and the cluster to which information signals are to be recorded is not yet defined as shown in FIG. 22B.

On the other hand, the FAT information formed on the recording medium is adapted to reflect the changes in the FAT information formed in the RAM 16 by periodical update processing; in this example, the update processing has been made up to address 27 and addresses 28, 29, and so on are updated by the next periodical update processing, so that addresses 28 and 29 are left unused as shown in FIG. 22C.

If a power failure occurs and causes the information signals to discontinue the recording processing in the states shown in FIGS. 22A, B, and C, the FAT information formed on the recording medium is left as it is shown in FIG. 22C. The FAT information in the RAM 16 shown in FIG. 22B is lost by the power failure.

After power recovery, when the recording/reproducing apparatus of the fourth embodiment is powered on and the information indicative to which file recorded in the nonvolatile memory 17 the information signals are to be recorded is checked, it is known that this file is halfway in recording and there is no file size integrity, thereby making this file unusable because this information has not been invalidated.

Therefore, the file to be recovered is identified by use of the information indicative to which file stored in the nonvolatile memory 17 the information signals are to be recorded and the address corresponding to the cluster in the FAT information from which the information signals are to be recorded is identified from the directory entry information of that file.

Then, from the identified address, the FAT information formed on the recording medium is traced as shown in FIG. 22D. In this example, in the FAT information on the recording medium shown in FIG. 22D, the address (address 27) corresponding to the cluster immediately before the unused code records that the next link destination is cluster 28; however, because the recording of information signals up to the last of cluster 28 cannot be confirmed in this state, cluster 27 in which information signals are recorded up to its end is regarded as the last cluster of that file.

Next, the contents of address 27 are written over by the code indicative of the end as shown in FIG. 22E. The address 27 is the address of the FAT information on the recording medium corresponding to cluster 27. Then, the host CPU 13 converts the number of traced clusters into a data amount and replaces the file size of the file of the directory entry information recorded on the recording medium with the converted data amount.

Consequently, the recovery of the FAT information recorded on the recording medium may keep the integrity of the clusters up to cluster 27 of which end has been processed as a file system, thereby allowing the access to the information signals recorded up to the end of cluster 27 without problem.

[File Recovery Processing]

Figure 23:
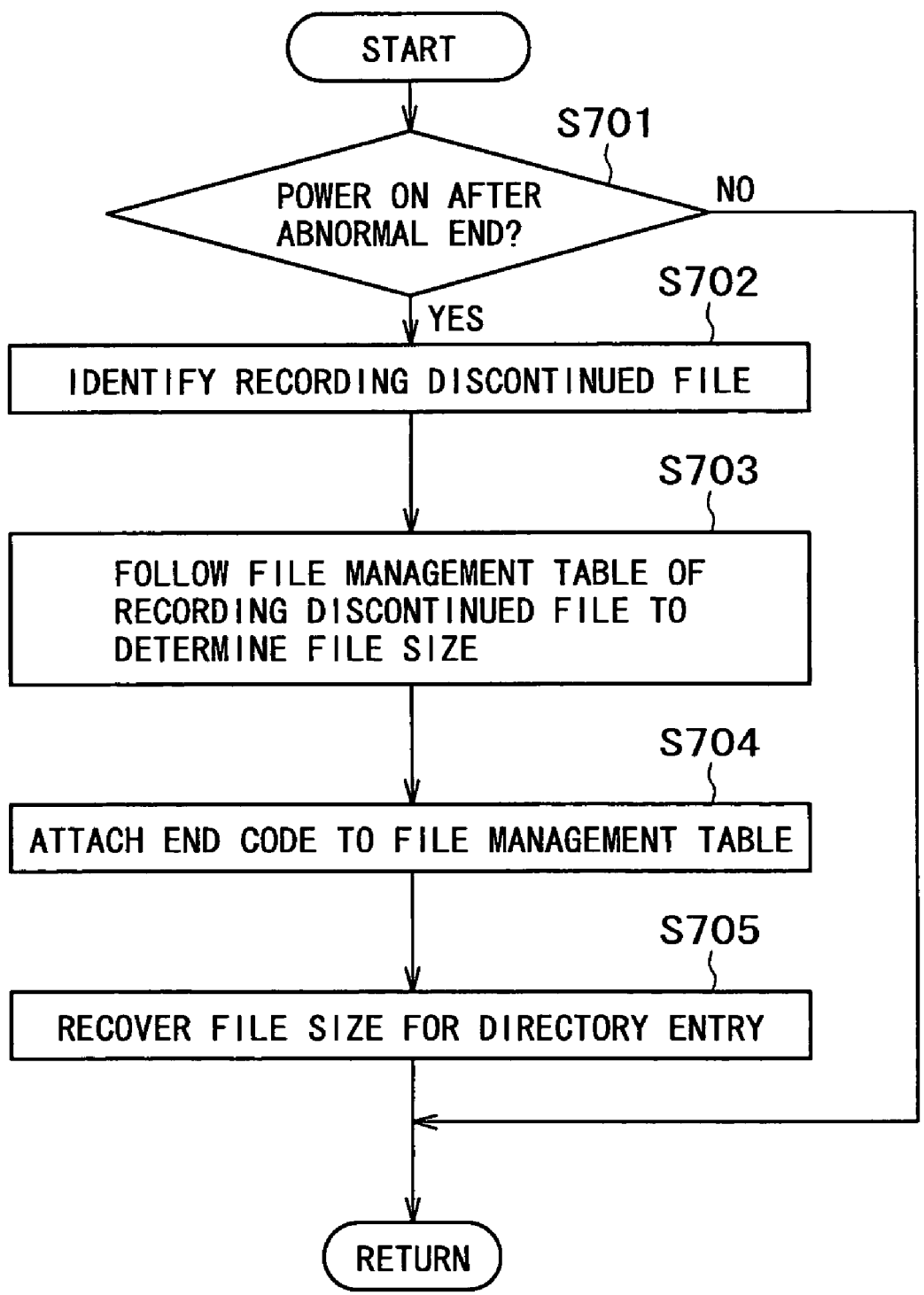
FIG. 23 is a flowchart indicative of the processing to be executed at the recovery (or repair) of files made unusable due to the power failure at the recording on the recording/reproducing apparatus shown in FIG. 1.

FIG. 23 is a flowchart for describing the above-mentioned file recovery processing which is executed in the recording/reproducing apparatus of the fourth embodiment. The processing shown in FIG. 23 is executed by the host CPU 13 when the recording/reproducing apparatus of the fourth embodiment is powered on.

When the power is turned on, the host CPU 13 references the information indicative to which file in the nonvolatile memory 17 information signals are to be recorded, thereby determining whether this power-on sequence is that after an abnormal end (step S701). If, in the decision process of step S701, the information indicative to which file information signals are to be recorded is found invalidated and therefore the power-on sequence is found not to be that after an abnormal end, then the processing shown in FIG. 23 comes to an end.

If the information indicative to which file information signals are to be recorded is fount not invalidated and therefore the power-on sequence is found to be that after an abnormal end, a file in which recording has been interrupted is identified from the information stored in the nonvolatile memory, thereby identifying the address of the FAT information, which is the file management table corresponding to the start cluster of that file (step S702).

Next, from the address (the address corresponding to the start cluster of that file) identified in step S702, the host CPU 13 traces the FAT information to determine the file size (step S703). Then, the host CPU 13 adds an end code to the address area corresponding to the last cluster of that file of the FAT information (step S704) and updates the directory entry information of that file by the file size determined in step S703, thereby restoring this directory entry information to the normal state (step S705).

Consequently, if a power failure occurs during recording processing and causes to discontinue the processing, all data recorded so far may be protected from becoming unusable, thereby realizing the recording/reproducing apparatus of high reliability.

[Another Example of Avoiding Problems Due to Power Failure]

In the case of the above-described recording/reproducing apparatus of the fourth embodiment, as described with reference to FIG. 20, when information signals are recorded, directory entry information is written to a recording medium immediately before starting the recording, FAT information is formed on the recording medium, then only the FAT information is periodically updated, the FAT information is updated last at the end of the recording, the directory entry information is updated by the information such as file size, and the recording processing is ended.

In this case, if a power failure occurs, no end code is recorded to the FAT information and the file size of the directory entry information is incorrect, resulting in that even the information already recorded up to the power failure becomes unavailable.

Figure 24:
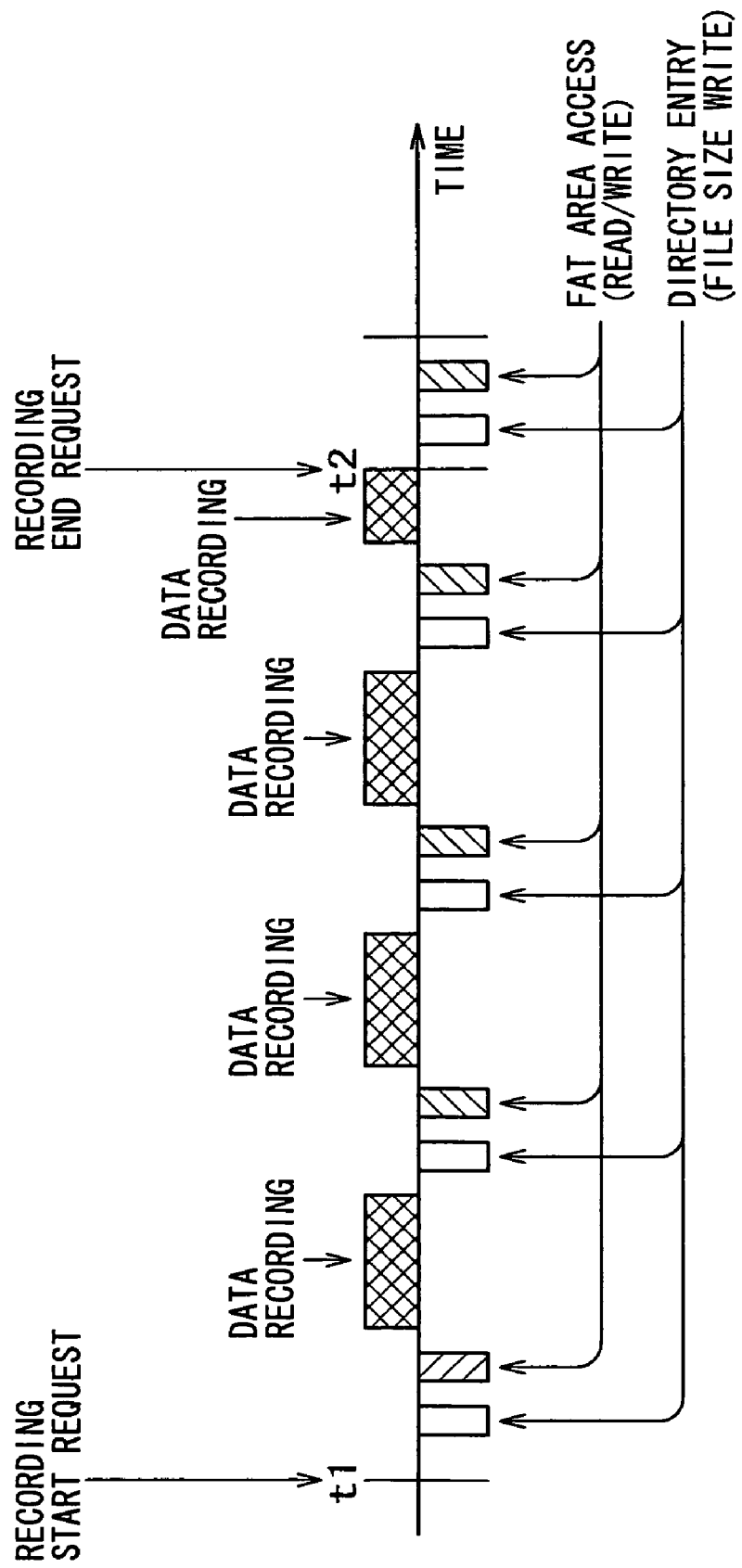
FIG. 24 shows another example of a measure, executable in the recording/reproducing apparatus shown in FIG. 1, for preventing a file from being made unusable due to power failure at the recording in the recording/reproducing apparatus shown in FIG. 1.

Therefore, in the present example, as shown in FIG. 24, in the recording of information signals, the updating of the FAT information and the updating of the directory entry information are periodically executed at the same time, an end code is always attached to the FAT information in the updating after the recording of information signals and the directory entry information is updated by the correct file size at that point of time.

This configuration prevents the recorded information signals corresponding to the portion of the last update in the FAT information and the directory entry information from becoming unavailable if a power failure occurs, thereby ensuring the normal use of these information signals. Also, this configuration eliminates the necessities for recording to the nonvolatile memory the information indicative to which file information signals are to be recorded and invalidating this information.

FIGS. 25A through 25F illustrate, in detail, the measures for preventing the problems due to the power failure from occurring in the example described with reference to FIG. 24. As shown in FIG. 25A, it is assumed that file information signals is recorded starting with cluster 02 of the data area on a hard disk or a semiconductor memory card, to cluster 03 to cluster 24 to cluster 25 to cluster 26 in this order.

In this case, in order to update the FAT information formed on the recording medium, the FAT information held in the RAM 16 for example, which is an internal memory, contains a code indicative of an unused state in the storage area of address 26 because the recording of information signals to cluster 26 is halfway and the cluster to which information signals are to be recorded is not yet defined as shown in FIG. 25B.

On the other hand, the FAT information formed on the recording medium is adapted to reflect the changes in the FAT information formed in the RAM 16 by periodical update processing; in this example, an end code (FF) is put in the last cluster at this point of time as shown in FIG. 25C.

As shown in FIG. 25C, the FAT information formed on the recording medium is updated when information signals have been recorded to cluster 25 in the data area on the recording medium and the end code is put in the area of address 25 of the FAT information corresponding to cluster 25. At the same time, the value of the file size of the directory entry information on the recording medium is also updated to the size up to cluster 25 in which information signals are recorded.

If a power failure occurs in the above-mentioned state, integrity as a FAT file system is maintained up to cluster 25, so that the information signals recorded up to cluster 25 of that file are accessible.

Then, the recording of information signals proceeds from the state shown in FIGS. 25A, 25B, and 25C and information signals are recorded to clusters 26 and on in the data area on the recording medium as shown in FIGS. 25D and 25E.

If the point of time at which the recording of information signals to cluster 29 has been completed is equivalent to a predetermined time, the correct value, namely the information indicative that the next cluster in which information signals are recorded is cluster 26, is entered in the area indicated by address 25 corresponding to cluster 25 of the FAT information on the recording medium. The cluster 25 was determined as the end in the last updating and the area indicated by address 25 corresponding to cluster 25 of the FAT information is updated by the end code (FF), thereby setting cluster 29 to the end as shown in FIG. 25F.

At the same time, the value of the file size of the directory entry information on the recording medium is also updated to the size up to cluster 25 in which data are recorded.

Consequently, as described above, if a power failure occurs, the information signals recorded up to the point at which the FAT information and the directory entry information are finally updated become accessible without problem after recovery from the power failure.

It should be noted that the selection between the method in which FAT information is retraced described with reference to FIGS. 20 through 23 and the method in which both FAT information and directory entry information are periodically updated described with reference to FIGS. 24, 25A through 25F depends on the processing capacity of the host CPU and other various conditions.

[Fifth Embodiment] (refer to FIGS. 26 through 33)

In the above-mentioned second embodiment, the cluster link table (the link information table) is created from FAT information in order to improve the data access speed and random access performance at the time of reproduction. This cluster link table is created before the use of information recorded on a recording medium.

Therefore, the cluster link table may be created any time before information signals recorded on a recording medium is reproduced. However, unless the cluster link table is created before the reproduction of information signals, the reproduction, fast-forward, or fast-rewind of these information signal cannot be performed by use of the cluster link table.

Consequently, it is proposed that the cluster link table be formed at a predetermined time or in response to a request by the user while the recording/reproducing apparatus is free. However, if the user comes to be aware of the creation of the cluster link table, it may eventually limit the use of the recording/reproducing apparatus, which is not desirable. It is also undesirable for the user to instruct the recording/reproducing apparatus to create the cluster link table because it takes time and labor.

Therefore, the recording/reproducing apparatus of the fifth embodiment is adapted to create cluster link tables without making the user be aware of the creation of cluster link tables and without affecting the processing to be executed by the recording/reproducing apparatus. It should be noted that the recording/reproducing apparatus of the fifth embodiment is also configured generally in the same manner as the recording/reproducing apparatuses of the above-mentioned first through fourth embodiments and has generally the same functions.

In the recording/reproducing apparatus of the fifth embodiment, when information signals are recorded realtime, the reading of data from the buffer 8 and the writing data thereto may be paused without making the buffer 8 for temporarily storing information signals overflow or underflow and a time in which the reading and writing data on the buffer memory such as above may be paused is arranged as a free time in which a cluster link table is created.

To be more specific, when the recording/reproducing apparatus of this embodiment having the configuration shown in FIG. 1 records information signals (data) to the hard disk 11 in the order of data file "a", data file "b", and data file "c", FAT information is formed as shown in FIG. 26(A).

In this case, a period is arranged as a free time in which, when the recording has shifted from the first data file "a" to the second data file "b", the writing of data to be recorded to the hard disk 11 to the buffer 8 is continued during the recording of data to data file "b" but the reading of the data from the buffer 8 and the writing of data to the hard disk 11 may be paused without causing the buffer 8 to overflow and the cluster link table for recorded data file "a" is formed in this free time.

The cluster link table for data file "b" may be formed during the recording of data file "c", which is recorded after data file "b", or a period is arranged as a free time in which, during the reproduction of data file "a" recorded to the hard disk 11, the reading of data to be reproduced from the hard disk 11 and the writing of the data to the buffer 8 may be paused without causing the buffer 8 to underflow and the cluster link table for data file "b" is formed in this free time as shown in FIG. 27(B) from the FAT information formed as shown in FIG. 27(A).

A point to notice in the formation of a cluster link table is that, in order to prevent realtime processing such as recording processing and reproduction processing from being interrupted, the buffer 8 must be prevented from overflowing at the time of recording and the buffer 8 must be prevented from underflowing at the time of reproduction.

In this case, it is proposed that the remaining available capacity of the buffer 8 be always monitored to stop creating a cluster link table if the buffer 8 shows an inclination to overflow at the time of recording or the buffer 8 shows an inclination to underflow at the time of reproduction.

However, during the formation of a cluster link table, this proposition must cause an interrupt for stopping this processing and, if the formation of a cluster link table must be stopped quickly, requires the post-processing for preventing unconformity from occurring in the cluster link table for example, thereby increasing the processing load of the host CPU 13.

In order to avoid these problems, the recording/reproducing apparatus of the fifth embodiment sets the size of a free time in which the buffer 8 will not overflow from a period in which the data storage amount in the buffer 8 exceeds a predetermined upper limit if the data storage amount in the buffer 8 drops below a predetermined lower limit at the time of recording and executes the processing of forming a cluster link table within this free time.

Likewise, at the time of reproduction, the recording/reproducing apparatus sets the size of a free time in which the buffer 8 will not underflow from a period in which the data storage amount in the buffer 8 drops below a predetermined lower limit if the data storage amount in the buffer 8 gets over a predetermined upper limit and executes the processing of forming a cluster link table within this free time.

The size of the free time may be specified from the data amount (the accessible data amount), which can be processed for the FAT information already formed on the hard disk 11 to form a cluster link table, or from the time necessary for forming a cluster link table.

FIGS. 28A and 28B illustrate the setting of free times in which to form a cluster link table in realtime processing. FIG. 28A illustrates the setting of a free time in which to form a cluster link table at the time of recording. FIG. 28B illustrates the setting of a free time in which to form a cluster link table at the time of reproduction.

At the time of recording, the data to be recorded are once stored in the buffer 8 and then read therefrom into the hard disk 11 for time axis correction as shown in FIG. 28A; if the amount of stored data goes down to lower limit reference W for example, it takes some time for the stored data to be stored up to upper limit reference WD.

So, when the storage date in the buffer 8 has dropped below lower limit reference W, the reading of data from the buffer 8 and the writing of data to the hard disk 11 may be paused during a period in which the stored data have reached upper limit reference WD, executing only the recording of recorded data to the buffer 8.

Consequently, the period from the time at which the stored data in the buffer 8 have dropped below lower limit reference W to the time at which the stored data are stored up to upper limit reference WD is handled as a free time during which a cluster link table is formed.

It should be noted that, if the recording processing is restarted by reading the data from the buffer 8 when the stored data have reached upper limit reference WD, upper limit reference WD is a reference, which is specified to prevent the buffer 8 from overflowing with some margin. Lower limit reference W is set so that the recording processing will not be affected adversely.

At the time of reproduction, time axis correction is executed on the data to be reproduced, so that the data to be reproduced are once recorded to the buffer 8 before being reproduced as shown in FIG. 28B; if the stored data increase up to upper limit reference R for example, the reproduction proceeds and it takes some time until the stored data increases to lower limit reference RD.

Therefore, during a period in which the stored data decrease down to lower limit reference RD with the stored data in the buffer 8 exceeding upper limit reference R, the processing of reading data from the recording medium and writing the data to the buffer 8 is paused, executing only the reproduction of the data supplied from the buffer 8.

Consequently, a period from the time at which the stored data in the buffer 8 have increased over upper limit reference R to the time at which the stored data decrease to lower limit reference RD is set as a free time during which a cluster link table is formed.

It should be noted that lower limit reference RD is a reference, which is specified to prevent the buffer 8 from underflowing when the writing of reproduction data to the buffer 8 is restarted with the stored data decreased to lower limit reference WD, this lower limit reference having some margin. Upper limit reference R is set so that the reproduction processing is not affected adversely.

In accordance with the free time provided as described above, an upper limit is provided to the data amount, which can be processed for FAT information, and the processing time for forming a cluster link table and the processing for forming a cluster link table is executed during a time up to this upper limit, at which the cluster link table formation processing is automatically ended.

By doing so, without always monitoring the remaining capacity of the buffer 8, in the free time provided as described above, after forming cluster link tables by accessing the FAT information by the data amount that can be processed for the FAT information, which is set in accordance with the free time, or after forming a cluster link tables by the number equivalent to the processing time set in accordance with the free time, the cluster link table formation processing is automatically ended, thereby executing recording processing and reproduction processing, which are realtime processing, without trouble.

It should be noted that, if the data mount that can be processed for the FAT information to be set in accordance with the free time is known, if the access data amount of the FAT data per access is known for example, the maximum number of accesses of the FAT information in that free time is also known. Also, after forming cluster link tables by accessing the FAT information by this maximum number of access times, the cluster link table formation processing may be automatically ended.

Namely, by use, as the upper limit, of the number of access times, which is determined in accordance with the processible data amount for FAT information and the unit data amount to be read by one access, the cluster link table formation processing may be ended automatically.

Obviously, when cluster link tables are formed by the data amount processible for the FAT information to be set in accordance with the free time, it is also practicable appropriately adjust or predetermine the data amount to be accessed within a range of processible data amount by changing, for every access, the data amount of the FAT information to be captured and by changing the units of data amount to be accessed from "n" blocks for example in the first "N" accesses to "m" blocks for example in the next "M" accesses.

Likewise, if the cluster link table formation processing time to be set in accordance with the free time is known, if the access time for the FAT information per access is predetermined for example, the maximum access count for the FAT information in that free time is also known, so that the cluster link table formation processing may be automatically ended after forming cluster link tables by accessing the FAT information by this maximum access count.

Obviously, when cluster link tables are formed by the time for forming cluster link tables to be set in accordance with the free time, it is also practicable to appropriately adjust or predetermine the data amount to be accessed in that forming processing time by changing the data amount of the FAT information for every access and by changing the units of data amount to be accessed from "n" blocks for example in the minimum "N" accesses to "m" blocks for example in the next "M" accesses.

With reference to FIGS. 28A and 28B, upper limit reference WD is set at the time of recording and lower limit reference RD is set at the time of reproduction for the brevity of description; however, these settings are not always necessary and therefore, if there are lower limit reference W at the time of recording and upper limit reference R at the time of reproduction, the start time of each free time may be set. Namely, on the basis of the data storage amount and the storage capacity in the buffer 8 at that start time, the size of the free time may be set to set the upper limit value of the processible data amount for the FAT information, the upper limit value of the cluster link table formation processing time, and, from these values, the upper limit value of the computable FAT information access count.

The following describes the cluster link table formation processing to be executed at the times of recording and reproduction with reference to the flowcharts shown in FIGS. 29 through 32. It should be noted that the following description uses an example in which the data amount of FAT information to be captured by one access (the access data amount) and the time required for one access (the access time) are determined in advance and the upper limit value of the access count of the FAT information obtained from the upper limit value of the cluster link table formation processing time (corresponding to the free time in this example) is used as the reference by which the end of the cluster link table formation processing is determined.

Figure 29:
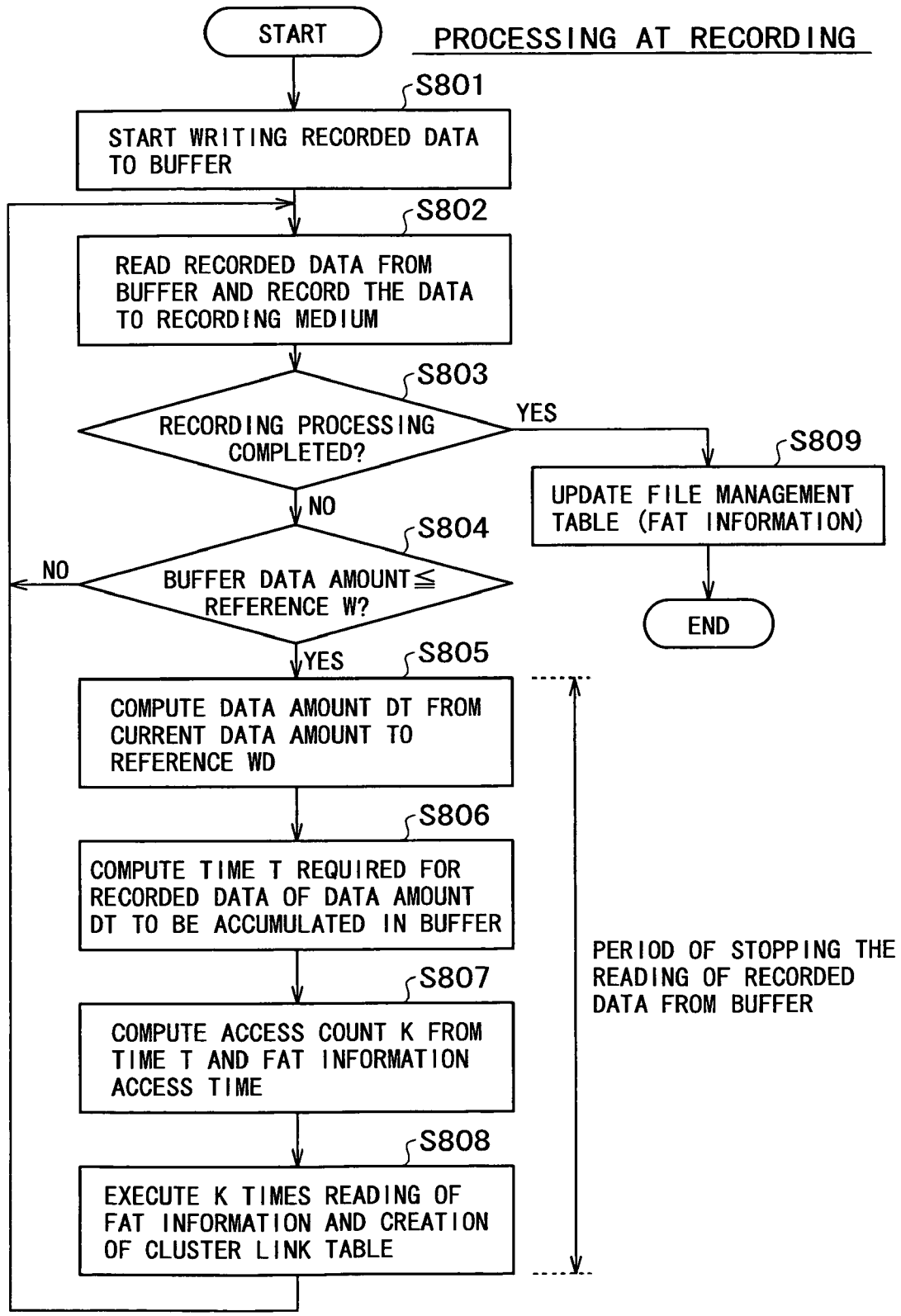
FIG. 29 is a flowchart indicative of the processing of forming a cluster link table to be executed at the time of recording.

First, the formation of a cluster link table at the time of recording will be described. FIG. 29 is a flowchart for describing the processing of forming a cluster link table at the time of recording.

As described above, the recording/reproducing apparatus of the fifth embodiment has the configuration shown in FIG. 1, in which various information signals supplied from the digital input/output terminal 1, the digital input terminal 3, and the camera block 4 can be recorded to the hard disk 11 or the semiconductor memory 12.

For the brevity of description, the following description will be made by use of an example in which moving pictures taken by the camera block 4 are recorded to the hard disk 11. When the recording/reproducing apparatus of the fifth embodiment is put in the imaging mode, the switch circuit 5 and the switch circuit 7 are each set to the connection terminal "b" side and the switch circuit 9 is set to the connection terminal "a" side, thereby putting the recording/reproducing apparatus into the standby state.

When an instruction is given to start imaging, the host CPU. 13 executes the processing shown in FIG. 29 to control each component block, starting the capturing of the moving picture data from the camera block 4 into the buffer 8 (step S801). Next, the host CPU 13 reads the moving picture data from the buffer 8 while performing time axis correction thereon and records the resultant data to the hard disk 11 (step S802).

Then, the host CPU 13 determines whether an operation has been made to end the imaging (step S803) and, if this operation is found performed, switches the switch circuit 9 to the connection terminal "b" side to execute end processing such as updating the FAT information formed on the hard disk 11 (step S809), thereby ending the processing shown in FIG. 29.

If the ending of the imaging is found not instructed in the decision process of step S803, then the host CPU 13 determines whether the data storage amount in the buffer 8 has dropped below lower limit reference W (step S804). If the data storage amount in the buffer 8 is found not dropped below lower limit reference W in the decision process of step S804, then the host CPU 13 repeats the above-mentioned processing from step S802.

If the data storage amount in the buffer 8 is found dropped below lower limit reference W in the decision process of step S804, then the host CPU 13 switches the switch circuit 9 to the connection terminal "b" side to pause the reading of recorded data from the buffer 8 and the writing of the data to the hard disk 11, thereby computing data amount DT from the current data storage amount in the buffer 8 up to upper limit reference WD (step S805).

Next, the host CPU 13 computes Time T in which it takes for the recorded data for data amount DT are stored in the buffer 8 (step S806), thereby computing access count K (the upper limit of access count) permitting access to the FAT information within Time T from Time T and a time necessary for capturing the FAT information per unit amount handled in one access into the RAM 16 (the access time to FAT information) (step S807).

Then, the host CPU 13 reads the FAT information by "K" times, forms cluster link tables in the nonvolatile memory 17 for example, switches the switch circuit 9 to the connection terminal "a" side (step S808), and repeats the above-mentioned processing from step S802, thereby restarting the recording of recorded data to the hard disk 11. When the data storage amount in the buffer 8 has dropped below lower limit reference W, the processing of steps S805 through S808 is repeated to from cluster link tables.

Thus, at the time of recording, if the data storage amount in the buffer 8 has dropped to lower limit reference W, the reading of recorded data from the buffer 8 and the writing of the data to the hard disk 11 are paused and cluster link tables are formed by accessing the FAT information by access count K for the FAT information executable during a period in which the data storage amount in the buffer 8 reaches upper limit reference WD. Then, the formation of cluster link tables is automatically ended and the process of step S802 resumed, thereby restarting the reading of recorded data from the buffer 8 and the writing of the read data to the hard disk 11.

Sequentially repeating the above-mentioned processing allows the access to FAT information and the generating of cluster link tables in advance at the time of recording information signals to the hard disk 11 without affecting the recording processing and without making the user be aware thereof.

It should be noted that, in FIG. 29, the access count of FAT information is always computed every time the data storage amount in the buffer 8 has dropped below lower limit reference W. By doing so, the correct FAT information access count can always be set. However, another configuration is also possible in which access count K to FAT information is determined in advance.

For example, it is practicable that FAT information access count K executable between predetermined lower limit reference W and upper limit reference WD is obtained in advance and cluster link tables are formed at the time of recording by use of the obtained access count K.

Figure 30:
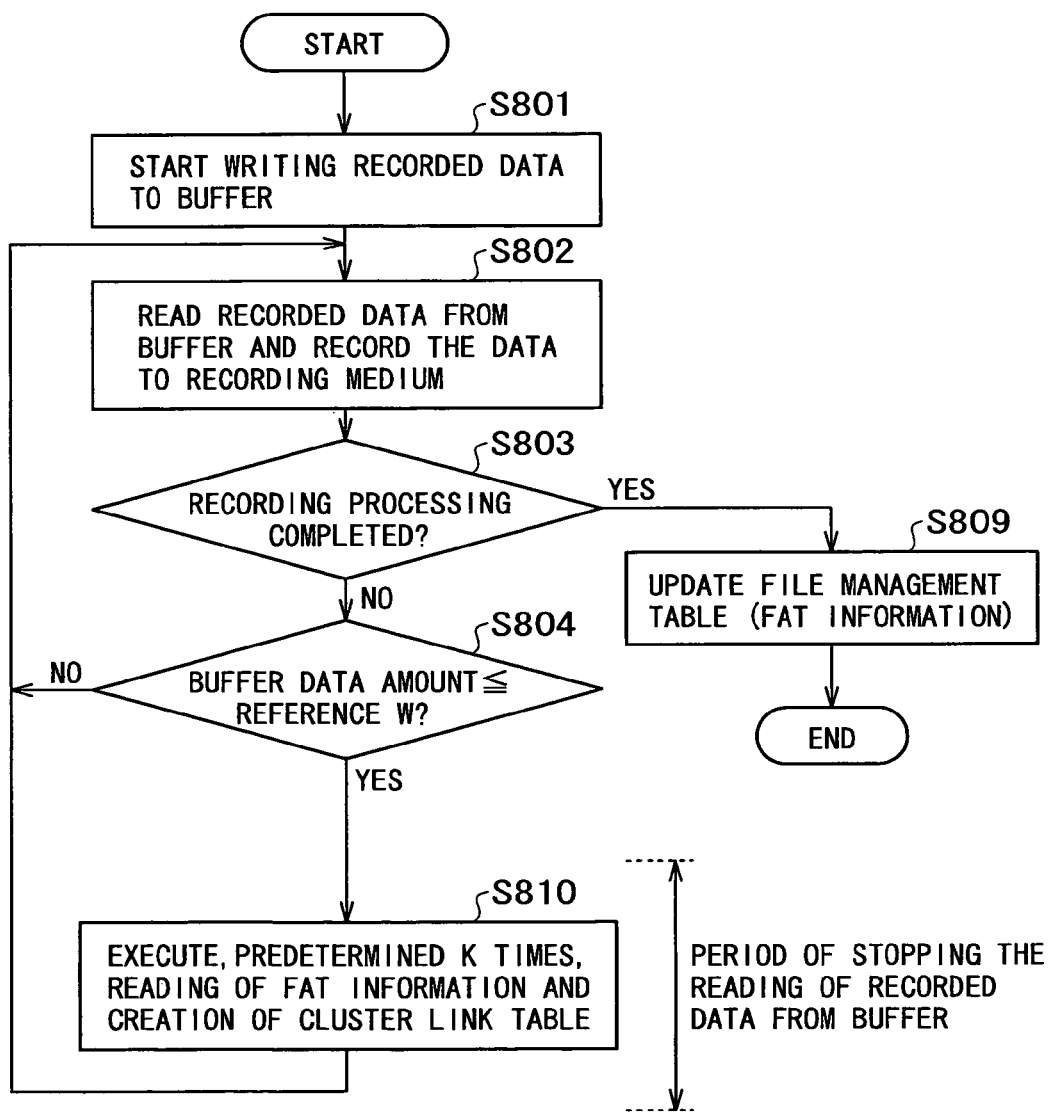
FIG. 30 is a flowchart indicative of another example of the processing of forming a cluster link table to be executed at the time of recording.

FIG. 30 is a flowchart for describing the processing of forming cluster link tables at the time of recording by use of previously obtained access count K to FAT information. With reference to FIG. 30, steps for executing the same processes as shown in FIG. 29 are denoted by the same reference numbers.

To be more specific, referring to FIG. 30, the processes of steps S801 through S804 and the process of step S809 are executed in the same manner as the corresponding steps shown in FIG. 29.

Referring to FIG. 30, if the data storage amount in the buffer 8 is found dropped to lower limit reference W in the decision process of step S804, the host CPU 13 accesses the FAT information by the predetermined access count K without computing the FAT information access count to form cluster link tables (step S810) and repeats the above-mentioned processing from step S802. Thus, the processing load of the host CPU 13 may be mitigated.

It should be noted that, in FIGS. 29 and 30, for FAT information access count K, the maximum FAT information access count during a period between lower limit reference W and upper limit reference WD is obtained, but another setting is also practicable. For example, access count K may be set to a lower level to provide a margin by considering the processing to be executed after the end of the formation of cluster link tables.

Also, in FIGS. 29 and 30, FAT information access count K is used as the upper limit value of size of a period in which cluster link tables are formed; however, another configuration may be used. As described above, in addition to FAT information access count K, the upper limit of the period in which cluster link tables are formed may be set and, within this time frame, cluster link tables may be formed. It should be noted that if the cluster link table formation time is used as the reference, the passage of the processing time may be managed by use of a clock circuit, not shown, connected to the host CPU 13 for example.

The reference by which the cluster link table formation processing is automatically ended is not limited to the access count or the cluster link table formation time. Because the data amount of FAT information processible in the free time of realtime processing is known from the processing capacity of the host CPU 13 and the size of the free area in the RAM 16 for use as the work area, this data amount may be used as the upper limit value for ending the cluster link table formation processing.

Also, the access account, which is obtained in accordance with the data amount of FAT information executable in a free time and the data amount of FAT information to be captured by one access (the access data amount), may be used as the upper limit value for ending the cluster link table formation processing.

It should be noted that, if the cluster link table formation time or the data amount of FAT information executable within the free time is used as the reference for automatically ending the cluster link table formation processing, the data amount of the FAT information to be captured every time the FAT information is accessed may be changed, the data amount of the FAT information to be captured for every predetermined access may be changed, or the data amount may be preset within the ranges of the formation time and the data amount.

Figure 31:
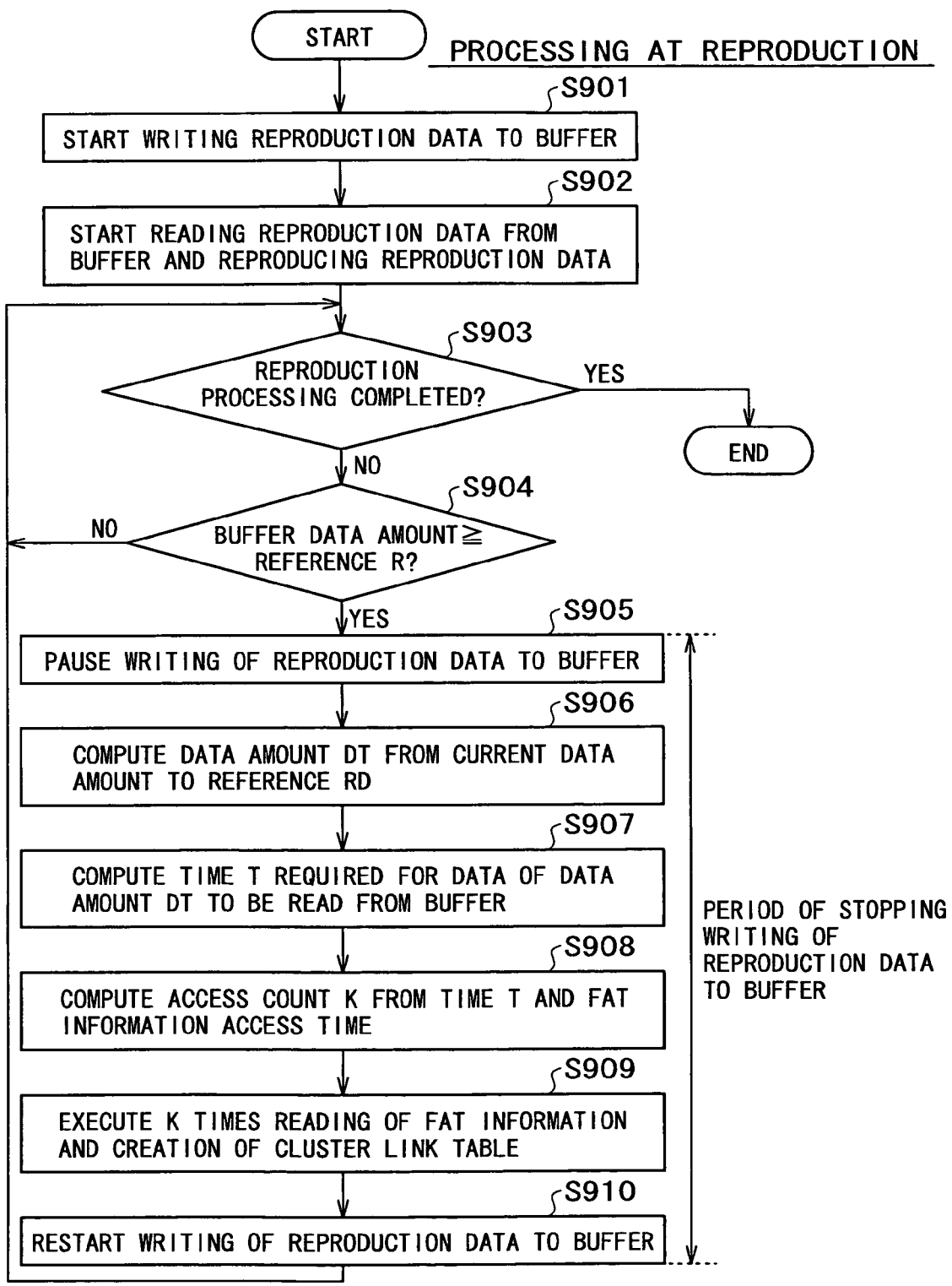
FIG. 31 is a flowchart indicative of the processing of forming a cluster link table to be executed at the time of reproduction.

The following describes the formation of cluster link tables at the time of reproduction. FIG. 31 is a flowchart for describing the processing of forming cluster link tables at the time of reproduction.

The following description will be made by use of an example in which data recorded to the hard disk 11 are reproduced and the reproduced data are outputted from the output terminal 2. When the recording/reproducing apparatus of the fifth embodiment is instructed to reproduce data from the hard disk 11, the host CPU 13 executes the processing shown in FIG. 31, switching the switch circuit 7 to the connection terminal "b" side and the switch circuit 9 to the connection terminal "a" side, thereby starting the reading of desired data from the hard disk 11 and the recording of the read data to the buffer 8 (step S901).

Next, the host CPU 13 starts the reading of the reproduction data from the buffer 8 while performing time axis correction thereon, and the reproduction thereof (step S902). Then, the host CPU 13 determines whether an operation for ending the reproduction has been done (step S903) and, if the operation for ending the reproduction is found done, ends the processing shown in FIG. 31.

If the operation for ending the reproduction is found not done in the decision process of step S903, then the host CPU 13 determines whether the data storage amount in the buffer 8 has exceeded predetermined upper limit reference R (step S904). If the data storage amount in the buffer 8 is found not exceeding upper limit reference R in the decision process of step S904, the host CPU 13 repeats the above-mentioned processing from step S902.

If the data storage amount in the buffer 8 is found exceeding upper limit reference R in the decision process of step S904, then the host CPU 13 pauses the reading of reproduction data from the hard disk 11 and the writing of the data to the buffer 8, thereby switching the switch circuit 9 to the connection terminal "b" side (step S905).

Next, as described with reference to FIG. 28B, the host CPU 13 computes data amount DT from the current data storage amount in the buffer 8 up to lower limit reference RD (step S906), thereby computing Time T necessary for the reproduction data for this data amount DT to be read from the buffer 8 (step S907).

Next, from Time T obtained in step S907 and the time necessary for capturing the FAT information per unit amount to be handled in one access into the RAM 16 (the access time to FAT information), the host CPU 13 computes access count K, which allows access to FAT information within Time T (the upper limit of access count) (step S908).

Then, the host CPU 13 reads the FAT information from the hard disk 11 by "K" times, executes the processing of forming cluster link tables in the nonvolatile memory 17 (step S909), switches the switch circuit 9 to the connection terminal "a" side, and restarts the reading of reproduction data from the hard disk 11 and the writing of the reproduction data to the buffer 8 (step S910), thereby repeating the above-mentioned processing from step S903. When the data storage amount in the buffer 8 has increased up to upper limit reference RD, the processing for forming cluster link tables is executed.

Thus, at the time of reproduction, when the data storage amount in the buffer 8 has increased up to upper limit reference R, the reading of reproduction data from the hard disk 11 and the writing of the reproduction data to the buffer 8 are paused, and FAT information is accessed by FAT information access count K executable during a period in which the data storage amount in the buffer 8 reaches lower limit reference RD, thereby forming cluster link tables. Subsequently, the formation of cluster link tables is automatically ended and the process of step S903 is resumed, thereby restarting the reading of reproduction data from the hard disk 11 and the writing of the reproduction data to the buffer 8.

By sequentially repeating the above-mentioned processing, FAT information may be accessed without affecting the reproducing processing and without making the user be aware thereof at the reproduction of information signals from the hard disk 11, thereby generating cluster link tables beforehand.

It should be noted that, in FIG. 31, the description was made on the supposition that, if the data storage amount in the buffer 8 increases over upper limit reference R, the FAT information access count is always computed. By doing so, the always correct FAT information access count may be set. However, another configuration is also possible in which FAT information access count K may be determined in advance.

For example, FAT information access count K executable between predetermined upper limit reference R and lower limit reference RD may be obtained in advance to execute the processing of forming cluster link tables at the time of reproduction by use of this predetermined access count K.

FIG. 32 is a flowchart for describing the processing of forming cluster link tables at the time of reproduction by use of FAT information access count K obtained in advance. With reference to FIG. 32, the steps for executing the same processes as shown in FIG. 31 are denoted by the same reference numbers.

To be more specific, in FIG. 32, the processes of steps S901 through S805 and the process of step S910 are executed in the same manner as the corresponding processes of the steps shown in FIG. 31.

In the processing shown in FIG. 32, if the data storage amount in the buffer 8 is found increased to upper limit reference R in the decision process of step S904, then the host CPU 13 accesses FAT information by the predetermined access count K without computing FAT information access count, thereby forming cluster link tables (step S920). By doing so, the processing load of the host CPU 13 may be mitigated.

It should be noted that, in FIGS. 31 and 32, for FAT access count K, the maximum FAT information access count between upper limit reference R and lower limit reference RD is obtained, but another setting is also practicable. For example, access count K may be set to a lower level to provide a margin by considering the processing to be executed after the end of the formation of cluster link tables.

Also, in FIGS. 31 and 32, FAT information access count K is used as the upper limit value of size of a period in which cluster link tables are formed; however, another configuration may be used. As described above, in addition to FAT information access count K, the upper limit of the period in which cluster link tables are formed may be set and, within this time frame, cluster link tables may be formed. It should be noted that if the cluster link table formation time is used as the reference, the passage of the processing time may be managed by use of a clock circuit, not shown, connected to the host CPU 13 for example.

In the case of forming cluster link tables at the time of reproduction too, the reference by which the formation of cluster link tables is automatically ended is not limited to the access count or the cluster link table formation time as with the above-mentioned cluster link table formation processing at the time of recording.

The data amount of FAT information processible in the free time of realtime processing is known from the processing capacity of the host CPU 13 and the size of the free area in the RAM 16 for use as the work area. This data amount may be used as the upper limit value for ending the cluster link table formation processing. Also, the access account, which is obtained in accordance with the data amount of FAT information executable in a free time and the data amount of FAT information to be captured by one access (the access data amount), may be used as the upper limit value for ending the cluster link table formation processing.

Obviously, in the case of forming cluster link table at the time of reproduction too, if the cluster link table formation time or the data amount of FAT information executable within the free time is used as the reference for automatically ending the cluster link table formation processing, the data amount of the FAT information to be captured every time the FAT information is accessed may be changed, the data amount of the FAT information to be captured for every predetermined access may be changed, or the data amount may be preset within the ranges of the formation time and the data amount.

The cluster link table formation is executed if the data storage amount in the buffer 8 drops below lower limit reference W at the time of recording or if the data storage amount in the buffer 8 exceeds upper limit reference R at the time of reproduction, but another configuration is also practicable. For example, the cluster link table formation may also be executed if the data storage amount in the buffer 8 drops below lower limit reference W at the time of recording and the data storage amount in the buffer 8 exceeds upper limit reference R at the time of reproduction.

As described above, the formation of cluster link tables is executed in a free area, which can be arranged at the time of realtime processing such as recording and reproduction of information signals, so that the cluster link tables can be formed in advance without making the user be aware thereof, thereby allowing smooth processing by use of cluster link tables in the case of reproduction, fast-forward, or fast-rewind of information signals.

It should be noted that the reason why the upper limit of the FAT information access count and the upper limit of the cluster link table formation processing time are provided at the time of forming cluster link tables is that, even if the amounts of information collection are the same, the necessary FAT information access counts may differ depending on the usage status of the data area on recording media. Namely, if, with even a small file, fragments are widely scattered over the data area on a recording medium, the FAT information access count increases, thereby possibly occupying the host CPU 13 for long.

[Formation of Free Cluster Map]

A cluster link table is formed on the basis of the FAT information formed on a recording medium. As described with reference to the third embodiment and as shown in FIG. 33, a free cluster map is also formed on the basis of the FAT information formed on a recording medium.

Hence, like the formation of a cluster link table, a free cluster table may also be formed in a free time, which may be arranged at the time of realtime processing such as recording and reproduction of information signals. Namely, a free cluster table may be formed without making the user be aware thereof, in exactly the same manner as the formation of cluster link tables described above with reference to FIGS. 26 through 32.

In addition, like the formation of cluster link tables, a free cluster table may be formed alone in a free time, which is arranged at the time of realtime processing. However, because a cluster link table and a free cluster table are each formed from FAT information, these tables may be formed simultaneously. Namely, when FAT information has been read by a predetermined unit amount, a cluster link table and a free cluster map may be formed from this FAT information.

[Backup (Save Processing) of Cluster Link Table and Free Cluster Map]

It should be noted that, in the above-mentioned embodiments, a cluster link table and a free cluster map were described as formed in the RAM 16 or the nonvolatile memory 17 in the recording/reproducing apparatus. If a cluster link table and a free cluster map are formed in the RAM 16 for example, these table and map must be generated again when the recording/reproducing apparatus is powered off even if the hard disk 11 or the semiconductor memory 12 has not been changed.

To avoid this problem, each formed cluster link table and free cluster table must be backed up (saved) to the hard disk 11, the semiconductor memory 12, or the nonvolatile memory 17 before the recording/reproducing apparatus is powered off. In this case, each cluster link table and each free cluster table are recorded in the compressed form in order to save their recording area. Obviously, they may be saved without compression.

In the case of a cluster link table, compression may be performed so that a portion in which specified addresses continue has only its start and end addresses, skipping the address data in between. In the case of a free cluster map, the data may be compressed so that a portion in which "0" indicative of used cluster or "1" indicative of unused cluster continues in plurality is identified by indicating which of "1" and "0" continues how many.

It should be noted that, when a cluster link table and a free cluster table are recorded to the hard disk 11 or the semiconductor memory 12, the recording processing changes free clusters, resulting in the changed contents of the free cluster table. Consequently, when cluster link tables or free cluster tables are backed up to the hard disk 11 or the semiconductor memory 12, an area in which to store the backup of cluster link tables or free cluster tables must be arranged beforehand on the hard disk 11 or the semiconductor memory 12, thereby preventing a difference from occurring between the free cluster map information and the actual free clusters.

Thus, by taking the backup of cluster link tables and free cluster maps, it becomes unnecessary for these information tables to be formed again every time the recording/reproducing apparatus is turned on, thereby making it practicable to use these information tables by decompressing them in the memory of the recording/reproducing apparatus.

It should be noted that, if cluster link tables or free cluster maps are formed in the nonvolatile memory 17 of the recording/reproducing apparatus, they will be not be deleted when the recording/reproducing apparatus is powered off. However, the hard disk 11 and the semiconductor memory 12 may be unloaded from the recording/reproducing apparatus.

Therefore, if cluster link tables or free cluster maps are formed in the nonvolatile memory 17 of the recording/reproducing apparatus, the unloading of the hard disk 11 or the semiconductor memory 12 is detected after the formation of cluster link tables or free cluster maps; if the hard disk 11 or the semiconductor memory 12 is detected unloaded, the cluster link tables or free cluster maps already formed in the nonvolatile memory 17 are invalidated, thereby preventing a mismatch from occurring in the cluster link tables or free cluster maps.

Obviously, if cluster link tables or free cluster maps are formed in the nonvolatile memory 17 of the recording/reproducing apparatus, their backups may be formed on the hard disk 11 or the semiconductor memory 12.

In the fifth embodiment, the recording and reproduction of information signals are used as an example of realtime processing, but the present invention is also applicable to any other realtime processing of information signals such as the transfer of information signals to be executed by assuring the nature of realtime in which stream data, which are information signals such as moving pictures or voice data required to be processed by assuring continuity, are processed without impairing the continuity.

It should be noted that, in the above-mentioned embodiments, "grid type" recording is used to record moving picture information and "general type" recording is used to record still picture information and IT data; however other configurations are also practicable. For example, "padded type" recording may be used to record moving picture information.

It is also practicable to change block sizes depending on the recording of moving picture information and the recording of information signals other than moving picture information, such as recording moving picture information in units of large blocks each composed of 8 clusters and recording still picture information or IT data in units of small blocks each composed of 2 clusters.

In the above-mentioned embodiments, different recording methods are used for the recording of moving picture information and the recording of still picture information or IT data, but not exclusively. For example, if it is desired to increase the transfer rate of information signals (data) at the time of recording, "grid type" or "padded type" recording may always be used to record information signals always on a block basis regardless of the types of information signals.

In the above-mentioned embodiments, hard disks and semiconductor memories are used as recording media, but not exclusively. For example, the present invention is also applicable to various random-accessible recording media such as magneto-optical disks including MD (Mini Disc [trademark]) and optical disks including DVD (Digital Versatile Disc).

In addition, the applicable recording media are not limited to random-accessible recording media. For example, the present invention is also applicable to any recording media that sequentially record data to continuous recording areas on the recording media, such as magnetic tape and CD-R (Compact Disc Recordable).

Namely, when information signals are recorded to a magnetic tape or a CD-R, they may be recorded by changing recording units. Consequently, the transfer rate of information signals (data) at the time of recording may be enhanced for faster recording processing.

In the above-mentioned embodiments, the present invention is applied to recording/reproducing apparatuses each having a camera block, by way of example, but not exclusively. The present invention is also applicable to various other recording/reproducing apparatuses using various types of recording media.

In the case of the first, third, and fourth embodiments, the present invention is applicable to information processing apparatuses, which function as recording-only apparatuses for recording information signals to recording media. In the second embodiment, the present invention is applicable to information processing apparatuses, which function as reproduction-only apparatuses for reproducing information signals recorded on random-accessible recording media. Namely, the present invention is selectively applicable to not only recording/reproducing apparatuses but also various other information processing apparatuses according to the functions thereof.

Further, the present invention is applicable to not only information processing apparatuses, which use detachable recording media known as so-called removable recording media but also various other information processing apparatuses such as recording/reproducing apparatuses, recording apparatuses, and reproducing apparatuses in which recording media are built in.

In the above-mentioned embodiments, a FAT file system is used as their file systems. As described above, FAT file systems are used on Windows (trademark) and OS/2, which are operating systems of personal computers and, because these FAT file systems are widely used, provide high compatibility in the case of data exchange for example.

However, the file systems, which may be used on the above-mentioned embodiments, are not limited to FAT file systems; namely the present invention is applicable to various other file systems, which have the information for managing, as files, the information signal recording destination link information such as FAT information and the recording data such as directory entry information.

The above-mentioned embodiments have been described by use of an example in which one block is composed of 8 clusters, but not exclusively. For example, one block may be composed of any other number of clusters higher than two.

The above-mentioned embodiments have been described by use of an example in which the cluster is expressed in hexadecimal 2 digits, but not exclusively. For example, the cluster may be expressed in hexadecimal 3 digits or more.

INDUSTRIAL APPLICABILITY

As described and according to the invention, the transfer rate at the time of recording and reproduction may be increased to execute the recording and reproduction of moving picture information without a hitch. At the same time, the usage efficiency of recording media may be increased and the processing load of the host CPU may be mitigated. The compatibility between the information signals recorded to recording media and other apparatuses than those according to the invention may be enhanced, thereby eliminating the necessity for newly installing file systems for example. Further, full measures are provided against power failure to realize an information processing apparatus, which is high in reliability and user friendliness as a whole.

The invention claimed is:

1. An information processing apparatus for recording an inputted information signal to a recording medium as one file, comprising:

detection means for detecting a free area based on a block composed of a plurality of continuous clusters, which is a minimum recording unit on said recording medium;

recording control means for controlling, on the basis of a detection result obtained by said detection means, recording means for recording said information signal to said block-basis free area on said recording medium;

file management means for forming, on said recording medium, a file management table containing information indicative of a link relationship of clusters in which information signals constituting a file are recorded and managing said file management table; and vacancy information table formation means for forming a vacancy information table composed of free cluster information onto a memory other than said recording medium by referencing said file management table, wherein said vacancy information table formation means forms said vacancy information table in a free time, which is arranged when said information signal is processed realtime.

2. The information processing apparatus according to claim 1, wherein said detection means detects said block-basis free area from said recording medium on which a recording area is regularly divided in unit of said block beforehand.

3. The information processing apparatus according to claim 1, further comprising:

decision means for deciding whether said information signal is moving picture information;

wherein, if said information signal is found by said decision means to be moving picture information, said recording control means controls said recording means to record said information signal to said block-basis free area on said recording medium.

4. The information processing apparatus according to claim 1, wherein said detection means detects a free area by referencing said vacancy information table.

5. The information processing apparatus according to claim 4, wherein said vacancy information table formation means forms said vacancy information table within a range of a processible data amount about said file management table set beforehand or to be set in accordance with said free time or within a processing time for forming said vacancy information table.

6. The information processing apparatus according to claim 4, further comprising:

saving means for saving said vacancy information table formed in said memory to a nonvolatile recording medium.

7. An information processing apparatus for recording an inputted information signal to a recording medium as one file, comprising:

detection means for detecting a free area based on a block composed of a plurality of continuous clusters, which is a minimum recording unit on said recording medium;

recording control means for controlling, on the basis of a detection result obtained by said detection means, recording means for recording said information signal to said block-basis free area on said recording medium;

file management means for forming, on said recording medium, a file management table containing information indicative of a link relationship of clusters in which information signals constituting a file are recorded and managing said file management table; and link information table formation means for forming a link information table containing information indicative of said cluster link relationship to continuous memory areas external to said recording medium by referencing said file management table, wherein said link information table formation means forms said link information table in a free time, which is arranged when said information signals are being processed realtime, and wherein said detection means detects a free area by referencing said file management table.

8. The information processing apparatus according to claim 7, further comprising:

a nonvolatile memory;

start recording means for recording, to said nonvolatile memory, start information indicative to which file an information signal is to be recorded;

invalidating means for invalidating, at the end of recording of an information signal, said start information recorded in said nonvolatile memory;

halfway detection means for detecting on the basis of said start information whether there is any file halfway being recorded when a power-on sequence has started; and recovery means for recovering, if a file halfway being recorded is found, said file halfway being recorded by obtaining necessary information recorded in said nonvolatile memory by referencing said file management table of said file.

9. The information processing apparatus according to claim 7, further comprising:

read control means for controlling reading means for reading said information signals on the basis of information contained in said link information table.

10. An information processing apparatus for reading a file recorded to a recording medium, said recording medium being formed with a file management table containing information indicative of a link relationship of clusters in which information signals constituting said file are recorded, said information processing apparatus comprising:

link information table formation means for forming link information table containing information indicative of said cluster link relationship to continuous memory areas external to said recording medium by referencing said file management table; and read control means for controlling reading means for reading said information signals on the basis of information contained said link information table, wherein said link information table formation means forms said link information table in a free time, which is arranged when said information signals are being processed realtime.

11. The information processing apparatus according to claim 10, wherein said link information table formation means forms said link information table within a range of a processible data amount about said file management table set beforehand or to be set in accordance with said free time or within a range of processing time for forming said link information table.

12. The information processing apparatus according to claim 9 or 10, further comprising:

save means for saving said link information table formed on said memory areas into a nonvolatile recording medium.

13. An information processing method for recording an inputted information signal to a recording medium as one file, comprising the steps of:

detecting a free area based on a block composed of a plurality of continuous clusters, which is a minimum recording unit on said recording medium;

controlling, on the basis of a detection result obtained by said detecting step, recording means to record said information signal to said block-basis free area on said recording medium;

forming a file management table containing information indicative of a link relationship of clusters in which information signals constituting a file are recorded;

forming a vacancy information table containing cluster vacancy information, which is formed in a memory other than said recording medium, wherein said vacancy information table formation step forms said vacancy information table in a free time, which is arranged when said information signal is processed realtime.

14. The information processing method according to claim 13, wherein said detection step detects said block-basis free area from said recording medium on which a recording area is regularly divided in unit of said block beforehand.

15. The information processing method according to claim 13, further comprising the step of:

deciding whether said information signal is moving picture information;

wherein, if said information signal is found in said decision step to be moving picture information, said recording control step controls said recording means to record said information signal to said block-basis free area on said recording medium.

16. The information processing method according to claim 13, wherein said detection step detects a free area by referencing said file management table.

17. The information processing method according to claim 13, wherein said detection step detects a free area by referencing said vacancy information table.

18. The information processing method according to claim 17, wherein said vacancy information table formation step forms said vacancy information table within a range of a processible data amount about said file management table set beforehand or to be set in accordance with said free time or within a processing time for forming said vacancy information table.

19. The information processing method according to claim 17, further comprising the step of:

saving said vacancy information table formed in said memory to a nonvolatile recording medium.

20. The information processing method according to claim 19, further comprising the steps of:

recording, to said nonvolatile memory, start information indicative to which file an information signal is to be recorded;

invalidating, at the end of recording of an information signal, said start information recorded in said nonvolatile memory;

detecting on the basis of said start information whether there is any file halfway being recorded when a power-on sequence has started; and recovering, if a file halfway being recorded is found, said file halfway being recorded by obtaining necessary information by referencing said file management table of said file.

21. An information processing method for recording an inputted information signal to a recording medium as one file, comprising the steps of:

detecting a free area based on a block composed of a plurality of continuous clusters, which is a minimum recording unit on said recording medium;

controlling, on the basis of a detection result obtained by said detection step, recording means to record said information signal to said block-basis free area on said recording medium;

forming a file management table containing information indicative of a link relationship of clusters in which information signals constituting a file are recorded;

forming a link information table containing information indicative of said cluster link relationship to continuous memory areas external to said recording medium by referencing said file management table; and controlling reading means for reading said information signals on the basis of information contained in said link information table, wherein said link information table formation step forms said link information table in a free time, which is arranged when said information signals are being processed realtime.

22. An information processing method for reading a file recorded to a recording medium formed with a file management table containing information indicative of a link relationship of clusters in which information signals constituting a file are recorded, said information processing method comprising the steps of:

forming a link information table containing information indicative of said link relationship of clusters to continuous memory areas other than said recording medium by referencing said file management table; and controlling reading said information signal on the basis of said link information table, wherein said link information table formation step forms said link information table in a free time, which is arranged when said information signals are being processed realtime.

23. The information processing method according to claim 22, wherein said link information table formation step forms said link information table within a range of a processible data amount about said file management table set beforehand or to be set in accordance with said free time or within a range of processing time for forming said link information table.

24. The information processing method according to claim 21 or 22, comprising the step of:

saving said link information table formed on said memory areas to a nonvolatile recording medium.

25. An information processing program stored on a non-transitory recording medium installed on an information processing apparatus, the information processing apparatus recording inputted information data to a non-transitory recording medium on a file basis executes the steps of: detecting a free area based on a block composed of a plurality of continuous clusters, which is a minimum recording unit on said recording medium; controlling, on the basis of a detection result obtained by said detecting step, recording said information data to said block-basis free area on said recording medium; forming a file management table containing information indicative of a link relationship of clusters in which information data constituting a file are recorded; and forming a vacancy information table containing cluster vacancy information, which is formed in a memory other than said recording medium, wherein said vacancy information table formation step forms said vacancy information table in a free time, which is arranged when said information data is processed realtime.

26. The information processing program according to claim 25,
wherein said detection step detects said block-basis free area from said recording medium on which a recording area is regularly divided in unit of said block beforehand.

27. The information processing program according to claim 25, further comprising the step of:
deciding whether said information signal is moving picture information;
wherein, if said information signal is found in said decision step to be moving picture information, said recording control step controls said recording means to record said information signal to said block-basis free area on said recording medium.

28. The information processing program according to claim 25,
wherein said detection step detects a free area by referencing said file management table.

29. The information processing program according to claim 25,
wherein said detection step detects a free area by referencing said vacancy information table.

30. The information processing program according to claim 29,
wherein said vacancy information table formation step forms said vacancy information table within a range of a processible data amount about said file management table set beforehand or to be set in accordance with said free time or within a processing time for forming said vacancy information table.

31. The information processing program according to claim 29, further comprising the step of:
saving said vacancy information table formed in said memory to a nonvolatile recording medium.

32. The information processing program according to claim 30 or 31, further comprising the steps of:
recording, to said nonvolatile memory, start information indicative to which file an information signal is to be recorded;
invalidating, at the end of recording of an information signal, said start information recorded in said nonvolatile memory;
detecting on the basis of said start information whether there is any file halfway being recorded when a power-on sequence has started; and
recovering, if a file halfway being recorded is found, said file halfway being recorded by obtaining necessary information by referencing said file management table of said file.

33. An information processing program stored on a non-transitory recording medium installed on an information processing apparatus, the information processing apparatus recording inputted information data to a non-transitory recording medium on a file basis executes the steps of: detecting a free area based on a block composed of a plurality of continuous clusters, which is a minimum recording unit on said recording medium; controlling the recording on the basis of a detection result obtained by said detection step; recording said information data to said block-basis free area on said recording medium; forming a file management table containing information indicative of a link relationship of clusters in which information data constituting a file are recorded; forming a link information table containing information indicative of said cluster link relationship to continuous memory areas external to said recording medium by referencing said file management table; and controlling reading said information data on the basis of said link information table, wherein said link information table formation step forms said link information table in a free time which is arranged when said information data are being processed realtime.

34. An information processing program stored on a non-transitory recording medium installed on an information processing apparatus, the information processing apparatus reading a file recorded to a recording medium formed with a file management table containing information indicative of a link relationship of clusters in which information data constituting a file are recorded execute the steps of: forming a link information table containing information indicative of said link relationship of clusters to continuous memory areas other than said recording medium by referencing said file management table; and controlling reading said information data on the basis of said link information table, wherein said link information table formation step forms said link information table in a free time which is arranged when said information data are being processed realtime.

35. The information processing program according to claim 34,
wherein said link information table formation step forms said link information table within a range of a processible data amount about said file management table set beforehand or to be set in accordance with said free time or within a range of processing time for forming said link information table.

36. The information processing program according to claim 33 or 34, comprising the step of:
saving said link information table formed on said memory areas to a nonvolatile recording medium.

* * * * *